(12) United States Patent
Xue et al.

(10) Patent No.: US 11,611,991 B2
(45) Date of Patent: Mar. 21, 2023

(54) FREQUENCY RESOURCE RESERVATION FOR SIDELINK COMMUNICATION

(71) Applicant: QUALCOMM Incorporated, San Diego, CA (US)

(72) Inventors: Yisheng Xue, San Diego, CA (US); Chih-Hao Liu, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/305,455

(22) Filed: Jul. 7, 2021

(65) Prior Publication Data
US 2022/0070921 A1 Mar. 3, 2022

Related U.S. Application Data

(60) Provisional application No. 62/706,688, filed on Sep. 2, 2020.

(51) Int. Cl.
*H04W 74/08* (2009.01)
*H04W 28/26* (2009.01)
*H04W 72/04* (2009.01)
*H04W 4/10* (2009.01)
*H04W 72/044* (2023.01)

(52) U.S. Cl.
CPC ....... *H04W 74/0808* (2013.01); *H04W 28/26* (2013.01); *H04W 72/044* (2013.01)

(58) Field of Classification Search
CPC ............. H04W 74/0808; H04W 28/26; H04W 72/044; H04W 72/0446; H04W 72/0406; H04W 4/10
See application file for complete search history.

(56) References Cited

U.S. PATENT DOCUMENTS

| | | | |
|---|---|---|---|
| 2012/0083937 A1* | 4/2012 | Kong | G06Q 50/06 700/295 |
| 2019/0200386 A1* | 6/2019 | Yang | H04W 74/0875 |
| 2019/0306923 A1* | 10/2019 | Xiong | H04L 5/0091 |
| 2020/0029340 A1* | 1/2020 | He | H04W 72/10 |
| 2020/0045719 A1* | 2/2020 | Wang | H04W 74/0808 |
| 2020/0229171 A1* | 7/2020 | Khoryaev | H04B 7/0413 |
| 2020/0229210 A1 | 7/2020 | Bharadwaj et al. | |
| 2021/0105104 A1* | 4/2021 | Cao | H04L 1/1854 |

(Continued)

OTHER PUBLICATIONS

International Search Report and Written Opinion—PCT/US2021/040974—ISA/EPO—dated Nov. 5, 2021.

*Primary Examiner* — Harry H Kim
(74) *Attorney, Agent, or Firm* — Haynes and Boone, LLP

(57) ABSTRACT

Wireless communications systems and methods related to frequency resource reservation for sidelink communication over a shared radio frequency band are provided. A first user equipment (UE) senses in a sidelink resource pool within a shared radio frequency band. The first UE reserves, based on the sensing, a frequency resource of the sidelink resource pool within an instance of a variable time range. The first UE performs, in the shared radio frequency band, one or more listen-before-talks (LBTs). The first UE transmits, to a second UE based on the one or more LBTs, a sidelink transmission using the frequency resource within the instance of the variable time range.

29 Claims, 17 Drawing Sheets

(56) References Cited

U.S. PATENT DOCUMENTS

| | | | | |
|---|---|---|---|---|
| 2021/0314821 A1* | 10/2021 | Huang | ................ | H04L 12/2869 |
| 2021/0377939 A1* | 12/2021 | Chae | .................... | H04W 28/26 |
| 2022/0232392 A1* | 7/2022 | Xu | .................... | H04W 74/0808 |
| 2022/0256525 A1* | 8/2022 | Lin | ................... | H04W 72/0406 |

\* cited by examiner

FREQUENCY RESOURCE RESERVATION FOR SIDELINK COMMUNICATION

CROSS-REFERENCE TO RELATED APPLICATIONS

The present application claims priority to and the benefit of U.S. Provisional Application No. 62/706,688, filed Sep. 2, 2020, which is hereby incorporated by reference in its entirety as if fully set forth below and for all applicable purposes.

TECHNICAL FIELD

This application relates to wireless communication systems, and more particularly to frequency resource reservation for sidelink communication over a shared radio frequency band.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a user equipment (UE) includes sensing in a sidelink resource pool within a shared radio frequency band; reserving, based on the sensing, a frequency resource of the sidelink resource pool within an instance of a variable time range; performing, in the shared radio frequency band, one or more listen-before-talks (LBTs); and transmitting, to a second UE based on the one or more LBTs, a sidelink transmission using the frequency resource within the instance of the variable time range.

In an additional aspect of the disclosure, a first user equipment (UE) includes a processor configured to sense in a sidelink resource pool within a shared radio frequency band; reserve, based on the sensing, a frequency resource of the sidelink resource pool within an instance of a variable time range; and perform, in the shared radio frequency band, one or more listen-before-talks (LBTs); and a transceiver configured to transmit, to a second UE based on the one or more LBTs, a sidelink transmission using the frequency resource within the instance of the variable time range.

In an additional aspect of the disclosure, a non-transitory computer-readable medium having program code recorded thereon includes code for causing a first user equipment (UE) to sense in a sidelink resource pool within a shared radio frequency band; code for causing the first UE to reserve, based on the sensing, a frequency resource of the sidelink resource pool within an instance of a variable time range; code for causing the first UE to perform, in the shared radio frequency band, one or more listen-before-talks (LBTs); and code for causing the first UE to transmit, to a second UE based on the one or more LBTs, a sidelink transmission using the frequency resource within the instance of the variable time range.

In an additional aspect of the disclosure, a first user equipment (UE) includes means for sensing in a sidelink resource pool within a shared radio frequency band; means for reserving, based on the sensing, a frequency resource of the sidelink resource pool within an instance of a variable time range; means for performing, in the shared radio frequency band, one or more listen-before-talks (LBTs); and means for transmitting, to a second UE based on the one or more LBTs, a sidelink transmission using the frequency resource within the instance of the variable time range.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that

DETAILED DESCRIPTION

Figure 1:
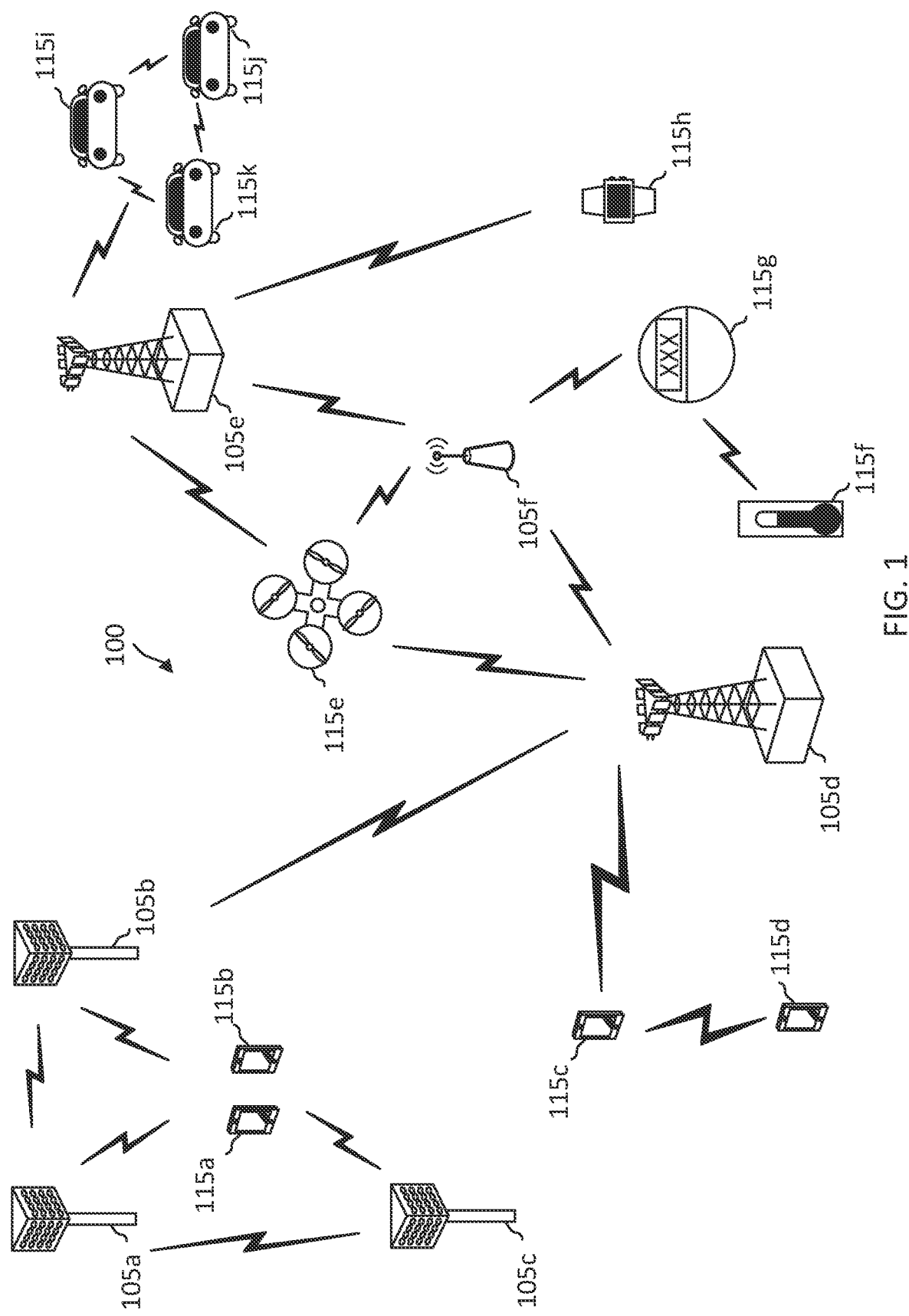
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communication may include V2X, enhanced mobile broadband (eMBB), industrial IoT (IIoT), and/or NR-lite.

As used herein, the term "sidelink UE" can refer to a user equipment device performing a device-to-device communication or other types of communications with another user equipment device independent of any tunneling through the BS (e.g., gNB) and/or an associated core network. As used herein, the term "sidelink transmitting UE" can refer to a user equipment device performing a sidelink transmission operation. As used herein, the term "sidelink receiving UE" can refer to a user equipment device performing a sidelink reception operation. A sidelink UE may operate as a transmitting sidelink UE at one time and as a receiving sidelink UE at another time.

NR supports two modes of radio resource allocations (RRA), a mode-1 RRA and a mode-2 RRA, for sidelink over a licensed spectrum. The mode-1 RRA supports network controlled RRA that can be used for in-coverage sidelink communication. For instance, a serving BS may determine a radio resource on behalf of a sidelink UE and transmit an indication of the radio resource to the sidelink UE. The mode-2 RRA supports autonomous RRA that can be used for out-of-coverage sidelink UEs or partial-coverage sidelink UEs. For instance, an out-of-coverage sidelink UE or a partial-coverage UE may be preconfigured with a sidelink resource pool and may select a radio resource from the preconfigured sidelink resource pool for sidelink communication.

For mode-2 RRA, a sidelink UE may perform sensing in a sidelink resource pool. The sensing may include decoding SCI and/or measuring signal energy in the channel. For SCI decoding, the UE may blindly decode SCI from a PSCCH of each resource. If the decoding is successful, the UE may record the decoded SCI. For signal measurements, the UE may receive a signal from each resource and compute a reference signal received power (RSRP) and/or receive signal strength indicator (RSSI) for each resource. The UE may also record the signal measurements. The UE may generate a packet (e.g., a medium access control (MAC), packet data unit (PDU)) for transmission. Upon generating the packet, the UE may trigger a resource selection. The UE may define a sensing window and a resource selection window in the resource pool with respect to a time when the resource selection is triggered. The sensing window may be located prior to the trigger, and the resource selection window may be located after the trigger. The UE may determine the sensing window and the resource selection window based on a set of parameters, which may be preconfigured and/or predetermined). The UE may identify candidate resources within the resource selection window based on past sensing results (e.g., decoded SCI and/or signal measurements) obtained in the sensing window. In other words, the UE may predict resource usages in the resource selection window based on the past sensing results. The UE may randomly select a resource from the identified candidate resources. The selected resource may be within a fixed subchannel in a frequency domain and a fixed sidelink slot in a time domain. The UE may indicate a reservation for the selected resource. In other words, the reservation may have a granularity of a sidelink slot. The reservation can facilitate channel sensing multiple access (CSMA) among sidelink UEs (e.g., in an intra-sidelink system). In some instances, the UE may continue to perform sensing and perform a last-minute evaluation of the reserved resource (e.g., a T3 duration before the actual transmission time) to check whether the reserved resource is preempted by another UE. If the last-minute evaluation passes indicates the reserved resource remain available, the UE may transmit a sidelink transmission (e.g., including SCI in a PSCCH and the packet in a PSSCH) using the selected resource. In some instances, the UE may select multiple resources from the candidate resources, for example, a first resource for an initial transmission of the packet and a second resource for a retransmission of the packet when hybrid automatic repeat request (HARQ) is used for the packet transmission.

The deployment of NR over an unlicensed spectrum is referred to as NR-unlicensed (NR-U). Some studies have been conducted for NR-U deployment over 5 gigahertz (GHz) unlicensed bands. Channel access in an unlicensed band may be regulated by regulations. For instance, LBT is imposed on some unlicensed bands. To perform an LBT, a transmitting node may listen to the channel to determine whether there are active transmissions in the channel (e.g., based on channel signal energy measurements). When the channel is idle (a passing LBT), the transmitting node may transmit in the channel. However, if the channel is busy (a failed LBT), the transmitting node may refrain from accessing the channel. Thus, LBT can lead to channel access uncertainty. The autonomous mode-2 RRA and sensing are designed to operate over a licensed band, and thus may not account for channel access uncertainty. As a result, even after the UE has determined, via the last-minute re-evaluation, that a resource has remained available for transmission, the UE may fail an LBT, which may indicate that the channel is busy. In such cases, the UE may be prevented from transmitting using the resource, and the transmission may be delayed.

To facilitate sidelink communication over a shared radio frequency band (e.g., in an unlicensed spectrum or a shared spectrum), resources in the sidelink resource pool may include gaps for sidelink UEs to perform LBTs. Thus, a sidelink resource may have an overlap with an LBT gap near the end of the sidelink resource, where the LBT gap may be used by a sidelink UE intending to use a next sidelink resource in time. In other words, the sidelink resource with an LBT overlap may end at an earlier time, and thus reducing an allowable transmission time. The reduced transmission time can impact performance, and thus a UE may desire to avoid resources that include an overlap with an LBT gap of another UE or at least avoid resources with a large overlap with an LBT gap. In this way, the use of LBT gaps may result in UEs avoiding the use of contiguous (e.g., back-to-back) resources in the time domain and/or terminating transmissions before the end of a resource. Additionally, a sidelink UE may include LBT gap information along with a sidelink resource reservation in SCI. The LBT gap information in the SCI may allow other sidelink UEs (monitoring sidelink UEs) performing channel sensing to be aware of the LBT gap in a first sidelink resource immediately before the reserved sidelink resource. For instance, if another sidelink UE decides to reserve the first sidelink resource, the other sidelink UE may shorten its transmission in the first resource. Accordingly, use of LBT gaps may result in spectral efficiency loss and implementation of SCI sensing with LBT gap information and LBT gap avoidance can be complex.

As used herein, the term "frequency resource" can refer to a radio resource in a fixed frequency subchannel identified by a fixed subchannel index in a frequency domain. As used herein, the term "variable time range" can refer to a variable number of time units (e.g., sidelink slots). As used herein, the term "frequency resource reservation" or "frequency-only reservation" can refer to the reservation of a radio resource having a fixed subchannel index in a frequency domain and a variable (e.g., floating) time index in a time domain. In other words, a variable time range may refer to the time spanned by a frequency resource reservation, which may correspond to the number of resources and/or slots included in the frequency resource reservation. The variable aspect of the term "variable time range" or "variable time index" may relate to the flexible (e.g., not fixed) starting slot boundary within the variable time range used to transmit a sidelink transmission using the a frequency resource, as described below, and/or may refer to a difference in the time spanned (e.g., a number of slots included in) by different instances of variable time ranges.

The present application describes mechanisms for reserving a frequency resource in a variable time range from a sidelink resource pool of a shared radio frequency band (e.g., in a shared spectrum or an unlicensed spectrum). For example, a first UE may reserve a frequency resource in the same subchannel (e.g., reserving the resource with a fixed subchannel index) over the variable time range for communication with a second UE. The variable time range may include one or more contiguous slots, which may provide the first UE with more opportunities and/or flexibility to transmit a sidelink transmission. For instance, the first UE may, after reserving the frequency resource, perform one or more LBTs and may transmit the sidelink transmission to the second UE based on the one or more LBTs. Accordingly, the first UE may begin transmission of the sidelink transmission at a slot in the variable time range after identifying a successful (e.g., passing) LBT corresponding to (e.g., occurring in a gap preceding) that slot. On the other hand, after identifying a failing LBT at a slot in the variable time range, the first UE may continue to perform one or more LBTs for the remaining slots in the variable time range and/or may reschedule the sidelink transmission to an alternative frequency resource over another variable time range. Thus, by increasing the number of slots included in the variable time range, the likelihood of the frequency resource being associated with a passing LBT increases.

In some aspects, to reserve the frequency resource, the first UE may perform sensing in a sidelink resource pool and may identify candidate resources that are available within the sidelink resource pool based on the sensing. The first UE may further filter the candidate resources based on a size M of the variable time range (e.g., a number of slots M included in the variable time range), among other things. For instance, the first UE may filter the candidate resources to identify time-contiguous (e.g., back-to-back) candidate resources that span the variable time range within the same subchannel. In some instances, the first UE may determine the size M of the variable time range based on a pre-configuration, a radio resource control (RRC) configuration, a system information block (SIB), a packet delay budget (PDB) of the sidelink transmission, a channel busy ratio (CBR) associated with the sidelink resource pool, and/or the like. Moreover, the first UE may adjust (e.g., reduce) the variable time range in response to determining the sidelink resource pool lacks sufficient (e.g., below a threshold) available candidate resources to reserve the frequency resource.

In some aspects, the first UE may transmit a reservation for the frequency resource to reserve the frequency resource over the variable time range. For example, the UE may transmit the reservation within an SCI via the PSCCH. The reservation may include information identifying a subchannel index associated with the frequency resource and/or a slot index associated with the variable time range, such as a slot index associated with a slot at the beginning of the variable time range.

In some aspects, the first UE may perform the one or more LBTs using a random backoff or countdown. In such aspects, the first UE may perform a first LBT, which may involve performing a countdown until a first slot boundary of the variable time range. In response to determining the first LBT failed, the first UE may perform a second LBT, which may involve resuming the countdown ahead of a second slot boundary of the variable time range. In this way, the first UE may continue using the same countdown for first and second LBT, which may reduce transmission delays.

In some aspects, after the first UE reserves the frequency resource over the variable time range, reservation of the frequency resource may be shared (e.g., conditionally reserved) by another UE, based at least on a priority associated with the reservation of the frequency resource. For instance, a third UE may reserve a time-frequency resource (in a fixed slot) or a second frequency resource (in a variable number of slots) in the same subchannel as the first UE's reserved frequency resource and overlaps one or more slots of the first UE's reserved variable time range. In other words, the third UE may share the first UE's reservation. However, the third UE may transmit using the time-frequency resource or the second frequency resource only if the first UE does not use each of the overlapped slots to transmit the sidelink transmission. For instance, if the first UE successfully transmits the sidelink transmission in a first slot within the variable time range of the frequency resource reservation and the frequency resource reservation includes two or more slots, the third UE may transmit in any remaining slots that the third UE reserved. In this way, the third UE may proactively reserve a resource within the first UE's frequency resource reservation that may not necessarily be utilized by the first UE.

In some aspects, the first UE may reserve a second frequency resource after reserving the frequency resource. Further, the first UE may reserve the second frequency resource by clustering it with the frequency resource. For instance, the first UE may select the second frequency resource so that it is adjacent to the frequency resource in frequency (e.g., positioned within an adjacent subchannel), time (e.g., positioned within an adjacent slot), or both (e.g., overlapping the frequency resource). As a result, the first UE may transmit the sidelink transmission and an additional sidelink transmission associated with the second frequency resource based on the same LBT in some instances. For example, when the frequency resource reservation and the second frequency resource reservation are in adjacent subchannels and offset in time, the first UE may perform a self-deferral (by the offset) after identifying a passing LBT associated with a first slot boundary of the frequency resource so that the first UE may simultaneously transmit the sidelink transmission and the additional sidelink transmission in the adjacent subchannels in a frequency-division multiplexing (FDM) manner. Alternatively, when the frequency resource reservation and the second frequency resource reservation are in the same subchannel with overlapping slots or with variable time range that are consecutive in time, the first UE may perform a self-deferral after identifying a passing LBT associated with a first slot boundary of the frequency resource so that the first UE may transmit the sidelink transmission and the additional sidelink transmission back-to-back in a time-division multiplexing (TDM) manner.

In some aspects, the first UE may transmit a soft reservation for a second frequency resource for transmitting a different sidelink transmission (e.g., a different transport block) when the first UE reserves the frequency resource. Subsequently, the first UE may transmit the different sidelink transmission using the second frequency resource if the second frequency resource is not preempted by another wireless communication device (e.g., another UE). To that end, in response to receiving a soft reservation for the second frequency resource, a third UE may make a best effort attempt to schedule transmissions around the soft reservation. For example, in reserving a resource, the third UE may treat the resources associated with the soft reservation as unavailable until it is determined that the third UE cannot reserve the resource without preempting at least a portion of the soft reservation.

Aspects of the present disclosure can provide several benefits. For example, by reserving a frequency resource over a variable time range for a sidelink transmission, the sidelink transmission may be transmitted with fewer delays. To that end, instead of rescheduling the sidelink transmission based on the frequency resource being preempted or being associated with an LBT failure at a particular slot, the sidelink transmission may be transmitted over a different slot within the same frequency resource. Moreover, aspects of the present disclosure may provide greater robustness with respect to LBT operations. For instance, by resuming the same countdown for an LBT associated with different slot boundaries, the success rate of LBTs performed for a particular transmission may increase. Additionally, aspects of the present disclosure may avoid complex implementation associated with SCI reservation and SCI sensing with LBT gap information.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. ABS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ an LBT procedure to monitor for transmission opportunities (TXOPs) in the shared channel. A wireless communication device may perform an LBT in the shared channel. LBT is a channel access scheme that may be used in the unlicensed spectrum. When the LBT results in an LBT pass (the wireless communication device wins contention for the wireless medium), the wireless communication device may access the shared medium to transmit and/or receive data. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. Conversely, the LBT results in a failure when a channel reservation signal is detected in the channel. A TXOP may also be referred to as channel occupancy time (COT).

Additionally, an LBT may be in a variety of modes. An LBT mode may be, for example, a category 4 (CAT4) LBT or a category 2 (CAT2) LBT. A CAT2 LBT refers to an LBT without a random backoff period. A CAT4 LBT refers to an LBT with a random backoff and a variable contention window (CW). A serving BS 105 may perform a CAT4 LBT to acquire a COT for communication with a UE. Additionally, the BS 105 may transmit a COT indication, for example, at the beginning of the COT, to indicate a duration of the COT and/or one or more subbands where the COT. The serving BS 105 may share the COT with a UE 115. To share the BS 105's COT, the UE may perform a CAT2 LBT within the BS 105's COT. Upon passing the CAT2 LBT, the UE may transmit a UL transmission within the BS 105's COT. A UE 115 may also acquire a COT outside of a COT of the serving B S105 for UL transmission by performing a CAT4 LBT. In some instances, the UE 115 may also share the UE 115's COT with the BS 105. In some instances, the CAT4 LBT mode may be referred to as a type 1 LBT, and the CAT2 LBT mode may be referred to as a type 2 LBT.

Figure 2:
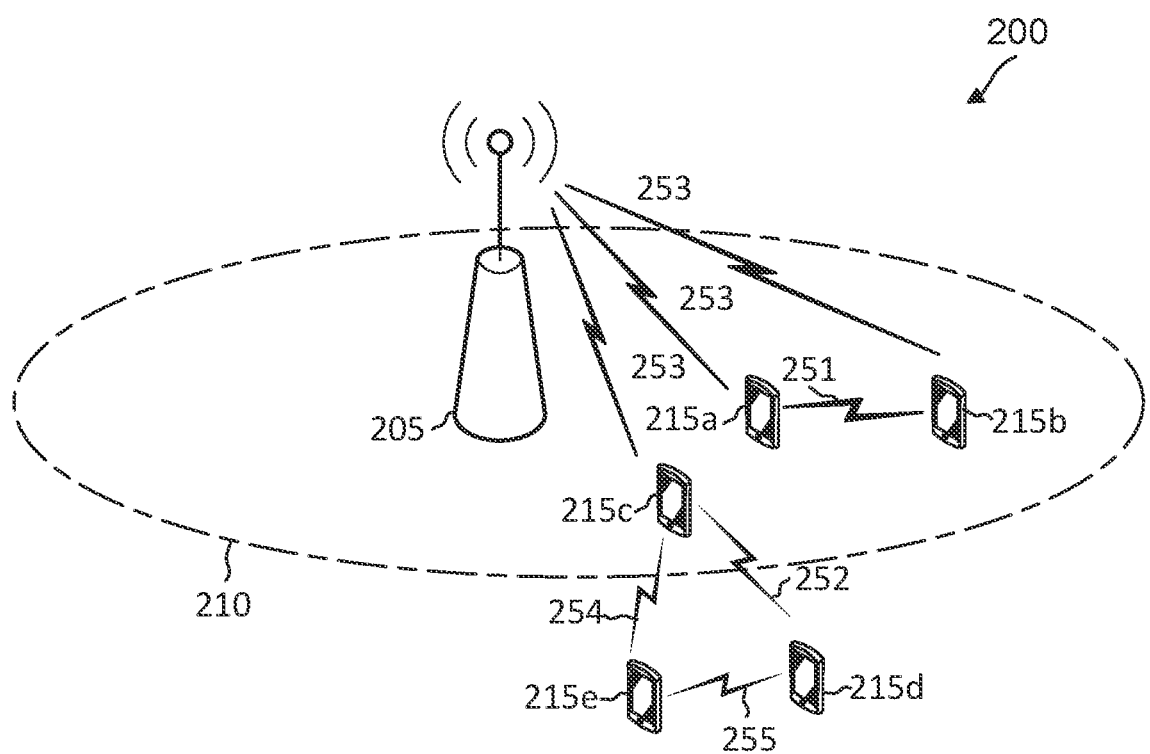
FIG. 2 illustrates a wireless communication network that provisions for sidelink communications according to some aspects of the present disclosure.

In some aspects, the network 100 may provision for sidelink communications to allow a UE 115 to communicate with another UE 115 without tunneling through a BS 105 and/or the core network as shown FIG. 2. As discussed above, sidelink communication can be communicated over a PSCCH and a PSSCH. For instance, the PSCCH may carry SCI and the PSSCH may carry SCI and/or sidelink data (e.g., user data). Each PSCCH is associated with a corresponding PSSCH, where SCI in a PSCCH may carry reservation and/or scheduling information for sidelink data transmission in the associated PSSCH. SCI may also carry information to reserve future resources (e.g., up to about two future PSSCH for retransmissions with HARQ). In some examples, a transmitting sidelink UE 115 may indicate SCI in two stages. In a first-stage SCI, the UE 115 may transmit SCI in PSCCH carrying information for resource allocation and decoding a second-stage SCI. The first-stage SCI may include at least one of a priority, PSSCH resource assignment, resource reservation period (if enabled), PSSCH DMRS pattern (if more than one pattern is configured), a second-stage SCI format (e.g., size of second-stage SCI), an amount of resources for the second-stage SCI, a number of PSSCH demodulation reference signal (DMRS) port(s), a modulation and coding scheme (MCS), etc. In a second-stage SCI, the UE 115 may transmit SCI in PSSCH carrying information for decoding the PSSCH. The second-stage SCI may include a -bit L1 destination identifier (ID), an 8-bit L1 source ID, a HARQ process ID, a new data indicator (NDI), a redundancy version (RV), etc. It should be understood that these are examples, and the first-stage SCI and/or the second-stage SCI may include or indicate additional or different information than those examples provided. Sidelink communication can also be communicated over a physical sidelink feedback control channel (PSFCH), which indicates an acknowledgement (ACK)-negative acknowledgement (NACK) for a previously transmitted PSSCH.

In some aspects, a pair of sidelink transmitting UE 115 and sidelink receiving UE 115 may communicate with each other using the autonomous mode-2 RRA discussed above. For instance, the sidelink transmitting UE 115 may continuously sense or monitor resources in a sidelink resource pool. The sensing or monitoring may include decoding SCI decoding and/or measuring signal energy in the channel. The sidelink transmitting UE 115 may record the SCI decoding results and the signal measurements. Upon receiving a data packet for transmission, the sidelink transmitting UE 115 may determine a resource selection window and identify candidate resources from the resource selection window based on sensing results (e.g., decoded SCI and signal measurements) obtained from a sensing window as will be discussed more fully below in FIGS. 3A-3B. The sidelink transmitting UE 115 may randomly select a resource from the candidate resources and transmit a sidelink transmission (e.g., including SCI over a PSCCH and/or data over a PSSCH) using the selected resource.

According to aspects of the present disclosure, the sidelink transmitting UE 115 may, based on the identified candidate resources, select a frequency resource with a variable time range (the same subchannel index over the variable time range), reserve the selected frequency resource over the variable time range, and transmit the sidelink transmission using the frequency resource during an available slot within the variable time range, as will be discussed more fully below in FIGS. 4A-4B. By selecting and reserving the frequency resource over the variable time range, the sidelink transmitting UE 115 may transmit the sidelink transmission in any available slot within the variable time range. To that end, before transmission of the sidelink transmission, the UE 115 may perform one or more LBTs in the shared radio frequency band and may identify an available slot within the variable time range associated with a passing LBT. The sidelink transmitting UE 115 may thus transmit the sidelink transmit the sidelink transmission from a second slot within the variable time range, which may be associated with a passing LBT, when a first slot in the variable time range is associated with a failing LBT. In this way, the likelihood that the sidelink transmitting UE 115 will reschedule the sidelink transmission based on resource or channel unavailability, which may result in delayed communication, is reduced, as will be described more fully.

FIG. 2 illustrates an example of a wireless communication network 200 that provisions for sidelink communications according to aspects of the present disclosure. The network 200 may correspond to a portion of the network 100. FIG. 2 illustrates one BS 205 and five UEs 215 (shown as 215a, 215v, 215c, 215d, and 215e) for purposes of simplicity of discussion, though it will be recognized that aspects of the present disclosure may scale to any suitable number of UEs 215 (e.g., the about 2, 3, 4, 5, 7 or more) and/or BSs 205 (e.g., the about 2, 3 or more). The BS 205 and the UEs 215 may be similar to the BSs 105 and the UEs 115, respectively. The BS 205 and the UEs 215 may share the same radio frequency band for communications. In some instances, the radio frequency band may be a licensed band. In some instances, the radio frequency band may be an unlicensed band (e.g., in a 5 GHz band). In some instances, the radio frequency band may be a frequency range 1 (FR1) band. In some instances, the radio frequency band may be a FR2 band. In general, the radio frequency band may be at any suitable frequency and may have any suitable bandwidth (e.g., about 5 MHz, about 10 MHz, about 20 MHz, about 80 MHz, about 100 MHz or more).

In the network 200, some of the UEs 215 may communicate with each other in peer-to-peer communications. For example, the UE 215a may communicate with the UE 215b over a sidelink 251, the UE 215c may communicate with the UE 215d over a sidelink 252 and/or with the UE 215e over a sidelink 254, and the UE 215d may communicate with the UE 215e over a sidelink 255. The sidelinks 251, 252, 254, and 255 are unicast bidirectional links. Some of the UEs 215 may also communicate with the BS 205 in a UL direction and/or a DL direction via communication links 253. For instance, the UE 215a, 215b, and 215c are within a coverage area 210 of the BS 205, and thus may be in communication with the BS 205. The UE 215d and UE 215e are outside the coverage area 210, and thus may not be in direct communication with the BS 205. In some instances, the UE 215c may operate as a relay for the UE 215d to reach the BS 205. In some aspects, some of the UEs 215 are associated with vehicles (e.g., similar to the UEs 115i-k) and the communications over the sidelinks 251 and/or 252 may be C-V2X communications. C-V2X communications may refer to communications between vehicles and any other wireless communication devices in a cellular network.

Figure 3A:
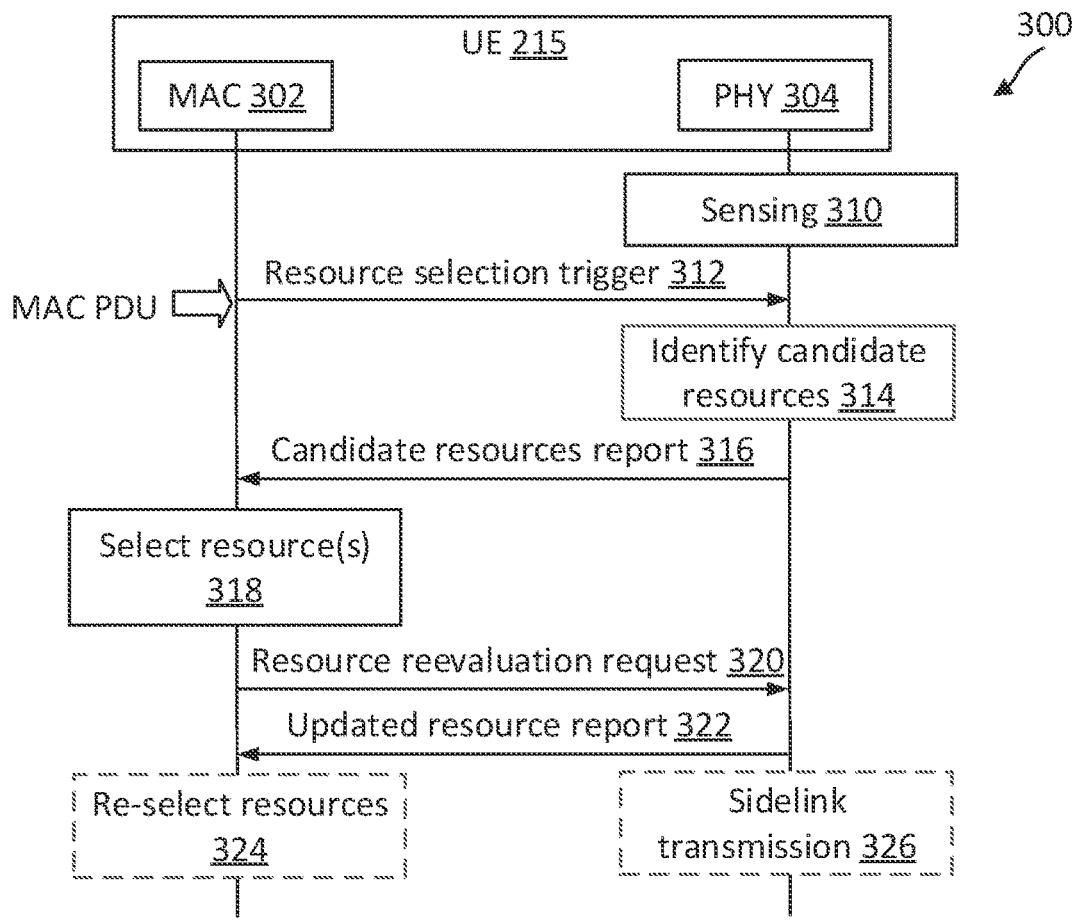
FIG. 3A is a sequence diagram illustrating an autonomous sidelink sensing method according to some aspects of the present disclosure.
Figure 3B:
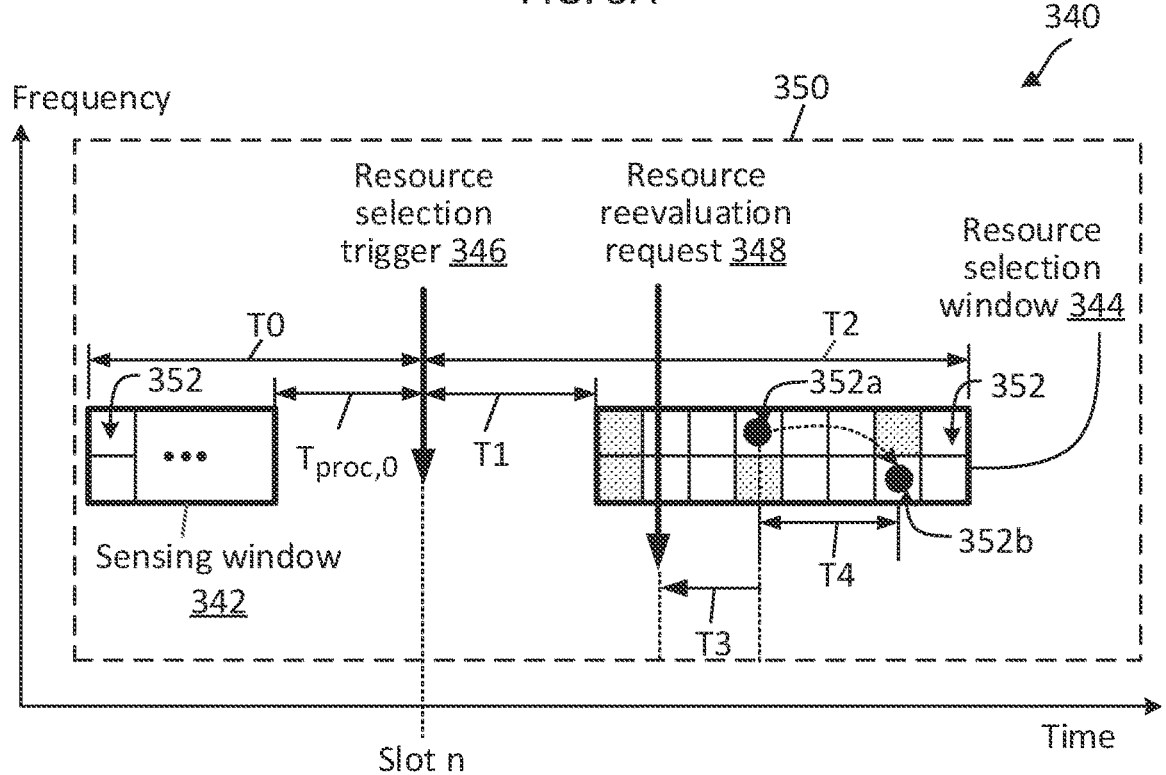
FIG. 3B illustrates an autonomous sidelink sensing scheme according to some aspects of the present disclosure.

FIGS. 3A and 3B are discussed in relation to each other to illustrate autonomous sidelink sensing using mode-2 RRA. FIG. 3A is a sequence diagram illustrating an autonomous sidelink sensing method 300 according to some aspects of the present disclosure. The method 300 may be implemented by a UE 215. As illustrated, the method 300 includes a number of enumerated actions, but aspects of the method 300 may include additional actions before, after, and in between the enumerated actions. In some aspects, one or more of the enumerated actions may be omitted or performed in a different order.

The autonomous sidelink sensing may be implemented between a MAC layer 302 and a PHY layer 304 at the UE 215. As shown, at action 310, the PHY layer 304 performs sensing in a sidelink resource pool (e.g., the sidelink resource pool 350 of FIG. 3B). A sidelink resource pool may refer to a set of time and frequency resources that may be used for sidelink operations. For instance, the PHY layer 304 may continuously sense or monitor resources (e.g., the resources 352 for FIG. 3B) in the sidelink resource pool. The sensing or monitoring may include decoding SCI and/or measuring signal energy in the channel. For SCI decoding, the PHY layer 304 may blindly decode SCI from a PSCCH of each resource. If the decoding is successful, the PHY layer 304 may record the decoded SCI. For signal measurements, the PHY layer 304 may receive a signal from each resource and compute a reference signal received power (RSRP) and/or receive signal strength indicator (RSSI) for each resource. The PHY layer 304 may also record the signal measurements.

At action 312, the MAC layer 302 sends a resource selection trigger (e.g., the resource selection trigger 346 of FIG. 3B) to the PHY layer 304, for example, based on a MAC PDU being generated and ready for transmission.

At action 314, in response to the resource selection trigger, the PHY layer 304 identifies candidate resources from the resource pool based on the sensing result. In this regard, the PHY layer 304 may determine a sensing window (e.g., the sensing window 342 of FIG. 3B) and a resource selection window (e.g., a resource selection window 344 of FIG. 3B) based on the resource selection trigger. The PHY layer 304 may identify candidate resources from the resource selection window based on past sensing results (e.g., decoded SCI and/or signal measurements) obtained in the sensing window. The resource selection trigger, the sensing window, and the resource selection window are shown in FIG. 3B.

FIG. 3B illustrates an autonomous sidelink sensing scheme 340 according to some aspects of the present disclosure. The scheme 340 may be employed by the UE 215 or any other UEs such as the UEs 115 and 215. In FIG. 3B, the x-axis represents time in some arbitrary units, and the y-axis represents frequency in some arbitrary units.

In the scheme 340, the UE 215 is preconfigured with a sidelink resource pool 350. The sidelink resource pool 350 may span a certain frequency bandwidth in a licensed band. The sidelink resource pool 350 may include a plurality of time-frequency resources 352. Each resource 352 may include a certain number of symbols (e.g., OFDM symbols) in time and a certain number of frequency subcarriers in frequency. In some aspects, the resource 352 may be in units of RBs (e.g., including 12 consecutive subcarriers in frequency and a time duration of a slot or any suitable time duration). FIG. 3B illustrates the sidelink resource pool 350 over a certain time period. In general, a sidelink resource pool may include time-frequency resources over consecutive slots (e.g., a continuous time period) and/or slots that are spaced apart in time (e.g., non-consecutive time periods).

In the illustrated example of FIG. 3B, the MAC layer 302 may generate a MAC PDU at slot n and may generate a resource selection trigger 346 at slot n. Upon receiving the resource selection trigger 346, the PHY layer 304 may define a sensing window 342 and a resource selection window 344 with respect to the time of the resources selection trigger 346 based on a set of parameters including $T_{proc,0}$, $T_{proc,1}$, T0, T1, T2, and T2 min. For instance, the PHY layer 304 may determine a start of the sensing window 342 based on a T0 duration before the resource selection trigger 346 and may determine an end of the sensing window 342 based on a $T_{proc,0}$ duration before the resource selection trigger 346. As shown, the sensing window 342 starts at the start of the T0 duration and ends at the start of the $T_{proc,0}$ duration. The PHY layer 304 may determine a start of the resource selection window 344 based on a T1 duration after the resource selection trigger 346 and may determine an end of the resource selection window 344 based on a T2 duration after the resource selection trigger 346. The T1 duration may have an upper bound limited by the parameter $T_{proc,1}$ (e.g., $0 \leq T1 \leq T_{proc,1}$). The T2 duration can be determined to meet a certain packet delay budget (PDB) and may have a lower bound limited by T2 min (e.g., $T2_{min} \leq T2 \leq PDB$). As shown, the resource selection window 344 starts at the end of the T1 duration and ends at the end of the T2 duration. In some aspects, the PHY layer 304 may be preconfigured with some of the parameters (e.g., $T_{proc,0}$, $T_{proc,1}$). In some aspects, the PHY layer 304 may receive some of the parameters (e.g., T1, T2, $T2_{min}$) from an upper layer (e.g., an RRC layer). Although FIG. 3B illustrates the resource selection window 344 including 16 resources, it should be understood that in other examples a resource selection window can include a less number of resources (e.g., about 4, 5, 6, 8, or 10) or a greater number of resources (e.g., 17, 18, 19, 20, 24, 32, or more).

The PHY layer 304 may identify candidate resources 352 within the resource selection window 344 by examining or analyzing sensing results obtained within the sensing window 342. In other words, the PHY layer 304 may utilize past sensing results to predict future usages of resources 352 in the resource selection window 344. The PHY layer 304 may use a combination of SCI decoding, signal measurements, and/or priority information to identify candidate resources. In some aspects, the PHY layer 304 may exclude resources 352 in the resource selection window 344 that are reserved (e.g., based on SCI decoding in the sensing window 342 and/or prediction). The PHY layer 304 may exclude resources 352 in the resource selection window 344 that are to be used for transmissions with a higher traffic priority than the UE 215 (e.g., based on SCI decoding in the sensing window 342 and/or prediction). The PHY layer 304 may exclude resources 352 in the resource selection window 344 based on resources 352 within the sensing window 342 that have signal measurements (e.g., RSRP and/or RSSI) higher than a certain signal threshold and a predicted resource usage pattern. The PHY layer 304 may perform the resource filtering or exclusion by SCI decoding, priority, and/or signal measurements in the resource selection window 344 in any suitable order. If the remaining candidate resources 352 in the resource selection window 344 is less than 20% of the total resources in the resource selection window 344, the PHY layer 304 may increase the signal threshold and repeat the resource filtering or exclusion until the candidate resources 352 in the resource selection window 344 is about 20% of the total resources 352 in the resource selection window 344. In FIG. 3B, the candidate resources (available resources) 352 in the resource selection window 344 are shown as empty-filled boxes. The unavailable resources 352 are shown as pattern-filled boxes.

Returning to FIG. 3A, at action 316, the PHY layer 304 sends a candidate resource report indicating the identified candidate resources 352 (e.g., the empty-filled boxes in the resource selection window 344 shown in FIG. 3B). The report may indicate the time and frequency location information for the candidate resources.

At action 318, upon receiving the candidate resource report, the MAC layer 302 selects one or more resources from the candidate resources. For instance, the MAC layer 302 may randomly select a first resource from the candidate resources for transmitting the MAC PDU. As an example, if report includes a list of N candidate resources, the MAC layer 302 may draw a random number (e.g., k) between 1 and N and select k$^{th}$ candidate resources. In some instances, the UE 215 may apply HARQ to the transmission of a transport block (TB) (carrying the MAC PDU) and may retransmit the same TB upon receiving a NACK or failing to receive an ACK for the transmission from a corresponding receiving UE. Thus, the MAC layer 302 may also randomly select a second resource from the candidate resources by drawing another random number between 1 and N, for example, for a potential retransmission of the MAC PDU. FIG. 3B illustrates an example of the resource selection.

Referring to FIG. 3B, the MAC layer 302 may randomly select a first resource 352a (shown by a black circle) from the candidate resources for an initial transmission and may randomly select a second resource 352b (shown by a black circle) from the candidate resources for a retransmission. In some instance, the MAC layer 302 may select the second resource 352b for the retransmission such that the first resource 352a and the second resource 352b are separated by a T4 duration. In some aspects, the T4 duration may be less than about 32 slots or any other suitable time duration. In some aspects, the T4 duration may have a predetermined or preconfigured lower bound and/or upper bound.

Referring to FIG. 3A, at action 320, the MAC layer 302 sends a resource reevaluation request (e.g., the resource reevaluation request 348 of FIG. 3B) to the PHY layer 304. The resource reevaluation request may request the PHY layer 304 to report updated available resources at this time instant to double check whether the previously selected resources (e.g., resources 352a and 352b of FIG. 3B) are still available. In some instances, the MAC layer 302 may send the resource reevaluation request slightly before (e.g., 1 symbol, 2 symbols, 3 symbols, 4 symbol, or a slot) the actual time where the MAC PDU is to be transmitted using the selected first resource (e.g., the resource 352a in FIG. 3B).

As such, the resource reevaluation request can also be referred to as a "last-minute re-evaluation".

Referring to FIG. 3B, the MAC layer 302 sends a resource reevaluation request 348 at T3 duration before the actual transmission time for the selected first resource 352a. In some aspects, the T3 duration may have a predetermined or preconfigured lower bound and/or upper bound.

Referring to FIG. 3A, at action 322, in response to the resource reevaluation request, the PHY layer 304 sends an updated resource report to the MAC layer 302. The PHY layer 304 may identify resources in the resource selection window 344 that are still available at the time instant when the resource reevaluation request is received. The PHY layer 304 may use substantially similar mechanisms as discussed at action 314 to identify available resources (candidate resources) at that time instant. If the first resource (e.g., the resource 352a) previously selected by the MAC layer 302 is no longer available, the PHY layer 304 may indicate an indication in the report. For instance, the report may include a re-selection flag set to 1 for the first resource. Similarly, if the second resource (e.g., the resource 352b) previously selected by the MAC layer 302 is no longer available, the PHY layer 304 may indicate an indication in the report. For instance, the report may include a re-selection flag set to 1 for the second resource.

If the first resource is no longer available, the MAC layer 302 may re-select another resource from the candidate resources indicated in the updated candidate resource report at action 324 and may repeat the action 320 and 322 at a later time for another last-minute resource reevaluation for newly selected resource. Otherwise, the PHY layer 304 may transmit the MAC PDU to another sidelink UE (e.g., the UEs 115 and/or 215) using the selected first resource at action 326.

Similarly, if the second resource (to be used for the retransmission) is no longer available, the MAC layer 302 may re-select another resource from the candidate resources indicated in the updated candidate resource report at action 324. The MAC layer 302 may also request the PHY layer 304 for a last-minute resource reevaluation for the resource to be used for the retransmission.

In some aspects, the UE 215 may communicate with another UE similar to the UEs 115, 215, and/or 215 over a sidelink channel in a shared radio frequency band (e.g., in a shared spectrum or an unlicensed spectrum). As discussed above, LBT may be used when communicating over an unlicensed band, where a transmitting node may listen to the channel (by measuring signal energy in the channel and comparing the measurement to a threshold. When the channel is idle (e.g., with signal measurement(s) below the threshold), the transmitting node may transmit in the channel. However, if the channel is busy (e.g., with signal measurement(s) above the threshold), the transmitting node may refrain from accessing the channel. Thus, LBT can lead to channel access uncertainty.

For instance, referring to the example shown in FIG. 3B, the UE 215 may perform a CAT4 LBT (a type 1 LBT) prior to transmitting the MAC PDU. As discussed above, a CAT4 LBT may include a random backoff or countdown. The time duration of the random backoff or countdown may be dependent on a CW size. In some instances, the random backoff can have a substantially longer duration (e.g., the CW may have a time length of 1024 slots) than the $T_{proc,1}$ parameter used for defining the T1 duration. As such, the resource selection window 344 may start before the LBT countdown is completed. Additionally, the LBT countdown may still be in progress at the time instant when the resource reevaluation request is sent by the MAC layer 302, and thus the PHY layer 304 may not be able to reevaluate the availability of the resources. Further, the T4 duration between the selected first resource 352a (to be used for the initial transmission of the MAC PDU) and second resource 352b (to be used for the retransmission of the MAC PDU) may be too short for performing another LBT before the retransmission. Thus, the addition of LBT to autonomous sidelink sensing can impact packet delivery delay, power consumption at the UE 215, and/or loss in spectral efficiency. Additionally or alternatively, the UE 215 may detect an interference at the time of the reevaluation and thus may fail the LBT. However, the interference may be present momentarily and may not be present during the selected or reserved resource. Accordingly, it may be desirable for the UE 215 to reserve a frequency resource over a variable time range (including multiple contiguous slots) to account for LBT delay, allowing for a flexible transmission starting time or starting slot within the variable time range as discussed below.

Figure 4A:
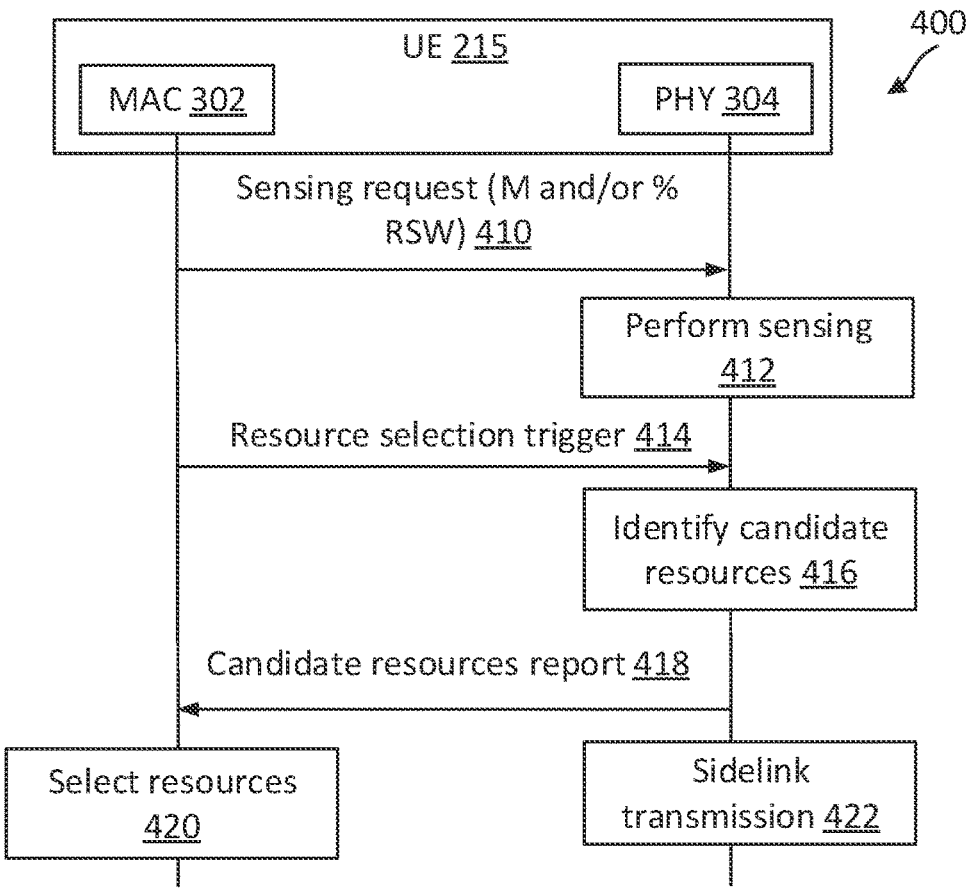
FIG. 4A is a sequence diagram illustrating an autonomous sidelink sensing method according to some aspects of the present disclosure.
Figure 4B:
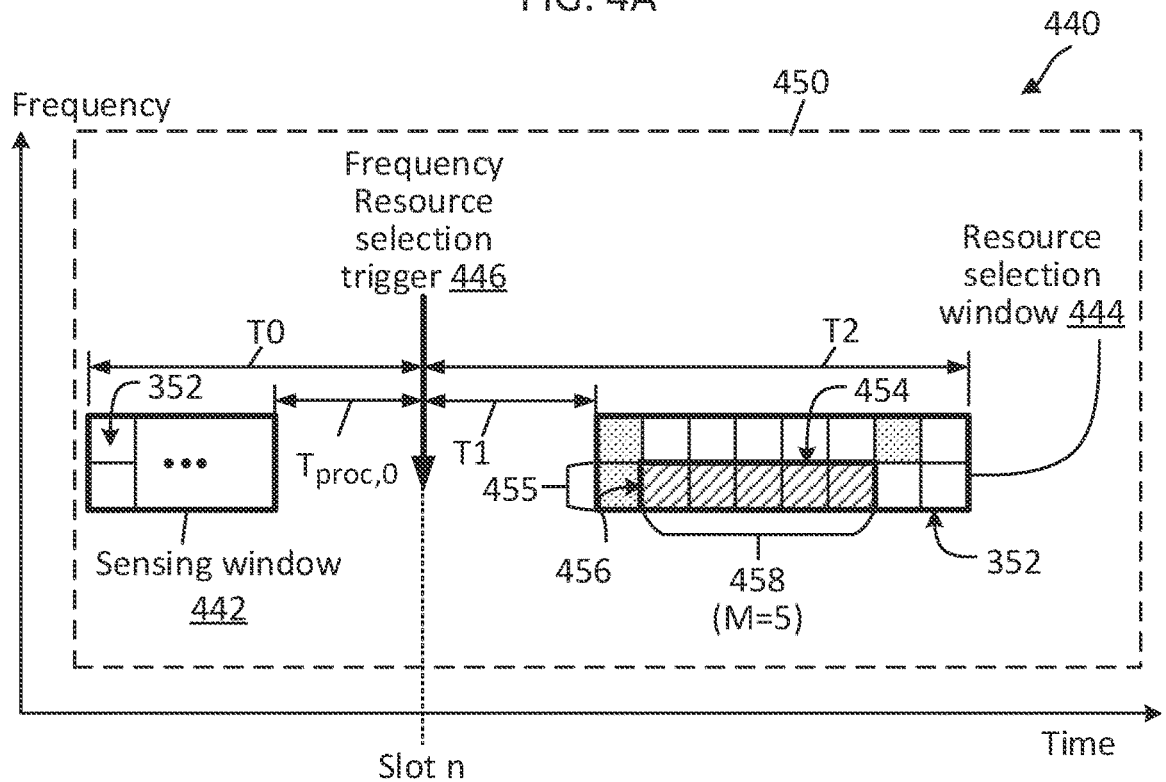
FIG. 4B illustrates an autonomous sidelink sensing scheme according to some aspects of the present disclosure.

FIGS. 4A and 4B are discussed in relation to each other to illustrate frequency resource reservation. FIG. 4A is a sequence diagram illustrating a frequency resource reservation method 400 according to some aspects of the present disclosure. The method 400 may be implemented by a UE 215. As illustrated, the method 400 includes a number of enumerated actions, but aspects of the method 400 may include additional actions before, after, and in between the enumerated actions. In some aspects, one or more of the enumerated actions may be omitted or performed in a different order.

At action 410, the MAC layer 302 sends a sensing request to the PHY layer 304. The sensing request may include an indication of size (M) of (e.g., the number of slots (M slots) included in) the variable time range 458 of the frequency resource reservation 454 of FIG. 4B. Additionally or alternatively, the sensing request may include a candidate set size threshold for the resource selection window 444. For instance, in some aspects, the MAC layer 302 may indicate, via the sensing request, that the candidate set size threshold is greater than a certain percentage (e.g., 20%, 25%, 30%, and/or the like) of the resources included in the resource selection window 444. Moreover, the candidate set size threshold may exceed a preconfigured and/or default candidate size threshold such that the likelihood of a set of M resources 456 with consecutive slots (the variable time range 458) in the candidate resource set within the resource selection window 444 is increased. In some aspects, the candidate set size threshold may be determined based on the number of slots M included in the variable time range 458. In this way, a sensing request corresponding to a variable time range 458 having fewer slots may indicate a smaller candidate set size threshold than a sensing request corresponding to a variable time range 458 having a greater number of slots.

Moreover, in some aspects, the number of slots M included in the variable time range 458 may be determined based on one or more factors. For instance, the UE 215 and/or the MAC layer 302 may determine the size M based on a predetermined value pre-configured within the UE 215, preconfigured by a network (e.g., network 100, network 200), and/or the like. Additionally or alternatively, the UE 215 may be configured to receive an indication of the size M in an RRC configuration, a system information block (SIB), and/or the like from a BS 205. In some aspects, the UE 215 may be further configured to adjust the predetermined value based on the received indication.

Further, in some aspects, the UE 215 may be configured to determine the size M based on a traffic priority and/or a PDB of a sidelink transmission to be transmitted over a resource reserved by the frequency resource reservation 454. For instance, for a first sidelink transmission having a higher traffic priority and/or a lower PDB, the UE may determine a greater value for M than for a second sidelink transmission having a lower traffic priority and/or a higher PDB. A greater M value or a greater number of slots in the variable time range provides more opportunities for the UE 215 to find an available resource with an LBT pass. In this way, the first sidelink transmission may be transmitted with less delay than the second sidelink transmission.

In some aspects, the UE 215 may determine the size M based on a channel busy ratio (CBR) associated with the sidelink resource pool 450. A CBR is a metric indicating a number of subchannels in a sidelink resource pool with a measured receive signal strength indicator (RSSI) greater than a certain threshold divided by the total number of subchannels in the resource pool. The CBR can provide an estimation on the total occupancy state of the channel. In such cases, the UE 215 may determine, for a given traffic priority of a sidelink transmission, decreasing sizes of M for increasing CBR values. For instance, the UE 215 may be configured, via a pre-configuration, based on a broadcast SIB, based on an RRC configuration, and/or the like, with a mapping between values of CBR and sizes of M, such as a maximum value of M for each CBR value or range of CBR value, for each given sidelink transmission traffic priority.

At action 412, the PHY layer 304 performs sensing in a sidelink resource pool (e.g., the sidelink resource pool 450 of FIG. 4B). As described above with reference to FIG. 3B, a sidelink resource pool may refer to a set of time and frequency resources that may be used for sidelink operations. The sensing or monitoring may include decoding SCI and/or measuring signal energy in the channel. For SCI decoding, the PHY layer 304 may blindly decode SCI from a PSCCH of each resource. If the decoding is successful, the PHY layer 304 may record the decoded SCI. For signal measurements, the PHY layer 304 may receive a signal from each resource and compute a reference signal received power (RSRP) and/or receive signal strength indicator (RSSI) for each resource. The PHY layer 304 may also record the signal measurements.

In some aspects, the PHY layer 304 may sense or monitor resources (e.g., the resources 352 of FIG. 4B) based on the sensing request. For example, the PHY layer 304 may perform the sensing in response to receiving the sensing requested transmitted by the MAC layer 302 (e.g., at action 410). Further, in some aspects, the PHY layer 304 may continuously sense or monitor resources (e.g., the resources 352 of FIG. 4B) in the sidelink resource pool. In such cases, the PHY layer 304 may perform the sensing before receiving a sensing request, as illustrated and generally described above with reference to FIG. 3A.

At action 414, the MAC layer 302 sends a resource selection trigger (e.g., the frequency resource selection trigger 446 of FIG. 4B) to the PHY layer 304. In some embodiments, the MAC layer 302 may send the resource selection trigger based on a MAC PDU and/or a transport block (TB) (e.g., a transport block carrying the MAC PDU) being generated and ready for transmission (e.g., sidelink transmission). Moreover, in some aspects, the MAC layer 302 may include the indication of the size M of the variable time range 458 and/or the candidate set size threshold within the frequency resource selection trigger 446 in addition to or the alternative of the sensing request 410. In aspects where the indication of the size M and/or the candidate set size threshold is included within the resource selection trigger 446, the sensing request 410 may be omitted.

At action 416, in response to the resource selection trigger, the PHY layer 304 identifies candidate resources from the resource pool based on the sensing result. In this regard, the PHY layer 304 may determine a sensing window (e.g., the sensing window 442 of FIG. 4B) and a resource selection window (e.g., a frequency resource selection window 444 of FIG. 4B) based on the resource selection trigger. The PHY layer 304 may identify candidate resources from the resource selection window based on past sensing results (e.g., decoded SCI and/or signal measurements) obtained in the sensing window. Moreover, the PHY layer 304 may identify candidate resources based on the candidate set size threshold received from the MAC layer 302. The resource selection trigger, the sensing window, and the resource selection window are shown in FIG. 4B.

FIG. 4B illustrates an autonomous sidelink sensing scheme 440 according to some aspects of the present disclosure. The scheme 440 may be employed by the UE 215 or any other UEs such as the UEs 115 and 215. In FIG. 4B, the x-axis represents time in some arbitrary units, and the y-axis represents frequency in some arbitrary units.

In the scheme 440, the UE 215 is preconfigured with a sidelink resource pool 450. The sidelink resource pool 450 may span a certain frequency bandwidth in an unlicensed band or shared frequency band. The sidelink resource pool 450 may be similar to the sidelink resource pool 350 and is illustrated using the same resource pool structure as in FIG. 3B. As shown, the sidelink resource pool 450 may include a plurality of time-frequency resources 352. Each resource 352 may include a certain number of symbols (e.g., OFDM symbols) in time and a certain number of frequency subcarriers in frequency. In some aspects, the resource 352 may be in units of RBs (e.g., including 12 consecutive subcarriers in frequency and a time duration of a slot or any suitable time duration). FIG. 4B illustrates the sidelink resource pool 450 over a certain time period. In general, a sidelink resource pool may include time-frequency resources 352 over consecutive slots (e.g., a continuous time period) and/or slots that are spaced apart in time (e.g., non-consecutive time periods).

In the illustrated example of FIG. 4B, the MAC layer 302 may generate a frequency resource selection trigger 446 at slot n. Upon receiving the resource selection trigger 446, the PHY layer 304 may define a sensing window 442 and a resource selection window 444 with respect to the time of the resources selection trigger 446 based on a set of parameters including $T_{proc,0}$, $T_{proc,1}$, T0, T1, T2, and T2 min, as generally described above with reference to FIG. 3B. Although FIG. 4B illustrates the resource selection window 444 including 16 resources, it should be understood that in other examples a resource selection window can include a less number of resources (e.g., about 4, 5, 6, 8, or 10) or a greater number of resources (e.g., 17, 18, 19, 20, 24, 32, or more).

The PHY layer 304 may identify candidate resources 352 (e.g., at action 416 of FIG. 4A) within the resource selection window 444 by examining or analyzing sensing results obtained within the sensing window 442. In other words, the PHY layer 304 may utilize past sensing results to predict future usages of resources 352 in the resource selection window 444. The PHY layer 304 may use a combination of SCI decoding, signal measurements, and/or priority information to identify candidate resources. In some aspects, the PHY layer 304 may exclude resources 352 in the resource selection window 444 that are reserved (e.g., based on SCI decoding in the sensing window 442 and/or prediction). The PHY layer 304 may exclude resources 352 in the resource selection window 444 that are to be used for transmissions with a higher traffic priority than the UE 215 (e.g., based on SCI decoding in the sensing window 442 and/or prediction). The PHY layer 304 may exclude resources 352 in the resource selection window 444 based on resources 352 within the sensing window 442 that have signal measurements (e.g., RSRP and/or RSSI) higher than a certain signal threshold and a predicted resource usage pattern. The PHY layer 304 may perform the resource filtering or exclusion by SCI decoding, priority, and/or signal measurements in the resource selection window 444 in any suitable order. If the remaining candidate resources 352 in the resource selection window 444 is less than the candidate set size threshold (e.g., a percentage of the total resources in the resource selection window 444), the PHY layer 304 may increase the signal threshold and repeat the resource filtering or exclusion until the candidate resources 352 in the resource selection window 444 satisfies (e.g., is equal to or exceeds) the candidate set size threshold. In FIG. 4B, the candidate resources (available resources) 352 in the resource selection window 444 are shown as empty-filled boxes (or as reserved by the frequency resource reservation 454). Additionally or alternatively, the PHY layer 304 may exclude resources 352 based on the size M. For instance, the PHY layer 304 may exclude resources 352 that are not contiguous with other available resources 352 in the time domain and/or sets of contiguous resources 352 that are smaller than M. The unavailable resources 352 are shown as pattern-filled boxes.

Returning to FIG. 4A, at action 418, the PHY layer 304 sends a candidate resource report indicating the identified candidate resources 352 (e.g., the empty-filled boxes in the resource selection window 344 shown in FIG. 3B). The report may indicate the time and frequency location information (e.g., time and frequency indices) for the candidate resources 352.

At action 420, upon receiving the candidate resource report, the MAC layer 302 selects one or more resources from the candidate resources 352. More specifically, the MAC layer 302 may select the two or more resources (e.g., M time-contiguous resources) in the same subchannel from the candidate resources 352 for the frequency resource reservation 454. Further, before selecting the one or more resources, the MAC layer 302 may filter (e.g., screen) the candidate resources report 418. For instance, the MAC layer 302 may filter the candidate resources 352 based on the size M. To that end, the MAC layer 302 may receive the candidate resource report 418 and may filter for groups of M time-contiguous resources 352 within a respective subchannel. Further, it may be appreciated that the MAC layer 302 may filter the resources in addition to or in the alternative of the filtering described above with respect to the PHY layer 304.

In some aspects, by filtering the candidate resources within the candidate resources report, the MAC layer 302 may identify sets of M time-contiguous (e.g., back-to-back) available candidate resources within the candidate resources report 418. Subsequently, if the number of identified sets is less than (e.g., fails to satisfy) a threshold, which may be pre-configured and/or predetermined within the UE 215, the MAC layer 302 may decrement the size of M and/or may restart the method 400 by transmitting a new sensing request 410. If, on the other hand, the identified set is greater than or equal to (e.g., satisfies) a threshold, the MAC layer 302 may select a set of M time-contiguous available candidate resources from among the sets. To that end, the MAC layer 302 may select a frequency resource 455 over the variable time range 458 (shown as a set of M resources 456).

In some aspects, the MAC layer 302 may select the set of M resources 456 for the frequency resource reservation 454 using clustered resource selection. For example, the MAC layer 302 may select the frequency resource reservation 454 to frequency division multiplex (FDM), time division multiplex (TDM), and/or overlap with respect to another frequency resource reservation 454 and/or a reserved time-frequency resource 352, as described in greater detail below. Additionally or alternatively, the MAC layer 302 may select the frequency resource reservation 454 randomly. For instance, the MAC layer 302 may randomly select a first set of resources from the candidate resources for transmitting the MAC PDU. As a further example, if the candidate resources report includes a list of N sets of size M groups of contiguous candidate resources, the MAC layer 302 may draw a random number (e.g., k) between 1 and N and select the $k^{th}$ set of candidate resources as the set of M resources 456 for the frequency resource reservation 454. Further, in some instances, the UE 215 may apply HARQ to the transmission of a transport block (TB) (carrying the MAC PDU) and may retransmit the same TB upon receiving a NACK or failing to receive an ACK for the transmission from a corresponding receiving UE. Thus, the MAC layer 302 may also randomly select a second set of M resources of a second frequency resource over a second variable time range from the candidate resources by drawing another random number between 1 and N, for example, for a potential retransmission of the MAC PDU.

Referring to now FIG. 4B, the MAC layer 302 may randomly select the frequency resource reservation 454 from the candidate resources for an initial transmission or a retransmission. To that end, while a single frequency resource reservation 454 is illustrated, the MAC layer 302 may select multiple frequency resource reservations 454, such as a first frequency resource reservation for an initial transmission and a second frequency resource reservation for a retransmission (not shown), from the candidate resources, as described above. In such cases, the second frequency resource reservation may be separated by the first frequency resource reservation by a duration (T4), as described above with reference to FIG. 3B.

Returning to FIG. 4A, at action 422, the PHY layer 304 may transmit a sidelink transmission (e.g., the MAC PDU and/or a TB) to another sidelink UE (e.g., the UEs 115 and/or 215) using one of the selected or reserved resources reserved by the frequency resource reservation 454. More specifically, the PHY layer 304 may transmit the sidelink transmission after determining that a resource of the set of M resources 454 is available for transmission within the variable time range 458 based on a last-minute re-evaluation and one or more LBTs, as described in greater detail below with reference to FIGS. 6A and 6B.

Figure 5:
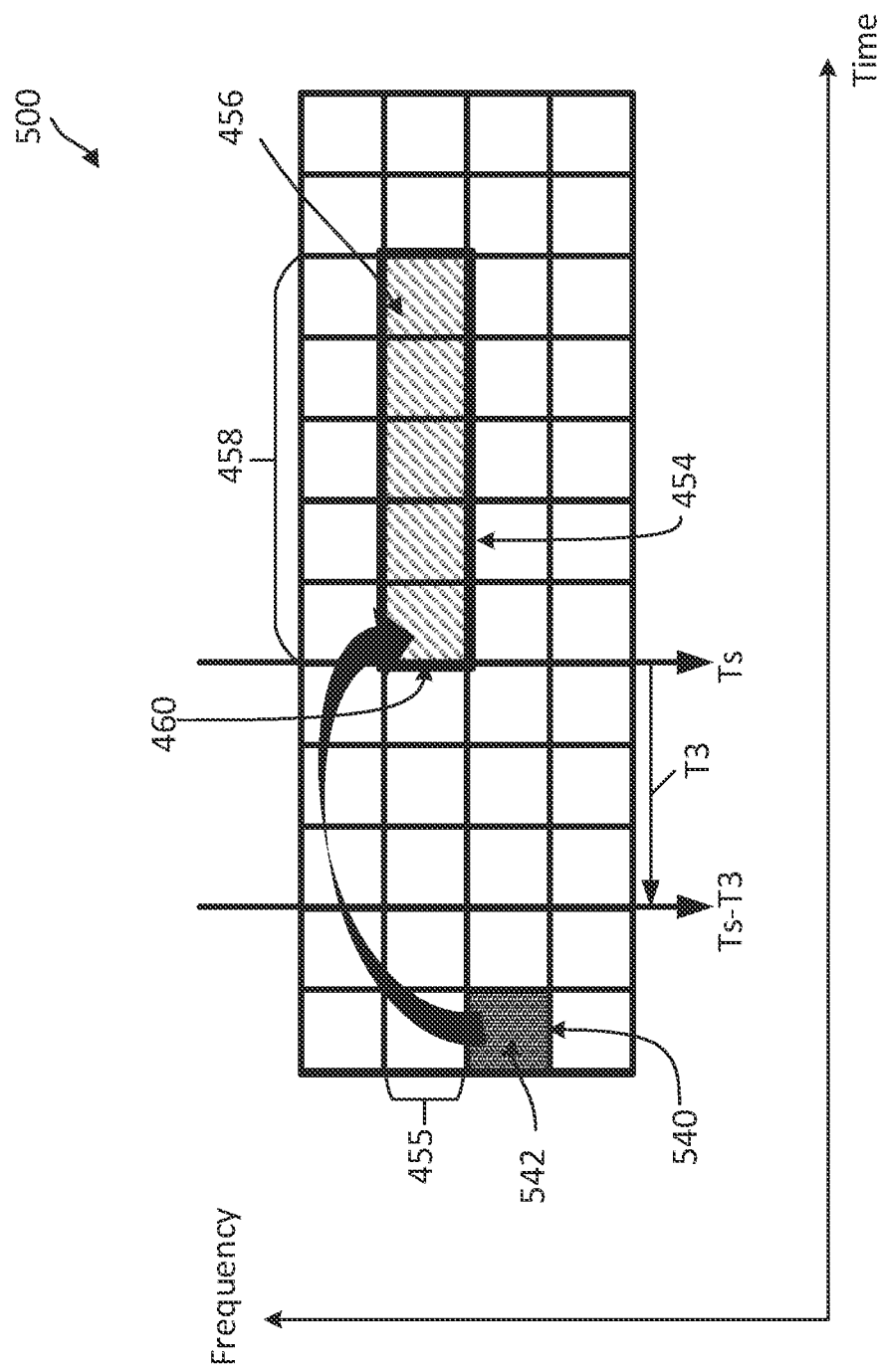
FIG. 5 illustrates a sidelink communication scheme according to some aspects of the present disclosure.

Turning now to FIG. 5, reservation of a set of M resources 456 of the frequency resource 455 over the variable time range 458 within a sidelink communication scheme 500 is illustrated according to some aspects of the present disclosure. The scheme 500 may be employed by the UE 215 or any other UEs such as the UEs 115 and 215. In FIG. 5, the x-axis represents time in some arbitrary units, and the y-axis represents frequency in some arbitrary units.

In some aspects, the UE 215 may reserve the set of M resources 456 (e.g., the frequency resource reservation 454) such that other UEs (e.g., the UEs 115 and/or 215) may detect the reservation. For instance, the UE 215 may transmit a reservation 542 (e.g., a reservation message) based on frequency resource reservation 454 selected by the MAC layer 302 (e.g., at action 420). The reservation 542 may include a subchannel index identifying the frequency resource 455, a slot index of the variable time range 458, such as a slot index identifying a beginning slot (e.g., slot 460) of the variable time range 458, a total number of slots included in the variable time range 458 (e.g., a duration of the variable time range), or a combination thereof. Further, as described above, the MAC layer 302 may select multiple frequency resource reservations 454. Thus, the reservation 542 may include information (e.g., subchannel and/or slot indices) for identifying both a first set of M resources 456 and a second set of M resources (not illustrated).

While FIG. 5 illustrates the reservation 542 occupying the entire time-frequency resource 540, the reservation 542 may be transmitted within a portion of the time-frequency resource 540. In some aspects, the UE 215 may transmit, in a PSCCH portion of the resource 540, SCI indicating the reservation. Accordingly, other UEs 215 may detect and/or receive the reservation 542 via sensing in the sidelink resource pool 450. Further, in response to detecting a reservation 542 for a frequency resource 455 over a variable time range 458, the UE 215 may be configured to set an LBT gap positioned within the variable time range 458 to zero. In other words, the other UEs 215 may not leave any LBT gap within the set of M resources 456 reserved by a frequency-only reservation 454.

In some cases, one or more slots of the reserved set of M resources 456 may be preempted or become unavailable in the time between the reservation and/or selection of the set of M resources 456 and a time for transmission of a sidelink transmission (e.g., a slot boundary of slot 460). For instance, another UE 215 with a higher priority or with a transmission having higher priority may preempt one or more slots of the set of M resources 456 for its respective transmission. Additionally or alternatively, a LBT performed prior to the set of M resources 456 may fail, which may cause the UE 215 to refrain from transmitting in the channel in at least some of the slots within the variable time range 458. While one or more slots of the set of M resources 456 may become unavailable to the UE 215 for transmission, an additional set of slots in the variable time range 458 may remain available for transmission using the frequency resource 455. To that end, the use of the additional set of slots may not be preempted, and the additional set of slots may be associated with a passing LBT. Accordingly, before transmitting the sidelink transmission, the UE 215 may be configured to perform a last-minute re-evaluation (e.g., at a T3 duration before the start time Ts of the frequency resource reservation 454) and one or more LBTs with respect to the set of M resources 456 to identify slots of the variable time range 458 available to the UE 215 for transmission.

Figure 6A:
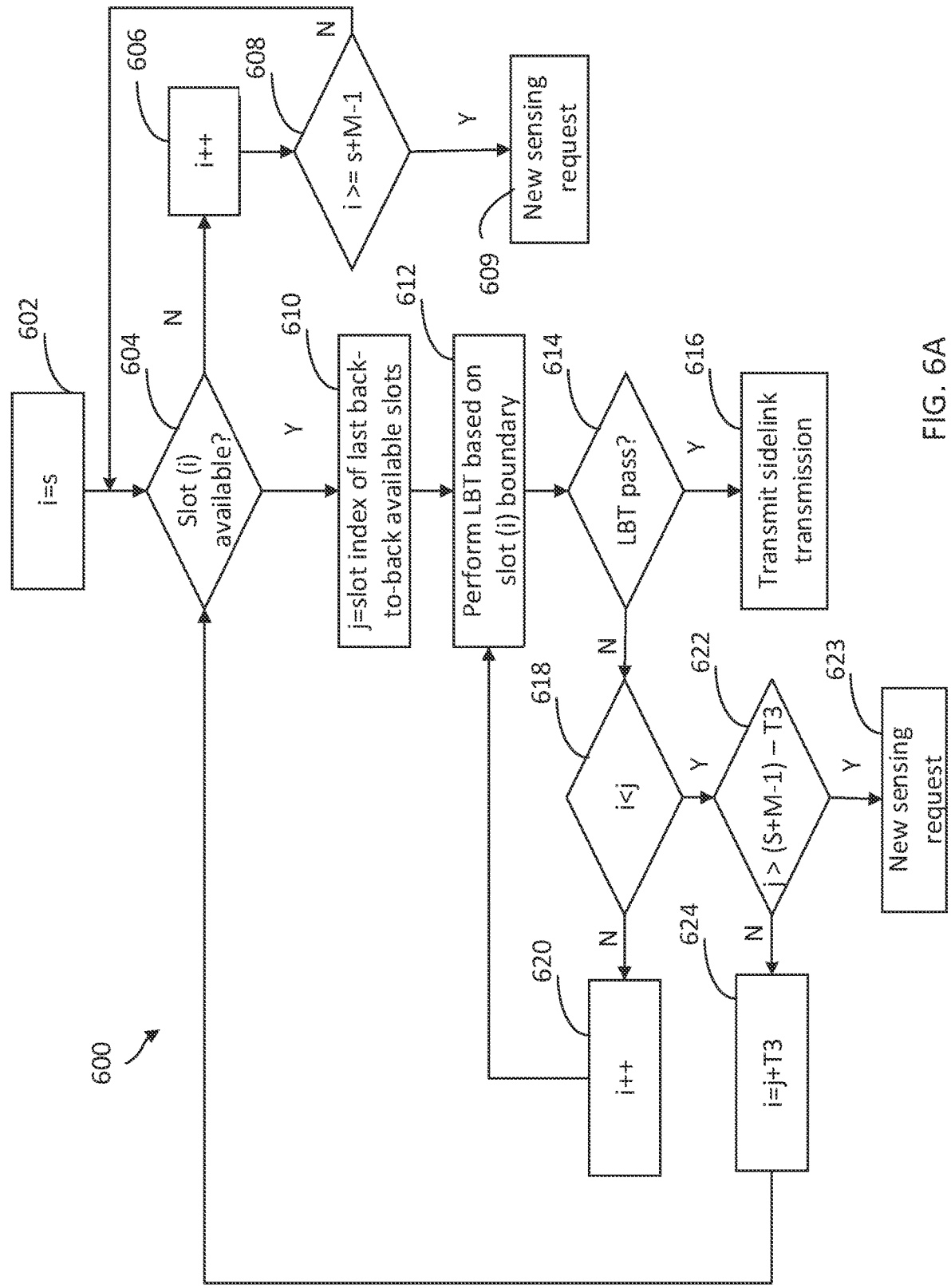
FIG. 6A is a flow diagram illustrating a method for last-minute re-evaluation and performance of a listen-before-talk (LBT) with respect to a reserved frequency resource according to some aspects of the present disclosure.
Figure 6B:
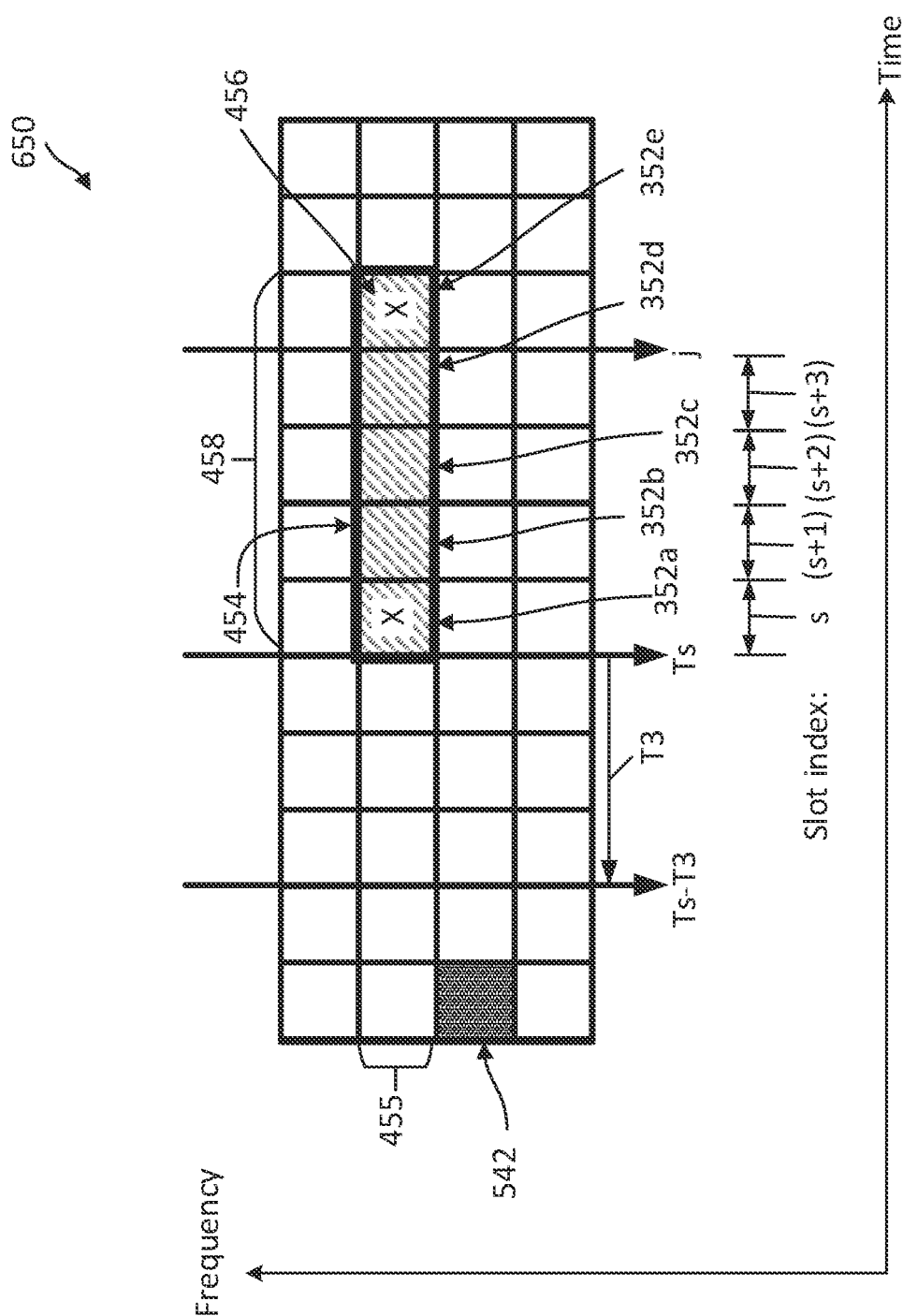
FIG. 6B illustrates last-minute re-evaluation with respect to a reserved frequency resource according to some aspects of the present disclosure.

FIGS. 6A and 6B are discussed in relation to each other to illustrate last-minute re-evaluation and LBT with respect to a reserved set of M resources (e.g., a frequency resource reservation). FIG. 6A is a flow diagram illustrating a method 600 for last-minute re-evaluation and performance of an LBT with respect to a reserved set of M resources according to some aspects of the present disclosure. The method 600 may be implemented by a UE 215. As illustrated, the method 600 includes a number of enumerated actions, but aspects of the method 600 may include additional actions before, after, and in between the enumerated actions. In some aspects, one or more of the enumerated actions may be omitted or performed in a different order.

In some aspects, the UE may perform the method 600 at a T3 duration before a start time (Ts) of the frequency resource reservation (e.g., frequency resource reservation 454 of FIG. 6B). For example, the UE may be configured to perform the method 600 at the time Ts-T3. Additionally or alternatively, the method 600 may be performed based on a frequency resource reevaluation request. For instance, the MAC layer 302 may be configured to, after selecting the frequency resource reservation (e.g., action 420) and before the sidelink transmission is transmitted (e.g., action 422), transmit the frequency resource reevaluation request to the PHY layer 304. Subsequently, the UE may perform the method 600 to determine whether any resource of the reserved set of M resources may be used to transmit the sidelink transmission or whether to reschedule the sidelink transmission by, for example, transmitting a new sensing request from the MAC 302.

At a high level, during a last-minute re-evaluation at time Ts-T3, the UE may determine a subset of the set of M resources in the variable time range that are available (not reserved or preempted by another UE of a higher priority) and perform an LBT (during an LBT gap) prior to each of the available resources until an available resource with a successful LBT (preceding the resource) is found. If no available resource with a successful LBT is found, the UE may perform another resource selection.

At block 602, the UE may set a start index (i) to the slot index corresponding to a start (s) of the frequency resource reservation (e.g., to the slot index s of a beginning slot within the variable time range).

At block 604, the UE may determine whether the slot (e.g., the resource corresponding to the slot) corresponding to the start index (slot(i)) is available. For instance, the UE may perform a last-minute re-evaluation to determine whether the slot(i) has been preempted (reserved) by another UE, for example, due to the other UE having a higher priority traffic than the UE. The UE may determine the preemption based on SCI decoding from the PHY sensing and/or prediction from the PHY sensing results.

If, at block 604, the UE determines that the resource corresponding to slot(i) within the frequency resource reservation is unavailable, the UE may increment the start index i to the subsequent index at block 606. As an illustrative example, the UE may, at block 604, determine that the first resource 352a of the set of M resources 456 of FIG. 6B is unavailable.

FIG. 6B illustrates a communication scheme 650 according to some aspects of the present disclosure. The scheme 650 may be employed by the UE 215 or any other UEs such as the UEs 115 and 215. In FIG. 6B, the x-axis represents time in some arbitrary units, and the y-axis represents frequency in some arbitrary units.

With reference now to FIG. 6B and block 604 of FIG. 6A, the UE may determine that the first resource 352a is preempted by another UE (e.g., based on SCI decoding at the first resource 352a and/or prediction). Accordingly, the UE may move to the next resource (e.g., resource 352b), which corresponds to the slot with the incremented start index i. As shown, at block 606, the UE may increment the start index i. The unavailability of the first resource 352a is indicated in FIG. 6B by an 'x'.

Then, at block 608, the UE may determine whether the incremented start index (e.g., incremented at block 606) exceeds the slot indices included in the reserved set of M resources (e.g., i>=s+M−1). In this way, the UE may determine whether it has completed iterating through the slots included in the frequency resource reservation or whether additional slots remain for performing a last-minute re-evaluation (e.g., for identifying as available or unavailable).

If, at block 608, the UE determines that no slots (e.g., no resources 352) remain in the reserved set of M resources for identifying as available or unavailable (e.g., i>=s+M−1), the UE 215 may transmit a new sensing request at block 609, as described above with reference to FIG. 4A (e.g., action 410). For instance, the UE may have already determined that each slot of the frequency resource reservation is unavailable if the UE determines, at block 608, that no slots remain in the reserved set of M resources for identifying as available or unavailable. Accordingly, the UE may refrain from using the frequency resource reservation for transmission and may instead reschedule the sidelink transmission, for example, by reserving another set of M resources based on new PHY sensing results.

If, on the other hand, the UE determines, at block 608, that slots remain in the reserved set of M resources for identifying as available or unavailable (e.g., i<s+M−1), the UE 215 may proceed to determine whether the slot corresponding to the start index i is available at block 604.

Returning to block 604, if the UE determines that the resource corresponding to the slot(i) is available, the UE may, at block 610, set an end index (j) to the index of the end of a group of slots that are back-to-back with the slot(i) of the frequency resource reservation. For instance, as illustrated in FIG. 6B, in response to determining the slot(i) corresponding to the second resource 352b is available, the UE may then determine that the third resource 352c and the fourth resource 352d, which are back-to-back with the second resource 352b are also available, while the fifth resource 352e is not. Because the second, third, and fourth resources (352b-d) are contiguous, this back-to-back group of slots may be indexed between the start index i, which was previously set to the index of the second resource 352b, and the end index j, which may be set to the index of the fourth resource 352d.

At block 612, the UE may perform an LBT based on the slot(i) boundary. For instance, the UE 215 may perform the LBT in a gap preceding the slot(i) slot boundary. Accordingly, if the LBT passes (e.g., the LBT is successful), at block 614, the UE 215 may transmit a sidelink transmission beginning at the resource corresponding to the slot(i) (e.g., using the frequency resource at the slot(i) within the variable time range) at block 616. In some aspects, performing the LBT may involve performing an independent (e.g., different) LBT each time the method 600 proceeds to block 612. In other aspects, performing the LBT may involve continuing an LBT (e.g., continuing a countdown of the LBT) at block 614, as described in greater detail below with reference to FIGS. 7A and 7B.

If, on the other hand, the LBT fails (e.g., the LBT is not successful), the UE 215 may determine whether additional slots (e.g., additional resources) remain between the start index i and the end index j (e.g., whether i<j) at block 618. For instance, if an LBT corresponding to the second resource 352b of FIG. 6B fails, the UE may determine that the third resource 352c and the fourth resource 352d remain available for continuing the LBT or performing an additional LBT. If additional slots remain (e.g., i<j), the UE may increment the start index i (e.g., i++) at block 620 to repeat block 612 based on the next slot boundary.

If no available slots remain at block 618 (e.g., i>=j), the UE may determine, at block 622, whether the time of the start of the slot with the end index j is less than T3 duration from the last slot included in the reserved set of M resources 456 (e.g., j>=s+M−1−T3 in units of slots). In this way, the UE may determine whether there is time for performing a last-minute re-evaluation for any remaining slots in the frequency resource reservation after the group of back-to-back slots (the resources 352b, 352c, and 352d).

If, at block 622, the UE determines that there is no time for a last-minute reevaluation of the slots (e.g., no resources 352) remaining in the reserved set of M resources (after the resource 352d), the UE may transmit a new sensing request at block 623, as described above with reference to FIG. 4A (e.g., action 410). For instance, the UE may have already determined that each slot of the frequency resource reservation is unavailable if the UE determines, at block 622, that no slots remain in the frequency resource reservation for identifying as available or unavailable. As an illustrative example, in response to determining the end index j corresponds to the fifth resource 352e (e.g., the last resource within the set of M resources 456) of FIG. 6B, the UE may transmit a new sensing request. Accordingly, the UE may refrain from using the frequency resource reservation for transmission and may instead reschedule the sidelink transmission.

If, on the other hand, the UE determines, at block 622, that slots remain in the frequency resource reservation for identifying as available or unavailable (e.g., j<s+M−1−T3 in units of slots), the UE may proceed to set the start index i to j+T3 units of slots at block 624. The UE may then determine, at block 604, whether the slot corresponding to the updated start index i is available (by performing a last-minute reevaluation). For instance, if the set of M resources 456 illustrated in FIG. 6B included one or more resources 352 after the fifth resource 352e, the UE may continue the method 600 to determine whether the slots corresponding to the resources are available and/or to perform an LBT at any available slots.

While identification of the slots of the frequency resource reservation available to the UE for transmission is described with respect to the method 600, it may be appreciated that any suitable method may be used to identify slots of the frequency resource reservation available to the UE transmission. For example, in some aspects, the UE may perform the last-minute re-evaluation for each of the slots in the frequency resource reservation and may then perform one or more LBTs with respect to the slots identified as available after the last-minute re-evaluation. Moreover, in some aspects an LBT may be performed prior to or concurrently with a last-minute re-evaluation with respect to a slot of the frequency resource reservation.

Figure 7A:
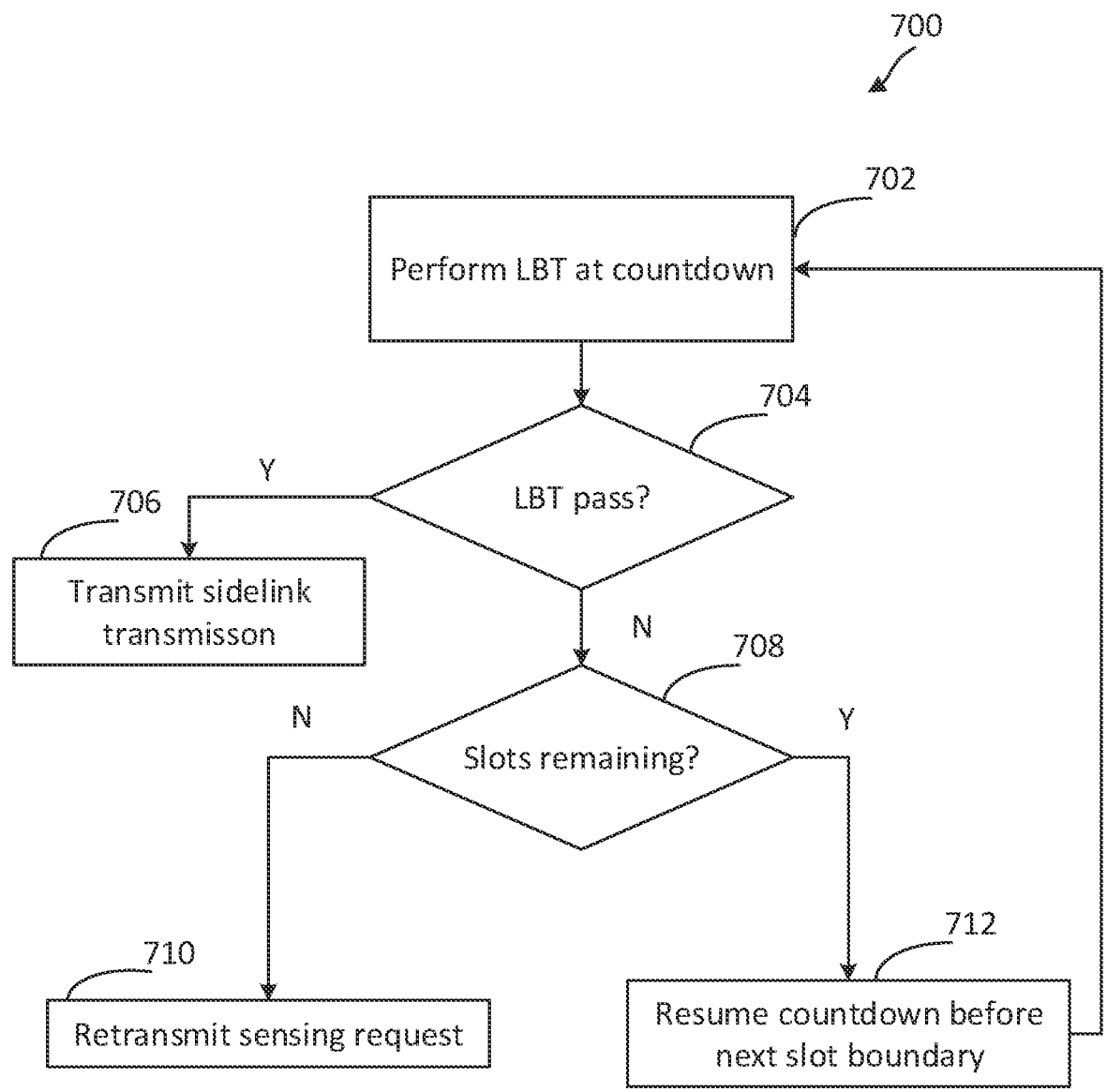
FIG. 7A is a flow diagram of a method for performing an LBT with respect to a group of back-to-back slots in a reserved frequency resource according to some aspects of the present disclosure.
Figure 7B:
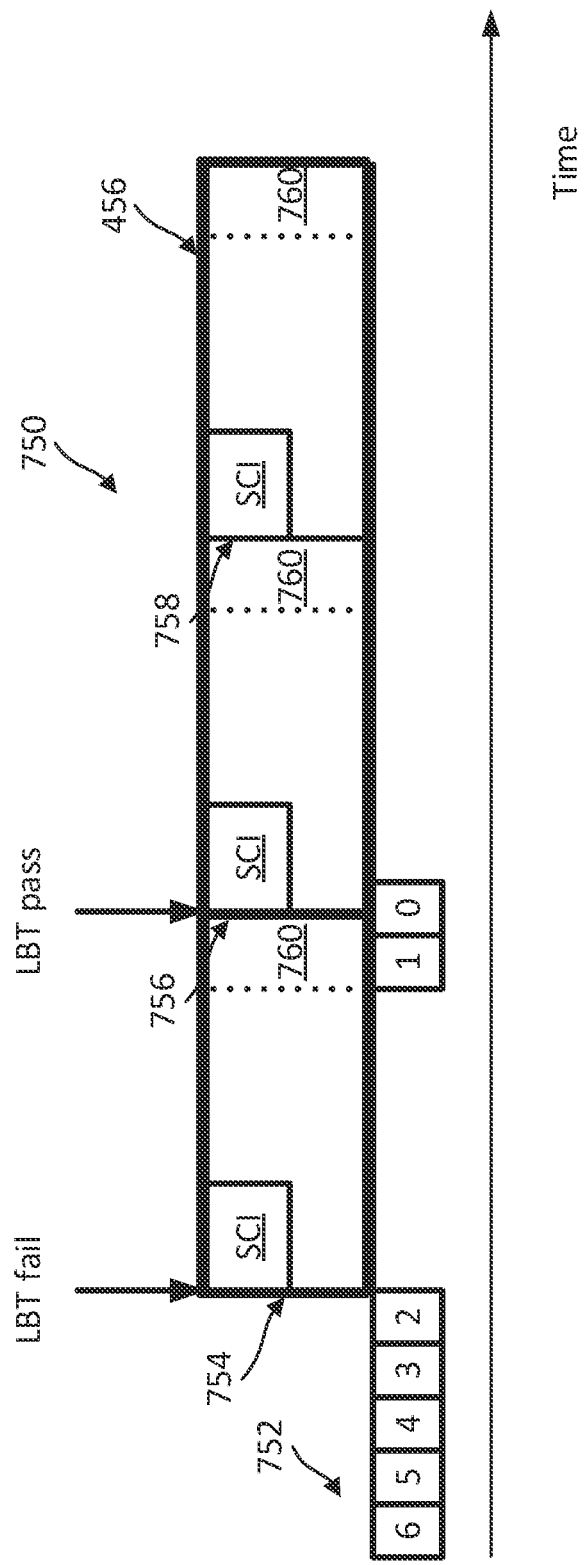
FIG. 7B is a timing diagram of one or more LBTs being performed with respect to a group of back-to-back slots in a reserved frequency resource according to some aspects of the present disclosure.

FIGS. 7A and 7B are discussed in relation to each other to illustrate performing an LBT with respect to a group of back-to-back slots reserved by a frequency resource reservation. FIG. 7A is a flow diagram illustrating a method 700 for performing an LBT with respect to a group of back-to-back slots reserved by a frequency resource reservation according to some aspects of the present disclosure. The method 700 may be implemented by a UE 215. Moreover, aspects of the method 700 may be used to perform aspects of method 600, such as blocks 612, 614, 618, and/or 620. As illustrated, the method 700 includes a number of enumerated actions, but aspects of the method 700 may include additional actions before, after, and in between the enumerated actions. In some aspects, one or more of the enumerated actions may be omitted or performed in a different order.

At block 702, the UE (e.g., UE 115, UE 215) may perform an LBT with a countdown. For instance, the UE may perform an LBT that includes a random backoff or countdown, such as a CAT4 LBT (a type 1 LBT). As described herein, the UE may perform the LBT to determine whether the UE may transmit a sidelink transmission using a frequency resource (e.g., frequency resource 455) at a slot of a variable time range. Accordingly, the UE may perform the LBT based on a slot boundary of the slot within the set of M resources. For example, the UE may perform the LBT during an LBT gap or a time immediately preceding the slot boundary. To perform the LBT, the UE may draw a random number and perform a countdown based on the drawn number. The random number may indicate a number of time units that the UE is to perform the LBT. For instance, if the channel remains idle over the number of time units, then the UE may transmit in the channel.

As an illustrative example, FIG. 7B illustrates a group 750 of available, back-to-back slots within a set of M resources 456. In FIG. 7B, the x-axis represents time in some arbitrary units. The group 750 may correspond to the slots identified as available and indexed between the start index i and the end index j described above with reference to FIGS. 6A and 6B (e.g., resources 352b-d). FIG. 7B further includes a counter 752 corresponding to the random backoff or countdown of an LBT. In some aspects, the UE may perform the LBT at a point in the countdown of the counter 752 based on a slot boundary 754 of a first slot (e.g., a first resource) in the group 750 (e.g., at block 702).

Returning to FIG. 7A, at block 704, the UE may determine whether the LBT performed at block 702 passed. For instance, the UE may determine whether the countdown was completed (e.g., reached zero) at the time of the slot boundary (when the available resource starts). The LBT may pass if the countdown was completed at the slot boundary, while the LBT may fail if the countdown was still in progress at the slot boundary. Additionally or alternatively, the LBT may pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. Conversely, the LBT results in a failure when a channel reservation signal is detected in the channel.

At the slot boundary 754 of FIG. 7B, for example, the countdown is still in progress (e.g., the counter 752 has not reached 0). Accordingly, the UE may determine, at block 704 of FIG. 7A, that the LBT performed based on the slot boundary 754 failed.

In response to determining, at block 704, that the LBT passed, the UE may transmit a sidelink transmission at block 706. More specifically, the UE may transmit the sidelink transmission using the frequency resource that starts at the slot boundary the LBT was performed based on at block 702. In this way, the UE may, based on the LBT, transmit a sidelink transmission using the frequency resource within the variable time range.

In response to determining, at block 704, that the LBT failed, the UE may determine whether any slots (e.g., resources) remain within the reserved set of M resources at block 708. More specifically, the UE may determine whether any slots remain within a group of available, back-to-back slots of the reserved by the frequency resource reservation, such as the group 750.

With respect to FIG. 7B, for example, after determining that the LBT failed based on the slot boundary 754, the UE may determine that two additional slots remain at block 708. In this way, the UE may determine that an LBT may be performed based on slot boundary 756 and/or slot boundary 758 to determine whether a sidelink transmission may be transmitted using the frequency resource within the variable time range at the slot boundary 756 and/or the slot boundary 758, respectively.

If the UE determines, at block 708, that no slots remain, the UE may retransmit a sensing request at block 710. To that end, the UE may refrain from transmitting a sidelink transmission using a group of available, back-to-back slots of the reserved by the frequency resource reservation, such as the group 750. Alternatively, in some aspects, the UE may terminate the method 700 in response to determining that no slots remain at block 708. In such cases, the UE may restart the method 700 at block 702 for a different group of back-to-back slots reserved by the same frequency resource reservation. In this way, the method 700 may be applied to each available slot of the set of M resources or may be repeated for subsets of the available slots of the set of M resources.

If, on the other hand, the UE determines that slots remain at block 708, the UE may resume the countdown based on a subsequent slot boundary at block 712. For instance, the UE may pause or place the LBT on hold after performing the LBT at block 702 and may then resume the countdown based on a different slot boundary following the LBT. In this way, the UE may perform an LBT based on the resumed countdown at block 702. To that end, the UE may perform one or more LBTs based on a set of different slot boundaries using the same countdown by pausing and resuming the LBT.

For instance, in the example shown in FIG. 7B, the countdown of the counter 752 is paused based on the LBT failing for the slot boundary 754, and the countdown of the counter 752 resumes prior to the slot boundary 756. In some aspects, the UE may resume the countdown of the counter 752 within an LBT gap 760 positioned before the slot boundary 756, as illustrated. Further, the UE may perform a LBT based on the slot boundary 756 and the resumed countdown of the counter 752 (e.g., at block 702). The UE may then determine that the LBT passes based on the slot boundary 756 and the resumed countdown of the counter 752 (e.g., at block 704) and may transmit a sidelink transmission using from the frequency resource 455 and starting from the slot boundary 756 of the variable time range 458.

While method 700 is described herein as resuming a countdown associated with an LBT, it may be appreciated that any suitable method may be used to perform one or more LBTs based on one or more slots of a reserved set of M resources. For example, in some aspects, the UE may perform an independent LBT based on each slot boundary until an LBT pass is identified. In this way, the UE may use a separate random backoff or countdown for each slot boundary.

As discussed, when reserving a resource (e.g., resource 352) and/or a set of M resources (e.g., set of M resources 456), UE 215 may identify and select from candidate resources within a sidelink resource pool 450 based on several factors. For example, the PHY layer 304 may identify candidate resources based on a combination of SCI decoding, signal measurements, and/or priority information. Moreover, while the PHY layer 304 may exclude reserved resources associated with a higher priority (e.g., based on a reservation of the reserved resources and/or a transmission associated with the reserved resources) than a priority associated with a current (e.g., active) resource selection trigger, reserved resources with an equal or lower priority may be preempted and/or shared (e.g., conditionally reserved). In this way, a first frequency resource reservation made by a first UE may be shared by reservation made by a second UE, as described in greater detail below with reference to FIGS. 8A and 8B.

Figure 8A:
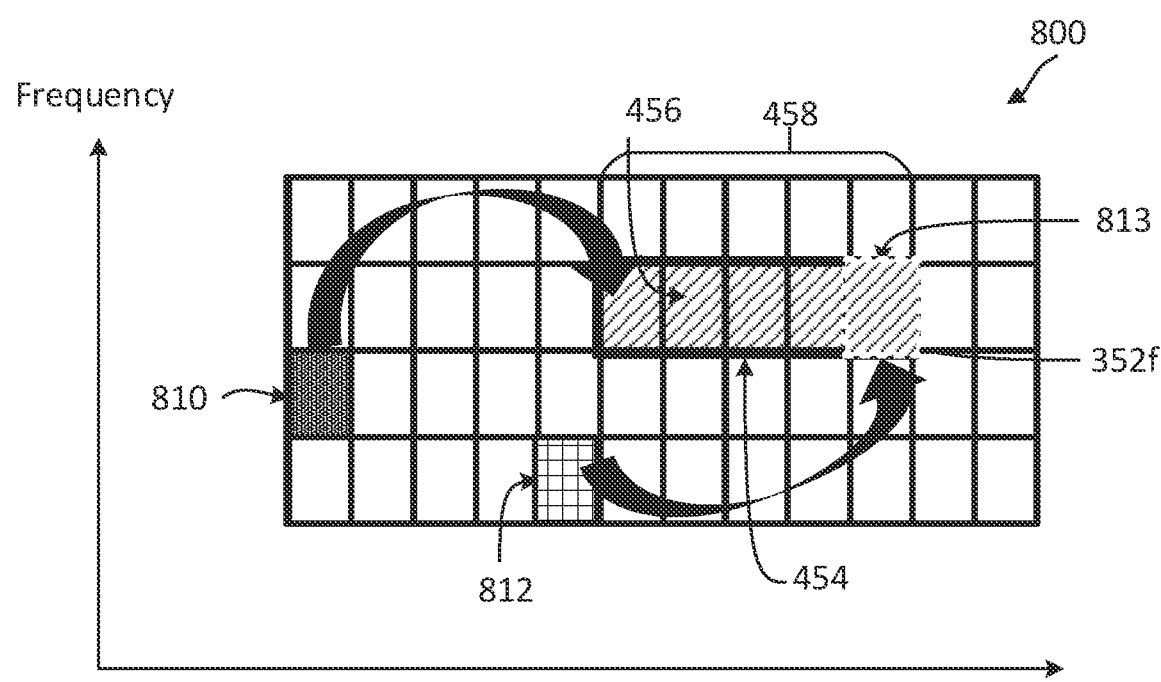
FIG. 8A illustrates reservation sharing between a frequency resource and a time-frequency resource according to some aspects of the present disclosure.
Figure 8B:
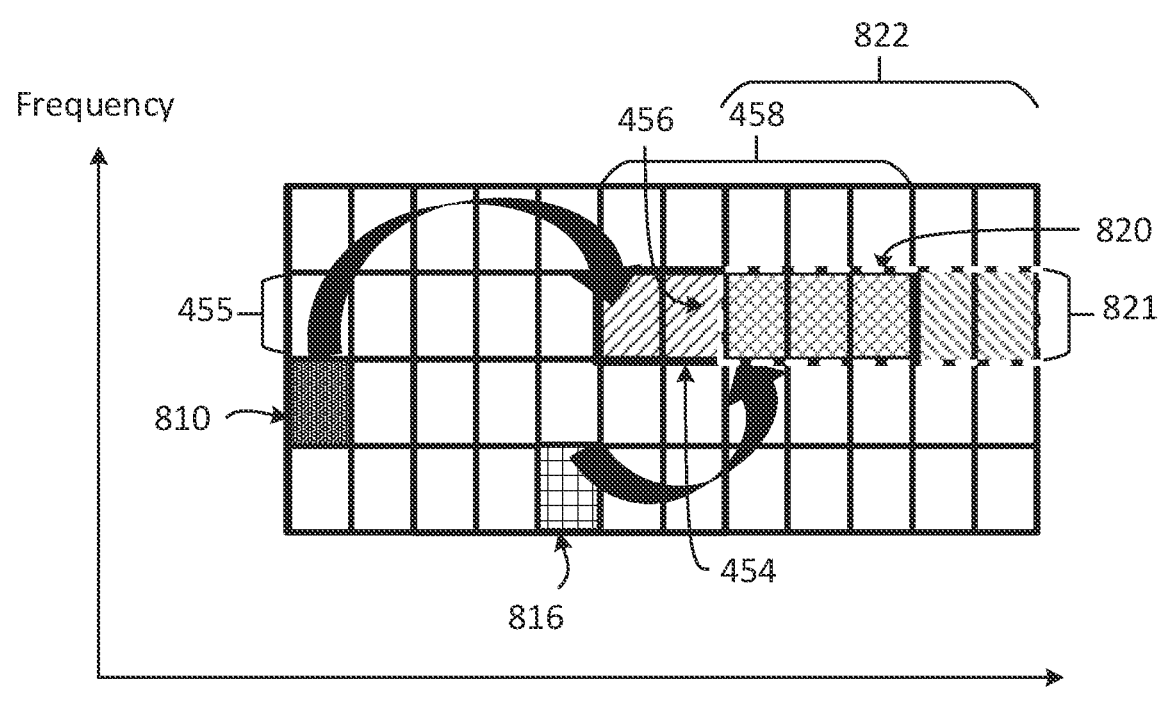
FIG. 8B illustrates reservation sharing between a first frequency resource and a second frequency resource according to some aspects of the present disclosure.

FIG. 8A illustrates reservation sharing between a frequency resource reservation 454 and a reservation of a time-frequency resource 813 (e.g., a legacy reservation), which reserves a resource with a fixed subchannel index and a fixed time/slot index. FIG. 8B illustrates reservation sharing between the frequency resource reservation 454 and a second frequency resource reservation 820, which reserves a frequency resource in a fixed subchannel over a second variable time range 822. In FIGS. 8A and 8B, the x-axis represents time in some arbitrary units, and the y-axis represents frequency in some arbitrary units. Moreover, FIGS. 8A and 8B illustrate reservation sharing between a reservation 810 identifying the frequency resource reservation 454 made by a first UE and a second, subsequent reservation (e.g., 812, 816) identifying the time-frequency resource reservation 813 and the second frequency resource reservation 820, respectively, made by a second UE.

As illustrated in FIG. 8A, a first UE may transmit the first reservation 810 identifying and reserving a set of M resources 456, as described herein. For example, the first UE may transmit the first reservation 810 after the resources within the frequency resource reservation 454 are identified as available (e.g., by the PHY layer 304) and selected (e.g., by the MAC layer 302). Moreover, in some aspects the first UE may transmit the first reservation 810 only after determining none of the resources of the set of M resources 456 are already reserved for a time-frequency resource reservation (e.g., a legacy reservation). In other aspects, the first UE may transmit the first reservation 810 only after determining none of the resources of the set of M resources 456 are already reserved for a time-frequency resource reservation that has a higher priority than a priority associated with the first reservation.

Subsequently, a second UE may transmit a second reservation 812, which may identify and reserve a time-frequency resource reservation 813. As described herein, the second UE may reserve the time-frequency resource 352f of the time-frequency resource reservation 813 according to aspects of the method 300 of FIG. 3A. For instance, the second UE may detect the first reservation 810 over the variable time range 458. The second UE may reserve the time-frequency resource 352f in the same subchannel (the frequency resource 455) as the first reservation 810 and in a slot overlapping with the variable time range 458 based on a priority associated with the frequency resource reservation 454 and/or the first reservation 810, as well as a priority associated with the resource 352f and/or the second reservation 812. If the priority associated with the frequency resource reservation 454 is lower than the priority associated with a traffic priority of the second UE, for example, the second UE may preempt the use of a slot (e.g., the slot corresponding to the resource 352f) of the set of M resources 456. Further, if the priority associated with the frequency resource reservation 454 is equal to the traffic priority of the second UE, the second UE may share reservation of a subset of the set of M resources 456 (e.g., the subset corresponding to resource 352f). In some aspects, the second UE may further determine to share the reservation based on no other UE is sharing the subset of M resources 456. In other words, the second UE may make the second reservation 812 when there is no other legacy reservation (e.g., with a fixed subchannel index and a fixed time/slot index) is detected for the subset of M resources 456.

By sharing the reservation, the second UE may use the resource 352f to transmit a sidelink transmission if it remains unused by the first UE. To that end, instead of treating each of the resources of the set of M resources 456 reserved by the frequency resource reservation 454 as unavailable (e.g., excluding the resources from the candidate resources), the second UE may treat the resources of the set of M resources 456 as conditionally available. More specifically, the frequency resource reservation 454 includes a number of slots within the variable time range 458, which may create redundancy. However, the first UE may transmit the sidelink transmission using the frequency resource 455 within a subset of slots within the variable time range 458, leaving an otherwise unused portion of the frequency resource reservation 454. Accordingly, the second UE may reserve the resource 352f so that the resource 352f may be used by the second UE, if available. Further, in some aspects, the first UE may ignore the second reservation 812 during a last-minute re-evaluation (e.g., block 604 of method 600). Thus, the first UE may still use the resource 352f for sidelink transmission, if necessary.

In some aspects, the second UE may share the reservation when the second UE (the reservation 813 of the second UE) has a lower traffic priority than the first UE (reservation 454), but the reservation of the second UE may be restricted to later slots within the variable time range 458 of the reservation 454. In this regard, if the priority associated with the frequency resource reservation 454 is greater than priority associated with the resource reservation 813, the second UE may share reservation of the resource 352f as generally described above. However, the shared reservation may be restricted to resources at the end of the set of M resources 456 (e.g., within the last 1, 2, 3, slots of the variable time range 458 and/or the like). The resources within the set of M resources 456 available for shared reservation with a lower priority reservation may be preconfigured in the first and/or second UE and/or may depend on information included in the SIB, the RRC configuration, and/or determined based on a CBR estimate.

FIG. 8B illustrates, the first reservation 810 transmitted by the first UE for the frequency resource reservation 454, as well as a second reservation 816 transmitted by a second UE for a second frequency resource reservation 820 over a variable time range 822. The second UE may transmit the second reservation 816 as generally described above with reference to FIG. 8A and the second reservation 812. In this way, the second UE may preempt the first frequency reservation 454 based on a higher-priority second frequency resource reservation 820 and may share a portion of the first frequency resource reservation 454 based on an equal or lower priority second frequency resource reservation 820 with respect to the first frequency resource reservation 454. To that end, the variable time range 822 of the second frequency resource reservation 820 may overlap the variable time range 458 of the frequency resource reservation 454. Further, in some aspects, the second UE may be configured to only partially overlap the frequency resource reservation (e.g., share a portion instead of the entirety of the frequency resource reservation 454) when the second frequency resource reservation 820 is associated with the same priority as the first frequency resource reservation 454. Moreover, in the case of the lower priority second frequency resource reservation 820, the partial overlap may be restricted to slots at the end of the frequency resource reservation 454, as described above. By only partially overlapping with the frequency resource reservation 454, the second UE may increase the likelihood that the second UE may transmit a sidelink transmission using the second frequency resource 821 within the second variable time range 822. Alternatively, the second UE may be configured to share all of the first frequency resource reservation 454 with the second frequency resource reservation 820 in the case that the priorities associated with the first and second reservations (e.g., 810 and 816, respectively) are equal.

In some aspects, the second UE may also be configured to share reservation of one or more resources of the first set of M resources 456 based on determining that the one or more resources are not already shared or preempted by another UE (e.g., for a third frequency resource reservation or a time-frequency resource reservation). In this way, reservation of a particular resource of the first frequency resource reservation may only be shared by the first UE and one other device.

Figure 9A:
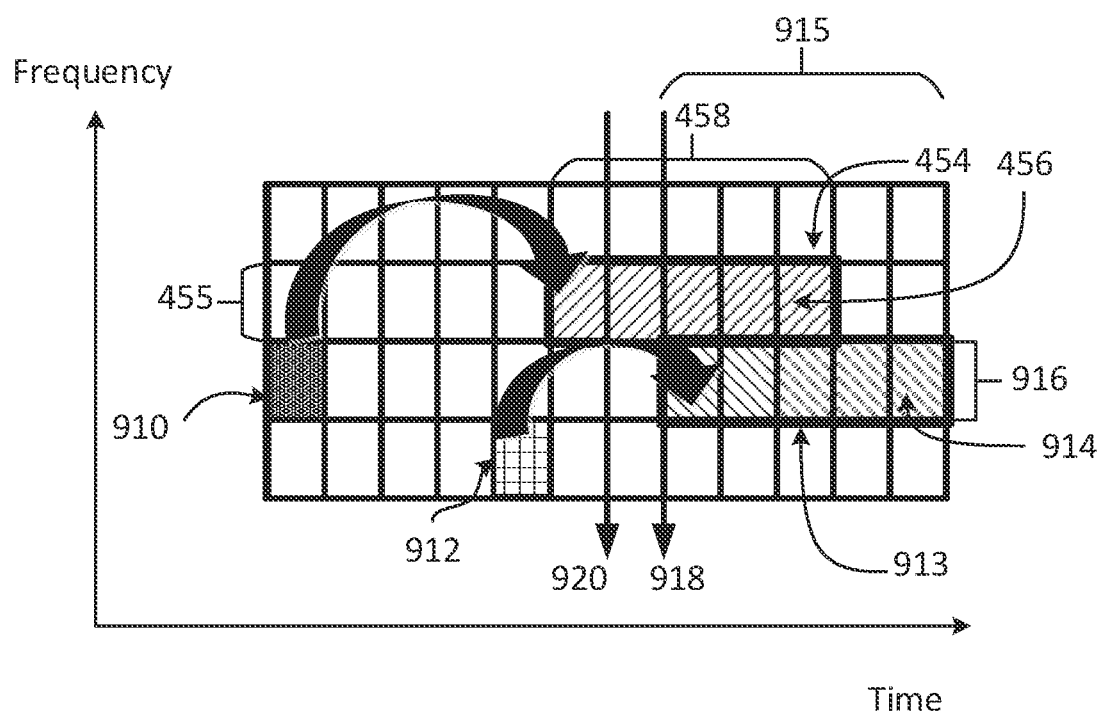
FIG. 9A illustrates reservation clustering between a first frequency resource and a second frequency resource according to some aspects of the present disclosure.
Figure 9B:
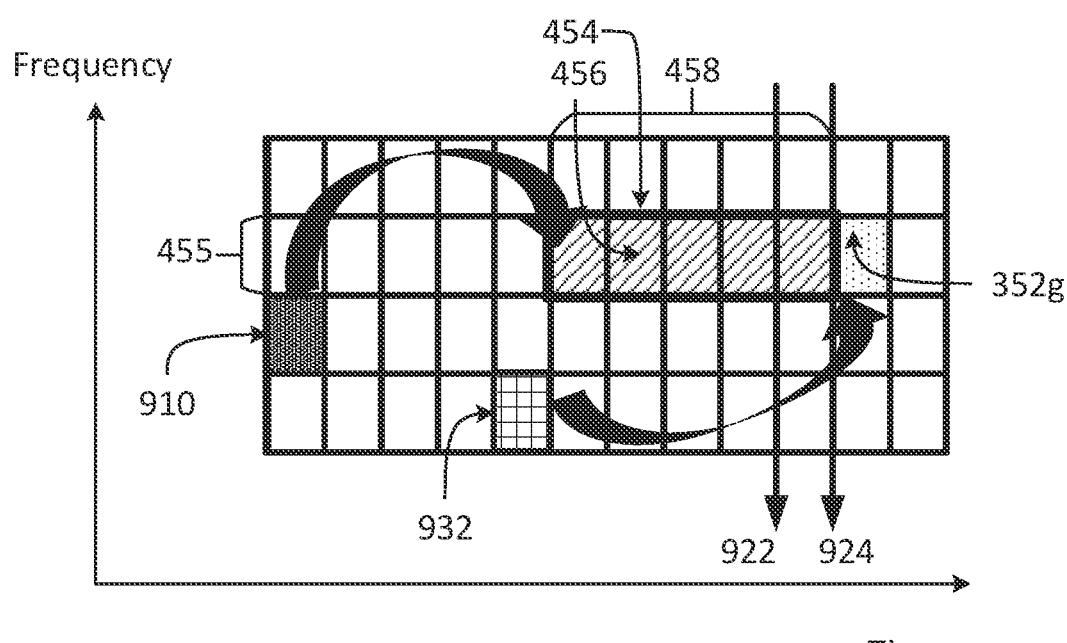
FIG. 9B illustrates reservation clustering between a first frequency resource and a time-frequency resource according to some aspects of the present disclosure.
Figure 9C:
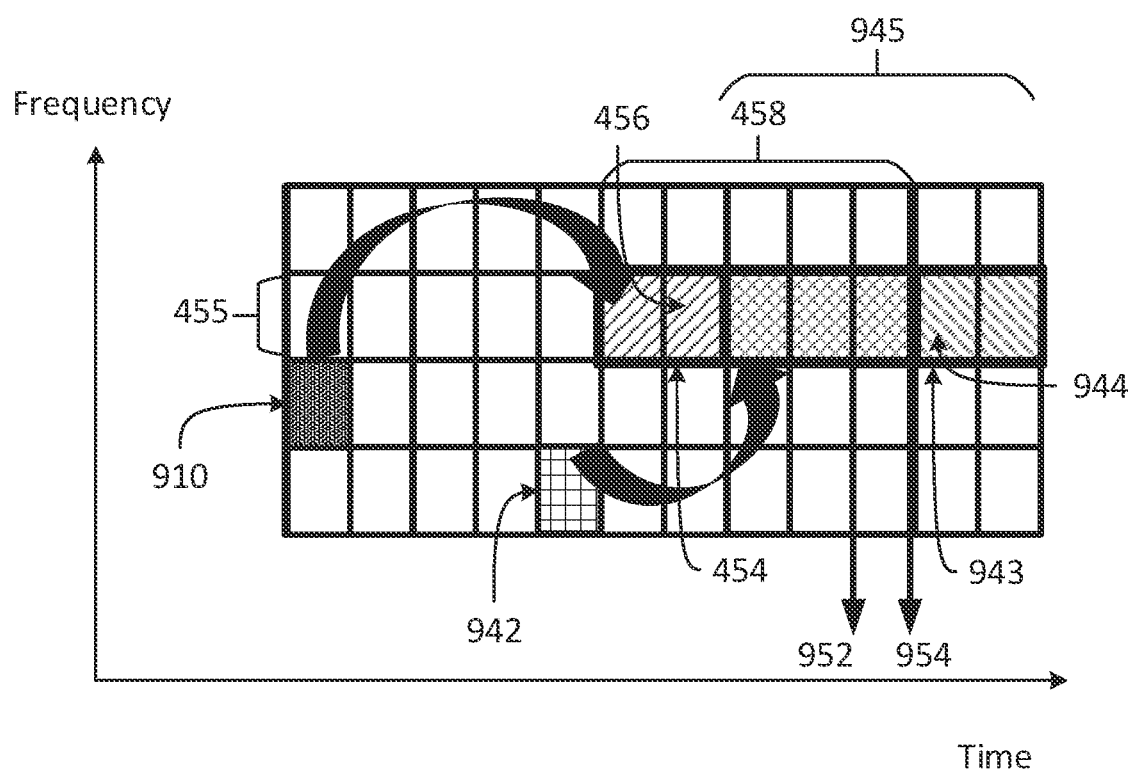
FIG. 9C illustrates reservation clustering between a first frequency resource and a second frequency resource according to some aspects of the present disclosure.

FIGS. 9A-C illustrate reservation clustering for reservations corresponding to different TBs made by the same UE (e.g., UE 215). In FIGS. 9A-9C, the x-axis represents time in some arbitrary units, and the y-axis represents frequency in some arbitrary units. FIGS. 9A-C are illustrated using a similar resource and/or reservation configuration as in FIG. 4B and may use the same reference numerals for simplicity's sake.

In some aspects, the UE 215 may transmit a first reservation 910 identifying and reserving a first set of M resources 456 for transmitting a first TB, as described herein. For example, the UE may transmit the first reservation 910 after the resources within the first frequency reservation 454 are identified as available (e.g., by the PHY layer 304) and selected (e.g., by the MAC layer 302). After the first reservation 910 is transmitted and/or after the first set of M resources 456 is selected, the UE may prepare to transmit a second reservation 912 corresponding to a second frequency resource reservation 913 for a second set of M resources 914 within a variable time range 915 or corresponding to a time-frequency resource (e.g., a legacy reservation) for transmitting a different, second TB (carrying different information bits than the first TB). In some aspects, the UE may identify and/or select the resources for the second frequency reservation 912 based on the first reservation 910 and/or the first set of M resources 456. For instance, the UE may select the resources corresponding to the second reservation 912 so that they are clustered with (e.g., positioned adjacent to (in the time or frequency domain) or overlap with) at least a subset of the first set of M resources 456. By clustering the second set of M resources 914, as illustrated, and/or a time-frequency resource with the first set of M resources 456, the UE may reduce the number of LBTs performed to transmit a first and second TB (e.g., a first and a second sidelink transmission) using the first and second resources, respectively. In this way, the clustering may improve robustness with respect to LBT.

FIG. 9A illustrates clustering resource selection for frequency resource reservation using frequency division multiplexing (FDM) techniques. To that end, FIG. 9A illustrates clustering a first set of M resources 456 corresponding to a first reservation 910 and a second set of M resources 914 corresponding to a second reservation 912 so that they correspond to respective subchannels that are adjacent to one another in the frequency domain (e.g., adjacent frequency resources 455 and 916, respectively). To achieve such frequency and/or subchannel clustering, the MAC layer 302 may be configured to perform a clustered resource selection instead of the random resource selection described above. In this way, the MAC layer 302 may filter and select resources within subchannels adjacent to the subchannel corresponding to the first set of M resources 456. By clustering resources, such as the illustrated first set of M resources 456 and the second set of resources 914, the UE may cluster transmission of the first and second TB over the same slot. For example, the UE may transmit the first and second TB starting from slot boundary 918 using the first frequency resource 455 and the second frequency resource 916, respectively.

In some aspects, to cluster transmission of the first and second TB over the same slot, the UE may be configured to perform a self-deferral following a LBT pass. For instance, suppose the first UE determines that an LBT associated with the slot boundary 920 passes. In some aspects, the UE may perform a self-deferral so that instead of transmitting the first TB from the slot boundary 920, the UE waits until the slot boundary 918 to transmit both the first TB and the second TB (e.g., using the first frequency resource 455 and the second frequency resource 916, respectively). However, by performing the self-deferral, the UE may risk losing the transmission opportunity associated with the LBT pass. For instance, traffic may appear between the LBT pass and the slot boundary 918, which may prevent the UE from transmitting at the slot boundary 918. Accordingly, in other aspects, the UE may be configured to transmit a sidelink transmission at the earliest opportunity.

FIG. 9B illustrates clustering resource selection for resource reservation using time division multiplexing (TDM) techniques. To that end, FIG. 9B illustrates clustering resources corresponding to a first reservation 910 and resources corresponding to a second reservation 912 so that they correspond to the same subchannel and are positioned within slots that are adjacent to one another in the time domain. To achieve such time-based clustering, the MAC layer 302 may be configured to perform a clustered resource selection instead of the random resource selection described above. In this way, the MAC layer 302 may filter and select resources within the same subchannel as the first set of M resources 456 (e.g., corresponding to the frequency resource 455) and within a slot or group of slots that are adjacent to the variable time range 458. As shown, the second reservation 912 reserves a resource 352g in a slot adjacent to the last slot of the set of M resources 456.

FIG. 9C illustrates overlapping clustering. To that end, FIG. 9C illustrates clustering resources corresponding to a first reservation 910 and resources corresponding to a second reservation 912 so that they at least partially overlap. To achieve such overlapping clustering, the MAC layer 302 may be configured to perform a clustered resource selection instead of the random resource selection described above. In this way, the MAC layer 302 may filter and select at least some resources that correspond to the set of M resources 456 of the first frequency resource reservation 454. For instance, the MAC layer 302 made a second reservation 942 for a frequency resource in the same subchannel as the frequency resource 455 as the first reservation 910, but over a different variable time range 945 (shown by the set of resources 944) that partially overlaps with the variable time range 458.

By clustering resources in time, as illustrated in at least FIGS. 9B and 9C, the UE may transmit the first and second TB over the different slots. Moreover, in some aspects, the UE may reduce the number of LBTs used to transmit the first and second TB. For instance, after identifying a passing LBT corresponding to a slot boundary of the variable time range 458, such as the slot boundary 922 in FIG. 9B or the slot boundary 952 in FIG. 9C, the UE may transmit the first TB. Further, after transmitting the first TB, the UE may continue using the same subchannel and the second resource (e.g., second time-frequency resource or second set of M resources) to transmit the second TB at the slot boundary 924 in FIG. 9B and the slot boundary 954 in FIG. 9C without performing another LBT. Additionally or alternatively, in some aspects, the UE may pause a countdown corresponding to a failed LBT based on the slot boundary 922 and may continue the countdown based on the slot boundary 924 shown in FIG. 9B, as described above with respect to method 700. Similarly, the UE may pause a countdown corresponding to a failed LBT based on the slot boundary 952 and may continue the countdown based on the slot boundary 954 shown in FIG. 9C, as described above with respect to method 700.

Figure 10:
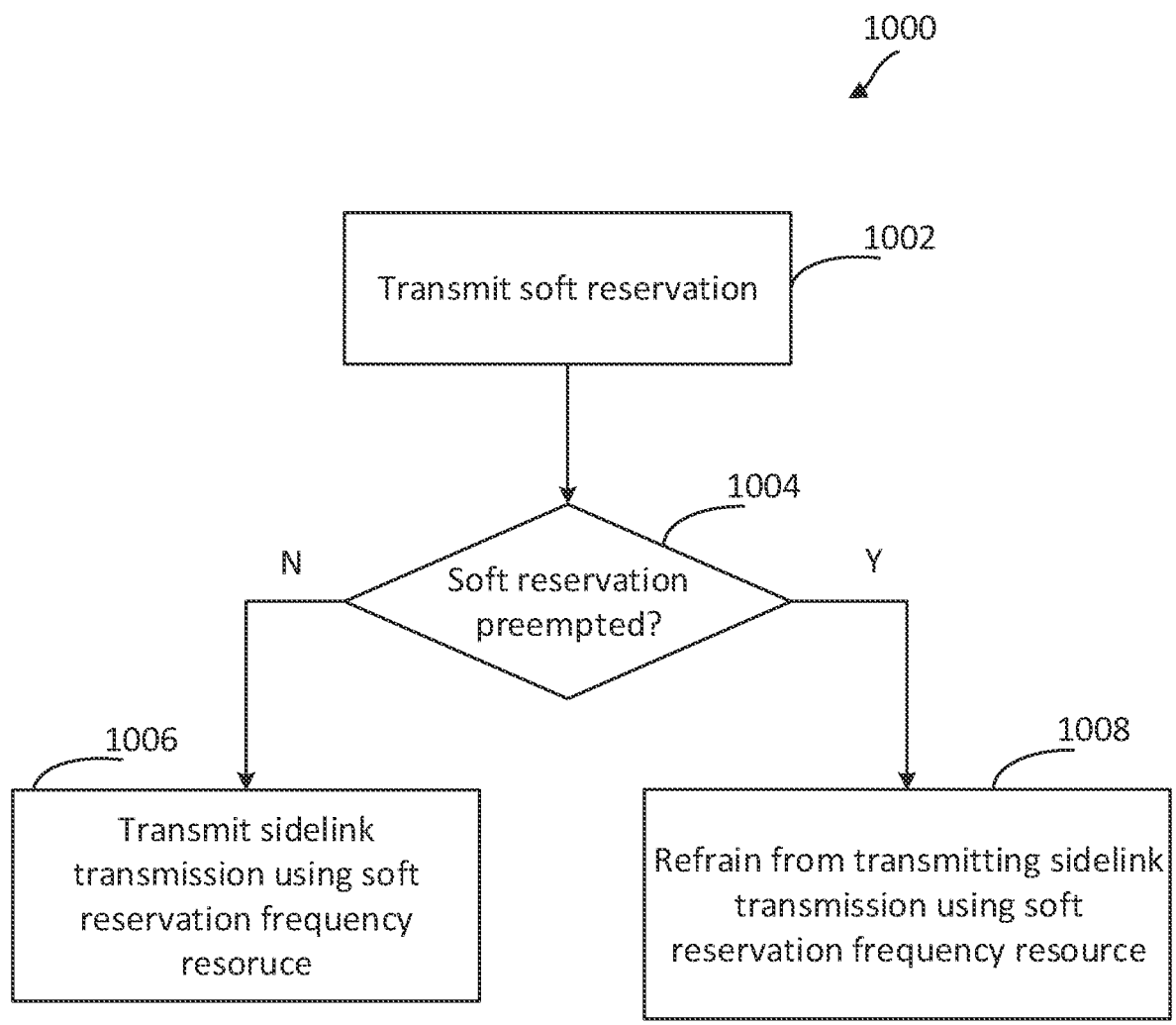
FIG. 10 is a flow diagram illustrating a method for transmitting a soft reservation for a frequency resource according to some aspects of the present disclosure.

Turning now to FIG. 10, a flow diagram of a method 1000 for transmitting a soft reservation is illustrated. The method 1000 may be implemented by a UE 215. As illustrated, the method 1000 includes a number of enumerated actions, but aspects of the method 1000 may include additional actions before, after, and in between the enumerated actions. In some aspects, one or more of the enumerated actions may be omitted or performed in a different order.

As used herein, the term "soft reservation" may refer to a reservation for transmission of a second transport block that accompanies a reservation for a transmission of a first transport block and/or a retransmission of the first transport block. For instance, a UE may reserve a resource, such as a set of M resources 456, using the techniques described herein. Moreover, while reserving the resource, the UE may schedule a retransmission, such as a HARQ retransmission, a duration after the resource. In some aspects, the UE may additionally be configured to transmit a second TB following transmission of the first transmission of the first TB. For example, the UE may include data queued for transmission in the second TB at the time the reservation for the first TB is being made. Accordingly, instead of waiting until reservation of the resource for the transmission of the first TB is completed to reserve a resource for transmission of the second TB, the UE may transmit a soft reservation corresponding to the second TB along with the reservation corresponding to the first TB, as described in greater detail below.

At block 1002, the UE may transmit a soft reservation. The UE may transmit the soft reservation along with or within a reservation (e.g., a hard reservation) for a frequency resource (e.g., frequency resource reservation 454). While the reservation may identify a first set of M resources, which may correspond to a frequency resource within a variable time range, suitable for transmission or retransmission of a first TB, the soft reservation may identify a second set of M resources, which may correspond to a second frequency resource within a second variable time range, suitable for transmission of a different, second TB. According to some aspects, the UE may identify and/or select the second set of M resources from among the same candidate resources the UE identifies and/or selects the first set of M resources.

For instance, the MAC layer 302 of the UE 215 may transmit a resource selection trigger to the PHY layer, and, in response, the PHY layer 304 may identify candidate resources and transmit a candidate resource report to the MAC layer 302, as described herein with reference to FIG. 4A. Subsequently, the MAC layer 302 may filter the candidate resources to select the first set of M resources. From the remaining candidate resources, the MAC layer 302 may then select the second set of M resources. After selecting both the first set of M resources and the second set of M resources, the UE 215 may transmit a reservation (e.g., a reservation message or SCI). The reservation may include information identifying the first set of M resources, as well as the soft reservation, which may include information identifying the second set of M resources. In some aspects, the UE may transmit the reservation and the soft reservation separately (in different SCI).

After transmitting the soft reservation, the UE may determine whether the soft reservation was preempted (reserved by a higher priority UE) at block 1004. For instance, the UE may determine whether another UE has preempted use of the second set of M resources associated with the soft reservation. If the UE determines that the soft reservation is not preempted at block 1004, the UE may transmit the sidelink transmission corresponding to the second TB using the second set of M resources (e.g., using a second frequency resource within a second variable time range), which corresponds to the soft reservation, at block 1006. Further, in some aspects, the UE may transmit the sidelink transmission using a first subset of slots in the second variable time range if the UE determines that only resources corresponding to a different second subset of the slots in the second variable time range were preempted.

If, at block 1004, the UE determines that the soft reservation was preempted, the UE may refrain from transmitting the sidelink transmission corresponding to the second TB using the second set of M resources at block 1008. In other aspects, the UE may only refrain from transmitting the sidelink transmission using the resources corresponding to the preempted subset of slots of the second variable time range, such as the second subset described above.

Figure 11:
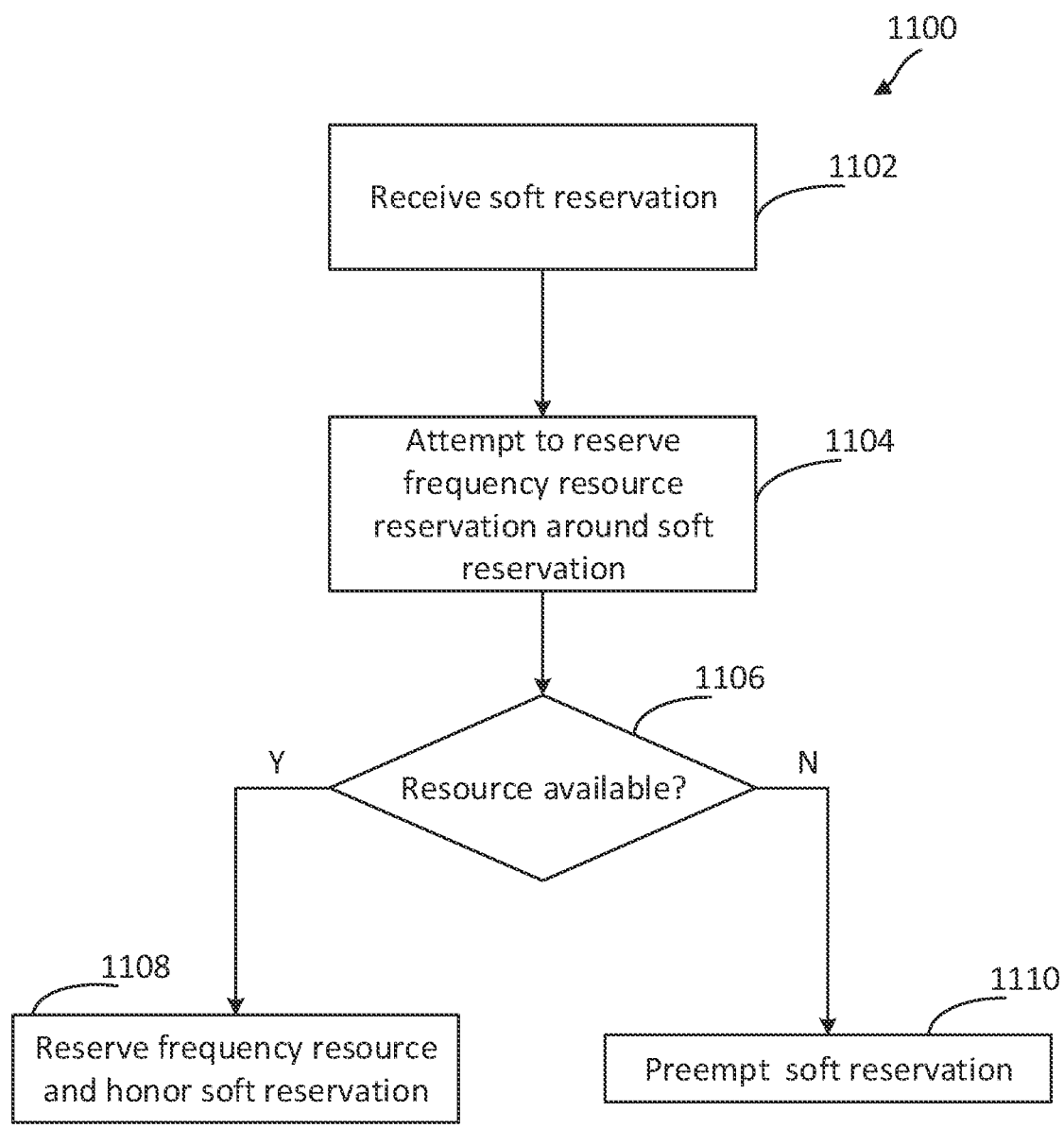
FIG. 11 is a flow diagram illustrating a method for receiving a soft reservation for a frequency resource according to some aspects of the present disclosure.

FIG. 11 illustrates a flow diagram of a method 1100 for receiving or detecting a soft reservation is illustrated. The method 1100 may be implemented by a UE 215. As illustrated, the method 1100 includes a number of enumerated actions, but aspects of the method 1100 may include additional actions before, after, and in between the enumerated actions. In some aspects, one or more of the enumerated actions may be omitted or performed in a different order.

At block 1102, a UE may receive a soft reservation. For example, a first UE may receive and/or identify a soft reservation transmitted by a second UE. In some aspects the first UE may identify the soft reservation based on SCI decoding or any suitable method.

At block 1104, the UE may be configured to attempt to reserve a frequency resource reservation around the soft reservation. For example, to transmit a sidelink transmission (e.g., a transport block), the UE may be configured to reserve the frequency resource and may attempt to reserve the frequency resource using a set of M resources within a variable time range that do not preempt the soft reservation. In this way, the UE may make a best effort to avoid preempting the soft reservation. For instance, in response to a resource selection trigger associated with the sidelink transmission, the PHY layer 304 may be configured to identify candidate resources that exclude the set of M resources identified by the soft reservation.

At block 1106, the UE may determine whether resources are available to reserve the frequency resource (e.g., reserve the set of M resources) around the soft reservation. For example, the MAC layer 302 may determine whether the number of sets of candidate resources identified by the PHY layer 304 satisfies (e.g., meets or exceeds) a threshold, as described above with reference to FIG. 4A.

If the UE determines, at block 1106, that there are sufficient resources to reserve the frequency resource, the UE may reserve the frequency resource at block 1108. In such cases, the UE may avoid preempting the soft reservation. In other words, the UE may honor the soft reservation by reserving the frequency resource using resources that are different from the resources identified by the soft reservation.

If, on the other hand, the UE determines that there are not sufficient resources to reserve the frequency resource at block 1106, the UE may preempt the soft reservation or a portion (e.g., a subset of the slots) of the soft reservation at block 1110. According to some aspects, the UE may determine, at block 1110, whether there are sufficient resources to reserve the frequency resource if at least a portion of the second frequency resource corresponding to the soft reservation is preempted. If so, the UE may reserve the frequency resource by preempting at least a subset of the second set of M resources. Additionally or alternatively, in response to determining that there are not sufficient resources to reserve the frequency resource at block 1106, the UE may relax (e.g., reduce) the threshold used at block 1106.

In some aspects, a UE 215 may utilize any suitable combinations of the frequency resource reservation discussed above in relation to FIGS. 4A-4B and 5, the last-minute re-evaluation and performance of one or more LBTs discussed above in relation to FIGS. 6A-6B, the performance of one or more LBTs for a group of slots in a variable time range discussed above in relation to FIGS. 7A-7B, the frequency resource reservation sharing between two UEs discussed above in relation to FIGS. 8A-8B, the frequency resource reservation clustering discussed above in relation to FIGS. 9A-9C, and/or the soft reservation discussed above in relation to FIGS. 10-11.

Figure 12:
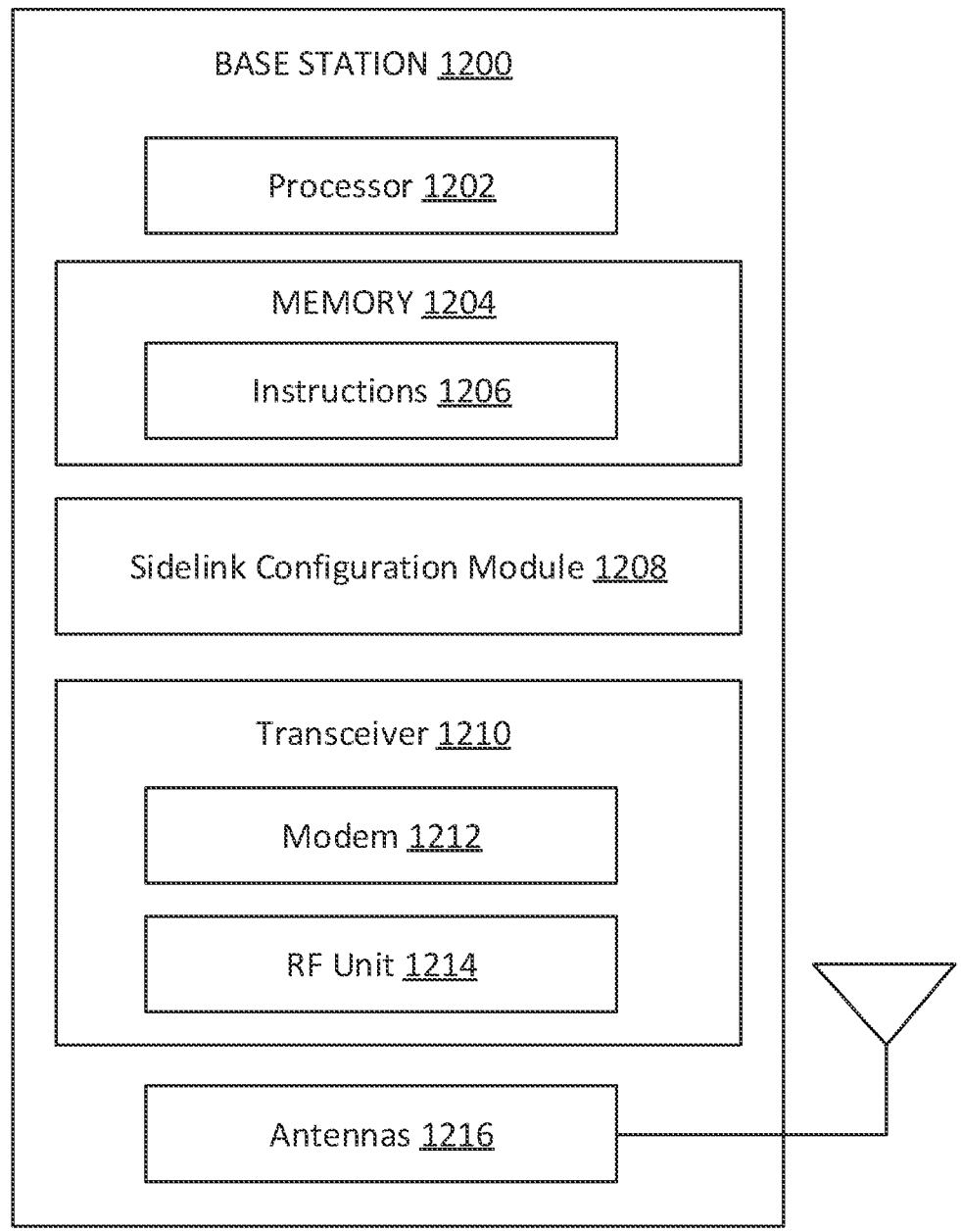
FIG. 12 is a block diagram of an exemplary base station (BS) according to some aspects of the present disclosure.

FIG. 12 is a block diagram of an exemplary BS 1200 according to some aspects of the present disclosure. The BS 1200 may be a BS 105 in the network 100 as discussed above in FIG. 1. A shown, the BS 1200 may include a processor 1202, a memory 1204, a sidelink configuration module 1208, a transceiver 1210 including a modem subsystem 1212 and a RF unit 1214, and one or more antennas 1216. These elements may be in direct or indirect communication with each other, for example via one or more buses.

The processor 1202 may have various features as a specific-type processor. For example, these may include a CPU, a DSP, an ASIC, a controller, a FPGA device, another hardware device, a firmware device, or any combination thereof configured to perform the operations described herein. The processor 1202 may also be implemented as a combination of computing devices, e.g., a combination of a DSP and a microprocessor, a plurality of microprocessors, one or more microprocessors in conjunction with a DSP core, or any other such configuration.

The memory 1204 may include a cache memory (e.g., a cache memory of the processor 1202), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1204 may include a non-transitory computer-readable medium. The memory 1204 may store instructions 1306. The instructions 1306 may include instructions that, when executed by the processor 1202, cause the processor 1202 to perform operations described herein, for example, aspects of FIGS. 1-2. Instructions 1306 may also be referred to as program code. The program code may be for causing a wireless communication device to perform these operations, for example by causing one or more processors (such as processor 1202) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The sidelink configuration module 1208 may be implemented via hardware, software, or combinations thereof. For example, the sidelink configuration module 1208 may be implemented as a processor, circuit, and/or instructions 1306 stored in the memory 1204 and executed by the processor 1202. In some examples, the sidelink configuration module 1208 can be integrated within the modem subsystem 1212. For example, the sidelink configuration module 1208 can be implemented by a combination of software components (e.g., executed by a DSP or a general processor) and hardware components (e.g., logic gates and circuitry) within the modem subsystem 1212.

The sidelink configuration module 1208 may communicate with one or more components of the BS 1200 to perform for various aspects of the present disclosure, for example, aspects of FIGS. 1-2. The sidelink configuration module 1208 is configured to configure a UE (e.g., the UEs 115, 215) with a sidelink configuration (e.g., a sidelink resource pool 450) for sidelink communications and/or a configuration for the size M of the variable time range while the UE is in a coverage of the BS 1200.

As shown, the transceiver 1210 may include the modem subsystem 1212 and the RF unit 1214. The transceiver 1210 can be configured to communicate bi-directionally with other devices, such as the UEs 115 and/or another core network element. The modem subsystem 1212 may be configured to modulate and/or encode data according to a MCS, e.g., a LDPC coding scheme, a turbo coding scheme, a convolutional coding scheme, a digital beamforming scheme, etc. The RF unit 1214 may be configured to process (e.g., perform analog to digital conversion or digital to analog conversion, etc.) modulated/encoded data (e.g., RRC configuration, sidelink resource pool configurations, frequency-only resource reservation configuration) from the modem subsystem 1212 (on outbound transmissions) or of transmissions originating from another source such as a UE 115. The RF unit 1214 may be further configured to perform analog beamforming in conjunction with the digital beamforming. Although shown as integrated together in transceiver 1210, the modem subsystem 1212 and/or the RF unit 1214 may be separate devices that are coupled together at the BS 105 to enable the BS 105 to communicate with other devices.

The RF unit 1214 may provide the modulated and/or processed data, e.g. data packets (or, more generally, data messages that may contain one or more data packets and other information), to the antennas 1216 for transmission to one or more other devices. This may include, for example, transmission of information to complete attachment to a network and communication with a camped UE 115 according to some aspects of the present disclosure. The antennas 1216 may further receive data messages transmitted from other devices and provide the received data messages for processing and/or demodulation at the transceiver 1210. The transceiver 1210 may provide the demodulated and decoded data to the sidelink configuration module 1208 for processing. The antennas 1216 may include multiple antennas of similar or different designs in order to sustain multiple transmission links.

In an aspect, the BS 1200 can include multiple transceivers 1210 implementing different RATs (e.g., NR and LTE). In an aspect, the BS 1200 can include a single transceiver 1210 implementing multiple RATs (e.g., NR and LTE). In an aspect, the transceiver 1210 can include various components, where different combinations of components can implement different RATs.

Figure 13:
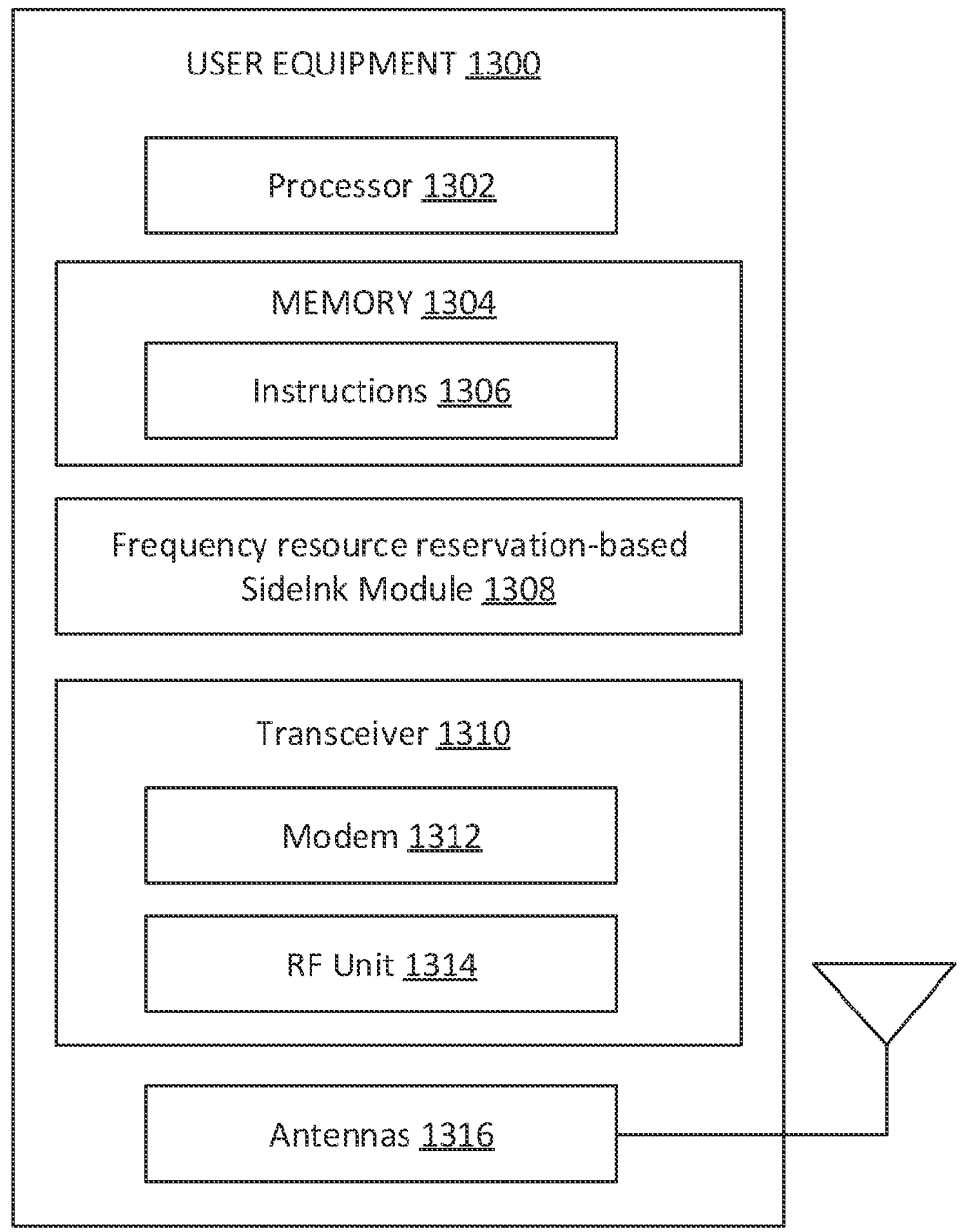
FIG. 13 is a block diagram of an exemplary user equipment (UE) according to some aspects of the present disclosure.

FIG. 13 is a block diagram of an exemplary UE 1300 according to some aspects of the present disclosure. The UE 1300 may be a UE 115 as discussed above with respect to FIG. 1 or a UE 215 as discussed above with respect to FIGS. 2, 3A-3B, 4A-4B, 5, 6A-6B, 7A-7B, 8A-8B, 9A-9C, 10, and 11. As shown, the UE 1300 may include a processor 1302, a memory 1304, a frequency resource reservation-based sidelink module 1308, a transceiver 1310 including a modem subsystem 1312 and a radio frequency (RF) unit 1314, and one or more antennas 1316. These elements may be in direct or indirect communication with each other, for example via one or more buses.

The processor 1302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1302 may also be implemented as a combination of computing devices, e.g., a combination of a DSP and a microprocessor, a plurality of microprocessors, one or more microprocessors in conjunction with a DSP core, or any other such configuration.

The memory 1304 may include a cache memory (e.g., a cache memory of the processor 1302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1304 includes a non-transitory computer-readable medium. The memory 1304 may store, or have recorded thereon, instructions 1306. The instructions 1306 may include instructions that, when executed by the processor 1302, cause the processor 1302 to perform the operations described herein with reference to the UEs 115 and/or 215 in connection with aspects of the present disclosure, for example, aspects of FIGS. 2, 3A-3B, 4A-4B, 5, 6A-6B, 7A-7B, 8A-8B, 9A-9C, 10, 11, and 14. Instructions 1306 may also be referred to as program code, which may be interpreted broadly to include any type of computer-readable statement(s) as discussed above with respect to FIG. 12.

The frequency resource reservation-based sidelink module 1308 may be implemented via hardware, software, or combinations thereof. For example, the frequency resource reservation-based sidelink module 1308 may be implemented as a processor, circuit, and/or instructions 1306 stored in the memory 1304 and executed by the processor 1302. In some examples, the frequency resource reservation-based sidelink module 1308 can be integrated within the modem subsystem 1312. For example, the frequency resource reservation-based sidelink module 1308 can be implemented by a combination of software components (e.g., executed by a DSP or a general processor) and hardware components (e.g., logic gates and circuitry) within the modem subsystem 1312.

The frequency resource reservation-based sidelink module 1308 may communicate with one or more components of the UE 1300 to perform for various aspects of the present disclosure, for example, aspects of FIGS. 2, 3A-3B, 4A-4B, 5, 6A-6B, 7A-7B, 8A-8B, 9A-9C, 10, 11, and 14. In some aspects, the frequency resource reservation-based sidelink module 1308 is configured to reserve a frequency resource within an instance of a variable time range, for example, as discussed above in relation to FIGS. 4A-4B, 5, 8A-8B, 9A-9C, 10, and 11.

The frequency resource reservation-based sidelink module 1308 is further configured to sense in a sidelink resource pool within a shared radio frequency band. The sensing or monitoring may include decoding SCI and/or measuring signal energy in the channel. The frequency resource reservation-based sidelink module 1308 may be configured to blindly decode SCI from a PSCCH of each resource, record the decoded SCI upon a successful decoding, determine a signal measurement (e.g., RSRP and/or a RSSI) for each resource, and record the signal measurements.

The frequency resource reservation-based sidelink module 1308 is further configured to reserve the frequency resource within the instance of the variable time range, based on the sensing. For instance, the frequency resource reservation-based sidelink module 1308 may be configured to identify and select time-contiguous resources (e.g., a set of M resources) identified as available based on the sensing. The frequency resource reservation-based sidelink module 1308 may then transmit a reservation message identifying the selected resources (e.g., identifying a subchannel and/or a slot index associated with the resources) to reserve the frequency resource within the variable time range as discussed above in relation to FIGS. 4A-4B and 5.

The frequency resource reservation-based sidelink module 1308 is further configured to perform, in the shared radio frequency band, one or more LBTs. To that end, the frequency resource reservation-based sidelink module 1308 may be configured to perform the LBTs based on one or more slot boundaries within the instance of the variable time range to identify a slot within the frequency resource available for the transmission of a sidelink transmission as discussed above in relation to FIGS. 6A-6B and 7A-7B.

In some aspects, the frequency resource reservation-based sidelink module 1308 is further configured to perform reservation sharing with another UE (e.g., UEs 115, 215, and/or 1300) as discussed above in relation to FIGS. 8A-8B. In some aspects, the frequency resource reservation-based sidelink module 1308 is further configured to perform resource reservation for multiple TBs by clustering reserved resources in a FDM and/or TDM manner so that the number of LBTs may be reduced for transmitting the multiple TBs as discussed above in relation to FIGS. 9A-9C. In some aspects, the frequency resource reservation-based sidelink module 1308 is further configured to perform soft frequency-only reservation and/or account for soft frequency-only reservations of another UE (e.g., UEs 115, 215, and/or 1300) as discussed above in relation to FIGS. 10 and 11.

As shown, the transceiver 1310 may include the modem subsystem 1312 and the RF unit 1314. The transceiver 1310 can be configured to communicate bi-directionally with other devices, such as the BSs 105. The modem subsystem 1312 may be configured to modulate and/or encode the data from the memory 1304 and/or the frequency resource reservation-based sidelink module 1308 according to a modulation and coding scheme (MCS), e.g., a low-density parity check (LDPC) coding scheme, a turbo coding scheme, a convolutional coding scheme, a digital beamforming scheme, etc. The RF unit 1314 may be configured to process (e.g., perform analog to digital conversion or digital to analog conversion, etc.) modulated/encoded data (e.g., PSCCH SCI, PSSCH data, frequency-only reservations, time-frequency legacy reservations, soft frequency-only reservations) from the modem subsystem 1312 (on outbound transmissions) or of transmissions originating from another source such as a UE 115 or a BS 105. The RF unit 1314 may be further configured to perform analog beamforming in conjunction with the digital beamforming. Although shown as integrated together in transceiver 1310, the modem subsystem 1312 and the RF unit 1314 may be separate devices that are coupled together at the UE 115 to enable the UE 115 to communicate with other devices.

The RF unit 1314 may provide the modulated and/or processed data, e.g. data packets (or, more generally, data messages that may include one or more data packets and other information), to the antennas 1316 for transmission to one or more other devices. The antennas 1316 may further receive data messages transmitted from other devices. The antennas 1316 may provide the received data messages for processing and/or demodulation at the transceiver 1310. The transceiver 1310 may provide the demodulated and decoded data (e.g., RRC configuration, sidelink resource pools configurations, PSCCH SCI, PSSCH data, frequency-only reservations, time-frequency legacy reservations, soft frequency-only reservations) to the frequency resource reservation-based sidelink module 1308 for processing. The antennas 1316 may include multiple antennas of similar or different designs in order to sustain multiple transmission links. The RF unit 1314 may configure the antennas 1316.

In some aspects, the processor 1302 is configured to communicate with one or more components of the UE 1300 to sense in a sidelink resource pool within a shared radio frequency band, reserve, based on the sensing, a frequency resource of the sidelink resource pool within an instance of a variable time range, and perform, in the shared radio frequency band, one or more LBTs. The transceiver 1310 is configured to communicate with one or more components of the UE 1300 to transmit, to a second UE (e.g., the UEs 115 and/or 215) based on the one or more LBTs, a sidelink transmission using the frequency resource within the instance of the variable time range.

In an aspect, the UE 1300 can include multiple transceivers 1310 implementing different RATs (e.g., NR and LTE). In an aspect, the UE 1300 can include a single transceiver 1310 implementing multiple RATs (e.g., NR and LTE). In an aspect, the transceiver 1310 can include various components, where different combinations of components can implement different RATs.

Figure 14:
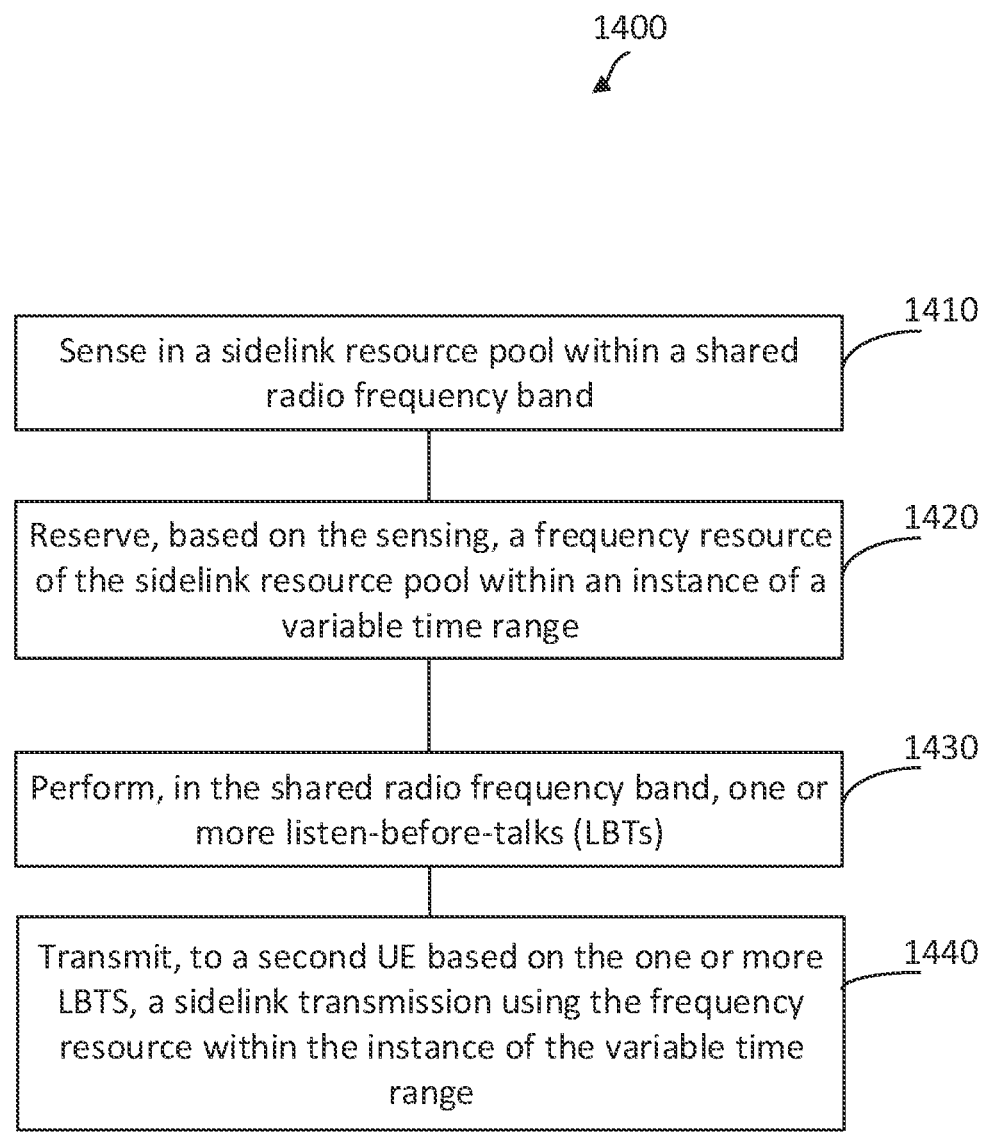
FIG. 14 is a flow diagram of a wireless communication method according to some aspects of the present disclosure.

FIG. 14 is a flow diagram of a wireless communication method 1400 according to some aspects of the present disclosure. Aspects of the method 1400 can be executed by a computing device (e.g., a processor, processing circuit, and/or other suitable component) of a wireless communication device or other suitable means for performing the steps. For example, a wireless communication device, such as a UE 115, 215, 1300 may utilize one or more components, such as the processor 1302, the memory 1304, the frequency resource reservation-based sidelink module 1308, the transceiver 1310, the modem 1312, and the one or more antennas 1316, to execute the steps of method 1400. The method 1400 may employ similar mechanisms as described above in FIGS. 4A-4B, 5, 6A-6B, 7A-7B, 8A-8B, 9A-9C, 10, and 11. As illustrated, the method 1400 includes a number of enumerated steps, but aspects of the method 1400 may include additional steps before, after, and in between the enumerated steps. In some aspects, one or more of the enumerated steps may be omitted or performed in a different order.

At block 1410, a UE may sense in a sidelink resource pool (e.g., the sidelink resource pool 450) within a shared radio frequency band. In some aspects, the UE may continuously sense or monitor resources in the sidelink resource pool (e.g., performed by a PHY layer at the UE). The sensing or monitoring may include decoding SCI and/or measuring signal energy in the channel. For SCI decoding, the UE may blindly decode SCI from a PSCCH of each resource. If the decoding is successful, the UE may record the decoded SCI. For signal measurements, the UE may receive a signal from each resource and compute a RSRP and/or a RSSI for each resource. The UE may also record the signal measurements. In some aspects, the UE may receive, by a PHY layer, a sensing request comprising an indication of the instance of the variable time range, such as an indication of a size M of the instance of the variable time range, and may perform the sensing based on the sensing request. In some aspects, the UE may utilize one or more components, such as the processor 1302, the memory 1304, the frequency resource reservation-based sidelink module 1308, the transceiver 1310, the modem 1312, and the one or more antennas 1316, to perform the operations at block 1410.

At block 1420, the UE may reserve, based on the sensing, a frequency resource of the sidelink resource pool within an instance of a variable time range. In some aspects, the UE may identify the resources to reserve the frequency resource within the resource selection window by examining or analyzing sensing results (e.g. decoded SCI and/or signal measurements) obtained within the sensing window. The UE may filter the resources in the resource selection window based on the decoded SCI, signal measurements, and/or a traffic priority associated with a sidelink transmission. The UE may further filter the resources based on a size M of the instance of the variable time range. In this way, the UE may select time-contiguous resources to reserve a set of M resources. After identifying and selecting the set of M resources, the UE may reserve the frequency resource by transmitting a reservation (e.g., a reservation message) identifying a subchannel of the frequency resource, an index of a first slot of the frequency resource, and/or the like, as described above with reference to FIG. 5. In some aspects, the UE may utilize one or more components, such as the processor 1302, the memory 1304, the frequency resource reservation-based sidelink module 1308, the transceiver 1310, the modem 1312, and the one or more antennas 1316, to perform the operations at block 1420.

At block 1430, the UE may perform, in the shared radio frequency band, one or more LBTs. In some aspects, the UE may perform the one or more LBTs based on slot boundaries of the instance of the variable time range. For example, the UE may perform an LBTs at a slot boundary of a slot corresponding to a resource of the set of M resources that is identified as available after the UE performs a last-minute re-evaluation of the slot. In some aspects, the UE may perform, in the shared radio frequency band, a first LBT based on a first slot boundary in the instance of the variable time range. The UE may also perform, responsive to identifying a failure of the first LBT, a second LBT based on a second slot boundary after the first slot boundary. In some aspects, the UE may proceed to block 1440 to perform transmission of the sidelink transmission in response to identifying a success of the second LBT. Further, in some aspects, the UE may perform the first LBT by performing a countdown until the first slot boundary, and the UE may perform the second LBT by resuming the countdown.

In some aspects, the UE may utilize one or more components, such as the processor 1302, the memory 1304, the frequency resource reservation-based sidelink module 1308, the transceiver 1310, the modem 1312, and the one or more antennas 1316, to perform the operations at block 1430.

At block 1440, the UE may transmit, to a second UE based on the one or more LBTs, the sidelink transmission using the frequency resource within the instance of the variable time range. In some aspects, the UE may utilize one or more components, such as the processor 1302, the memory 1304, the frequency resource reservation-based sidelink module 1308, the transceiver 1310, the modem 1312, and the one or more antennas 1316, to perform the operations at block 1440.

In some aspects, the instance of the variable time range spans one or more contiguous slots. In some aspects, the frequency resource is in a same subchannel of the sidelink resource pool over the instance of the variable time range. Further, in some aspects, reserving the frequency resource (e.g., block 1420) includes transmitting a reservation including at least one of a subchannel index identifying the frequency resource or a slot index identifying a beginning slot of the instance of the variable time range, as described above in relation to FIG. 5.

In some aspects, the UE may determine the variable time range based on a predetermined value. For example, the UE and/or a MAC layer (e.g., MAC layer 302) may determine the variable time range (e.g., the size M of the variable time range) based on the predetermined value. Additionally or alternatively, in some aspects, the UE may receive an indication of the variable time range in at least one of an RRC configuration or an SIB. Further, in some aspects, the UE may determine the variable time range based on at least one of a PDB or a traffic priority associated with the sidelink transmission. In some aspects, the UE may determine the variable time range based on a channel busy ratio (CBR) associated with the sidelink resource pool, as described above in relation to FIGS. 4A-4B.

In some aspects, the UE may receive, at a MAC layer (e.g., MAC layer 302), candidate resources identified based on the sensing (e.g., block 1410). Further, the UE may identify, by the MAC layer, a subset of the candidate resources having a number of contiguous slots greater than or equal to a number of contiguous slots within the instance of the variable time range. The UE may further reduce, by the MAC layer based on a number of candidate resources in the subset failing to satisfy a threshold, the number of contiguous slots within the instance of the variable time range. In some aspects, the UE may reserve a set of M resources corresponding to the frequency resource within the reduced number of contiguous slots within the instance of the variable time range. Moreover, in some aspects, the UE may reserve the frequency resource by transmitting, at the MAC layer, a sensing request including an indication of a candidate set size threshold for a resource selection window, as discussed above in relation to FIGS. 4A-4B.

In some aspects, the instance of the variable time range includes a set of slots, and the UE may determine a first subset of the set of slots is unavailable for transmission of the sidelink transmission. In such aspects, transmitting the sidelink transmission may involve transmitting the sidelink transmission using the frequency resource within a second subset of the set of slots of the instance of the variable time range. This second subset excludes the first subset, as discussed above in relation to FIGS. 6A-6B.

In some aspects, the UE may detect, from a third UE, a reservation of a second frequency resource of the sidelink resource pool within a second instance of the variable time range. In response, the UE may set an LBT gap within the second instance of the variable time range to zero. In some aspects, the UE may, based on detecting the reservation from the third UE, reserve a time-frequency resource within a slot of the second instance of the variable time range and a subchannel of the second frequency resource. The reservation of the time-frequency resource may be based on at least one of a priority of the reservation or the reservation being for the second instance of the variable time range. In some aspects, the UE may detect the reservation from the third UE and may reserve the frequency resource within a subchannel of the second frequency resource and the instance of the variable time range. The UE may reserve the frequency resource based on at least one of a priority of the reservation or the reservation being for the second instance of the variable time range, and the instance of the variable time range may at least partially overlap the second instance of the variable time range. Further, the UE may reserve the frequency resource based on determining that there is no other frequency resource reservation with a respective instance of the variable time range overlapping with the second instance of the variable time range. Moreover, in some aspects, the UE may reserve the frequency resource so that the instance of the variable time range does not overlap one or more slots at a start of the second instance of the variable time range, as described above in relation to FIGS. 8A-8B.

In some aspects, the UE may reserve a second frequency resource of the sidelink resource pool within a second instance of the variable time range. The second instance of the variable time range may at least partially overlap with the instance of the variable time range, and the second frequency resource may be within a different subchannel than the frequency resource, as described above in relation to FIG. 9A.

In some aspects, the UE may reserve a second frequency resource of the sidelink resource pool within a second instance of the variable time range. The second instance of the variable time range may be non-overlapping with the instance of the variable time range, and the second frequency resource may be within the same subchannel as the frequency resource, as described above in relation to FIG. 9B.

In some aspects, the UE may reserve a second frequency resource of the sidelink resource pool within a second instance of the variable time range. The second instance of the variable time range may at least partially overlap with the instance of the variable time range, and the second frequency resource may be in the same subchannel as the frequency resource, as described above in relation to FIG. 9C.

In some aspects, the UE may reserve a second frequency resource of the sidelink resource pool within a second instance of the variable time range. The second instance of the variable time range may at least partially overlap or be adjacent to the instance of the variable time range. According to such aspects, the UE may transmit the sidelink transmission by transmitting, during a first slot within the instance of the variable time range based on a deferral from a first LBT of the one or more LBTs, the sidelink transmission. The first slot may be adjacent to a start of the second instance of the variable time range. The UE may further transmit, to a third UE based on the first LBT, a second sidelink transmission using the second frequency resource during a second slot at the start of the second instance of the variable time range, as described above in relation to FIGS. 9A-9C.

In some aspects, the UE may transmit a soft reservation for a second frequency resource of the sidelink resource pool within a second instance of the variable time range. According to such aspects, the UE may transmit the sidelink transmission including a first transport block, and the soft reservation may be associated with a second transport block different from the first transport block. The UE may further transmit, to a third UE in response to determining the soft reservation is not preempted, a second sidelink transmission including the second transport block using the second frequency resource within the second instance of the variable time range. Additionally or alternatively, the UE may refrain from transmitting, in response to determining the soft reservation is preempted, the second sidelink transmission including the second transport block using the second frequency resource within the second instance of the variable time range, as described above in relation to FIG. 10.

In some aspects, the UE may identify, based on the sensing, candidate resources in the sidelink resource pool within a resource selection window. The UE may also receive, from a third UE, a soft reservation for a second frequency resource of the sidelink resource pool within a second instance of the variable time range. The soft reservation may be associated with one or more of the candidate resources. The UE may then determine (e.g., treat), based on the soft reservation, the one or more of the candidate resources as unavailable. The UE may further select, based on a number of remaining candidate resources, the frequency resource from the candidate resources. The selecting may involve selecting, based on determining the number of remaining candidate resources in the resource selection window satisfies a threshold, the frequency resource within the instance of the variable time range from the remaining candidate resources. Additionally or alternatively, the selecting may involve selecting, based on determining the number of remaining candidate resources in the resource selection window fails to satisfy the threshold, the frequency resource from a subset of the candidate resources including at least a first candidate resource of the one or more of the candidate resources, as described above in relation to FIG. 11.

Further aspects of the present disclosure include the following:

1. A method of wireless communication performed by a user equipment (UE), the method comprising:
    sensing in a sidelink resource pool within a shared radio frequency band;
    reserving, based on the sensing, a frequency resource of the sidelink resource pool within an instance of a variable time range;
    performing, in the shared radio frequency band, one or more listen-before-talks (LBTs); and
    transmitting, to a second UE based on the one or more LBTs, a sidelink transmission using the frequency resource within the instance of the variable time range.

2. The method of clause 1, wherein the instance of the variable time range spans one or more contiguous slots.

3. The method of any of clauses 1 or 2, wherein the frequency resource is in a same subchannel of the sidelink resource pool over the instance of the variable time range.

4. The method of clause 3, wherein the reserving comprises:
    transmitting a reservation including at least one of a subchannel index identifying the frequency resource or a slot index identifying a beginning slot of the instance of the variable time range.

5. The method of any of clauses 1-4, further comprising:
    determining the variable time range based on a predetermined value.

6. The method of any of clauses 1-4, further comprising:
receiving an indication of the variable time range in at least one of a radio resource control (RRC) configuration or a system information block (SIB).

7. The method of any of clauses 1-4, further comprising:
determining the variable time range based on at least one of a packet delay budget (PDB) or a traffic priority associated with the sidelink transmission.

8. The method of any of clauses 1-4, further comprising determining the variable time range based on a channel busy ratio (CBR) associated with the sidelink resource pool.

9. The method of any of clauses 1-8, further comprising:
receiving, by a physical (PHY) layer, a sensing request comprising an indication of the instance of the variable time range, and
wherein the sensing is further based on the sensing request.

10. The method of any of clauses 1-9, further comprising:
receiving, at a media access control (MAC) layer, candidate resources identified based on the sensing;
identifying, by the MAC layer, a subset of the candidate resources having a number of contiguous slots greater than or equal to a number of contiguous slots within the instance of the variable time range; and
reducing, by the MAC layer based on a number of candidate resources in the subset failing to satisfy a threshold, the number of contiguous slots within the instance of the variable time range,
wherein the reserving comprises reserving the frequency resource within the reduced number of contiguous slots within the instance of the variable time range.

11. The method of clause 10, further comprising:
transmitting, at the MAC layer, a sensing request including an indication of a candidate set size threshold for a resource selection window.

12. The method of clause of any of clauses 1-11, wherein the instance of the variable time range comprises a set of slots, further comprising:
determining a first subset of the set of slots is unavailable for transmission of the sidelink transmission,
wherein the transmitting the sidelink transmission comprises:
transmitting the sidelink transmission using the frequency resource within a second subset of the set of slots of the instance of the variable time range, wherein the second subset excludes the first subset.

13. The method of any of clauses 1-12, wherein:
the performing the one or more LBTs comprises:
performing, in the shared radio frequency band, a first LBT based on a first slot boundary in the instance of the variable time range; and
performing, responsive to identifying a failure of the first LBT, a second LBT based on a second slot boundary after the first slot boundary; and
the transmitting comprises, responsive to identifying a success of the second LBT, beginning transmission of the sidelink transmission from the second slot boundary in the instance of the variable time range.

14. The method of clause 13, wherein:
the performing the first LBT comprises:
performing a countdown until the first slot boundary; and
the performing the second LBT comprises:
resuming the countdown.

15. The method of any of clauses 1-14, further comprising:
detecting, from a third UE, a reservation of a second frequency resource of the sidelink resource pool within a second instance of the variable time range; and
setting, based on the detecting, an LBT gap within the second instance of the variable time range to zero.

16. The method of any of clauses 1-14, further comprising:
detecting, from a third UE, a reservation of a second frequency resource of the sidelink resource pool within a second instance of the variable time range; and
reserving, based on at least one of a priority of the reservation or the reservation being for the second instance of the variable time range, a time-frequency resource within a slot of the second instance of the variable time range and a subchannel of the second frequency resource.

17. The method of any of clauses 1-14, further comprising:
detecting a reservation, from a third UE, of a second frequency resource of the sidelink resource pool within a second instance of the variable time range,
wherein the reserving comprises reserving, based on at least one of a priority of the reservation or the reservation being for the second instance of the variable time range, the frequency resource within a subchannel of the second frequency resource and the instance of the variable time range, wherein the instance of the variable time range is configured to at least partially overlap the second instance of the variable time range.

18. The method of clause 17, wherein the reserving the frequency resource is further based on determining there is no other frequency resource reservation with a respective instance of the variable time range overlapping with the second instance of the variable time range.

19. The method of any of clauses 17 or 18, wherein the instance of the variable time range does not overlap one or more slots at a start of the second instance of the variable time range.

20. The method of any of clauses 1-14, further comprising:
reserving a second frequency resource of the sidelink resource pool within a second instance of the variable time range, wherein the second instance of the variable time range at least partially overlaps with the instance of the variable time range, and wherein the second frequency resource is within a different subchannel than the frequency resource.

21. The method of any of clauses 1-14, further comprising:
reserving a second frequency resource of the sidelink resource pool within a second instance of the variable time range, wherein the second instance of the variable time range is non-overlapping with the instance of the variable time range, and wherein the second frequency resource is within the same subchannel as the frequency resource.

22. The method of any of clauses 1-14, further comprising:
reserving a second frequency resource of the sidelink resource pool within a second instance of the variable time range, wherein the second instance of the variable time range at least partially overlaps with the instance of the variable time range, and wherein the second frequency resource is in the same subchannel as the frequency resource.

23. The method of any of clauses 1-14, further comprising:
reserving a second frequency resource of the sidelink resource pool within a second instance of the variable time range, wherein the second instance of the variable time range at least partially overlaps or adjacent to the instance of the variable time range,
wherein:
the transmitting the sidelink transmission comprises:
transmitting during a first slot within the instance of the variable time range based on a deferral from a first LBT of the one or more LBTs, the sidelink transmission, the first slot being adjacent to a start of the second instance of the variable time range; and the method further comprises:

transmitting, to a third UE based on the first LBT, a second sidelink transmission using the second frequency resource during a second slot at the start of the second instance of the variable time range.

24. The method of any of clauses 1-14, further comprising:

transmitting a soft reservation for a second frequency resource of the sidelink resource pool within a second instance of the variable time range.

25. The method of clause 24, wherein the transmitting the soft reservation comprises:

transmitting the sidelink transmission including a first transport block, wherein the soft reservation is associated with a second transport block different from the first transport block.

26. The method of clause 25, further comprising at least one of:

transmitting, to a third UE in response to determining the soft reservation is not preempted, a second sidelink transmission including the second transport block using the second frequency resource within the second instance of the variable time range; or refraining from transmitting, in response to determining the soft reservation is preempted, the second sidelink transmission including the second transport block using the second frequency resource within the second instance of the variable time range.

27. The method of any of clauses 1-14, further comprising:

identifying, based on the sensing, candidate resources in the sidelink resource pool within a resource selection window;

receiving, from a third UE, a soft reservation for a second frequency resource of the sidelink resource pool within a second instance of the variable time range, the soft reservation associated with one or more of the candidate resources;

determining, based on the soft reservation, the one or more of the candidate resources as unavailable; and selecting, based on a number of remaining candidate resources, the frequency resource from the candidate resources, wherein the selecting comprises at least one of:

selecting, based on determining the number of remaining candidate resources in the resource selection window satisfies a threshold, the frequency resource within the instance of the variable time range from the remaining candidate resources; or selecting, based on determining the number of remaining candidate resources in the resource selection window fails to satisfy the threshold, the frequency resource from a subset of the candidate resources including at least a first candidate resource of the one or more of the candidate resources.

28. A first user equipment (UE) comprising:

a processor configured to:

sense in a sidelink resource pool within a shared radio frequency band;

reserve, based on the sensing, a frequency resource of the sidelink resource pool within an instance of a variable time range; and perform, in the shared radio frequency band, one or more listen-before-talks (LBTs);

and a transceiver configured to:

transmit, to a second UE based on the one or more LBTs, a sidelink transmission using the frequency resource within the instance of the variable time range.

29. The first UE of clause 28, wherein the instance of the variable time range spans one or more contiguous slots.

30. The first UE of any of clauses 28 or 29, wherein the frequency resource is in a same subchannel of the sidelink resource pool over the instance of the variable time range.

31. The first UE of clause 30, wherein the processor configured to reserve the frequency resource is further configured to:

configure the transceiver to transmit a reservation including at least one of a subchannel index identifying the frequency resource or a slot index identifying a beginning slot of the instance of the variable time range.

32. The first UE of clause 28, wherein the processor is further configured to:

determine the variable time range based on a predetermined value.

33. The first UE of any of clauses 28-32, wherein the transceiver is further configured to:

receive an indication of the variable time range in at least one of a radio resource control (RRC) configuration or a system information block (SIB).

34. The first UE of any of clauses 28-32, wherein the processor is further configured to:

determine the variable time range based on at least one of a packet delay budget (PDB) or a traffic priority associated with the sidelink transmission.

35. The first UE of any of clauses 28-32, wherein the processor is further configured to:

determine the variable time range based on a channel busy ratio (CBR) associated with the sidelink resource pool.

36. The first UE of any of clauses 28-35, wherein the processor is further configured to:

receive, by a physical (PHY) layer, a sensing request comprising an indication of the instance of the variable time range, and wherein the processor is configured to sense in the sidelink resource pool further based on the sensing request.

37. The first UE of any of clauses 28-36, wherein the processor is further configured to:

receive, at a media access control (MAC) layer, candidate resources identified based on the sensing;

identify, by the MAC layer, a subset of the candidate resources having a number of contiguous slots greater than or equal to a number of contiguous slots within the instance of the variable time range; and reduce, by the MAC layer based on a number of candidate resources in the subset failing to satisfy a threshold, the number of contiguous slots within the instance of the variable time range, wherein the processor configured to reserve the frequency resource is further configured to reserve the frequency resource within the reduced number of contiguous slots within the instance of the variable time range.

38. The first UE of clause 37, wherein the processor is further configured to:

transmit, at the MAC layer, a sensing request including an indication of a candidate set size threshold for a resource selection window.

39. The first UE of any of clauses 28-38, wherein the instance of the variable time range comprises a set of slots, and wherein:
the processor is further configured to:
determine a first subset of the set of slots is unavailable for transmission of the sidelink transmission; and
the transceiver is further configured to:
transmit the sidelink transmission using the frequency resource within a second subset of the set of slots of the instance of the variable time range, wherein the second subset excludes the first subset.

40. The first UE of any of clauses 28-39, wherein:
the processor is further configured to:
perform, in the shared radio frequency band, a first LBT of the one or more LBTs based on a first slot boundary in the instance of the variable time range; and
perform, responsive to identifying a failure of the first LBT, a second LBT based on a second slot boundary after the first slot boundary; and
the transceiver is further configured to, responsive to the processor identifying a success of the second LBT:
begin transmission of the sidelink transmission from the second slot boundary in the instance of the variable time range.

41. The first UE of clause 40, wherein the processor is further configured to:
perform a countdown until the first slot boundary to perform the first LBT; and
resume the countdown to perform the second LBT.

42. The first UE of any of clauses 28-41, wherein the processor is further configured to:
detect, from a third UE, a reservation of a second frequency resource of the sidelink resource pool within a second instance of the variable time range; and
set, based on the detecting, an LBT gap within the second instance of the variable time range to zero.

43. The first UE of any of clauses 28-41, wherein the processor is further configured to:
detect, from a third UE, a reservation of a second frequency resource of the sidelink resource pool within a second instance of the variable time range; and
reserve, based on at least one of a priority of the reservation or the reservation being for the second instance of the variable time range, a time-frequency resource within a slot of the second instance of the variable time range and a subchannel of the second frequency resource.

44. The first UE of any of clauses 28-41, wherein the processor is further configured to:
detect a reservation, from a third UE, of a second frequency resource of the sidelink resource pool within a second instance of the variable time range,
wherein the processor is configured to reserve, based on at least one of a priority of the reservation or the reservation being for the second instance of the variable time range, the frequency resource within a subchannel of the second frequency resource and the instance of the variable time range, wherein the instance of the variable time range is configured to at least partially overlap the second instance of the variable time range.

45. The first UE of clause 44, wherein the processor is configured to reserve the frequency resource further based on determining there is no other frequency resource reservation with a respective instance of the variable time range overlapping with the second instance of the variable time range.

46. The first UE of any of clauses 44 or 45, wherein the instance of the variable time range does not overlap one or more slots at a start of the second instance of the variable time range.

47. The first UE of any of clauses 28-41, wherein the processor is further configured to:
reserve a second frequency resource of the sidelink resource pool within a second instance of the variable time range, wherein the second instance of the variable time range at least partially overlaps with the instance of the variable time range, and wherein the second frequency resource is within a different subchannel than the frequency resource.

48. The first UE of any of clauses 28-41, wherein the processor is further configured to:
reserve a second frequency resource of the sidelink resource pool within a second instance of the variable time range, wherein the second instance of the variable time range is non-overlapping with the instance of the variable time range, and wherein the second frequency resource is within the same subchannel as the frequency resource.

49. The first UE of any of clauses 28-41, wherein the processor is further configured to:
reserve a second frequency resource of the sidelink resource pool within a second instance of the variable time range, wherein the second instance of the variable time range at least partially overlaps with the instance of the variable time range, and wherein the second frequency resource is in the same subchannel as the frequency resource.

50. The first UE of any of clauses 28-41, wherein:
the processor is further configured to:
reserve a second frequency resource of the sidelink resource pool within a second instance of the variable time range, wherein the second instance of the variable time range at least partially overlaps or adjacent to the instance of the variable time range; and the transceiver is further configured to:
transmit during a first slot within the instance of the variable time range based on a deferral from a first LBT of the one or more LBTs, the sidelink transmission, the first slot being adjacent to a start of the second instance of the variable time range; and
transmit, to a third UE based on the first LBT, a second sidelink transmission using the second frequency resource during a second slot at the start of the second instance of the variable time range.

51. The first UE of any of clauses 28-41, wherein the transceiver is further configured to:
transmit a soft reservation for a second frequency resource of the sidelink resource pool within a second instance of the variable time range.

52. The first UE of clause 51, wherein the transceiver is further configured to:
transmit the sidelink transmission including a first transport block, and
wherein the soft reservation is associated with a second transport block different from the first transport block.

53. The first UE of clause 52, the transceiver is further configured to:
transmit, to a third UE in response to the processor determining that the soft reservation is not preempted, a second sidelink transmission including the second transport block using the second frequency resource within the second instance of the variable time range; or
refrain from transmitting, in response to the processor determining that the soft reservation is preempted, the second sidelink transmission including the second transport block using the second frequency resource within the second instance of the variable time range.

54. The first UE of any of clauses 28-41, wherein the processor is further configured to:

identify, based on the sensing, candidate resources in the sidelink resource pool within a resource selection window;

receive, from a third UE, a soft reservation for a second frequency resource of the sidelink resource pool within a second instance of the variable time range, the soft reservation associated with one or more of the candidate resources;

determine, based on the soft reservation, the one or more of the candidate resources as unavailable; and select, based on a number of remaining candidate resources, the frequency resource from the candidate resources, wherein the selecting comprises at least one of:

select, based on determining the number of remaining candidate resources in the resource selection window satisfies a threshold, the frequency resource within the instance of the variable time range from the remaining candidate resources; or select, based on determining the number of remaining candidate resources in the resource selection window fails to satisfy the threshold, the frequency resource from a subset of the candidate resources including at least a first candidate resource of the one or more of the candidate resources.

55. A non-transitory computer-readable medium having program code recorded thereon, the program code comprising:

code for causing a first user equipment (UE) to sense in a sidelink resource pool within a shared radio frequency band;

code for causing the first UE to reserve, based on the sensing, a frequency resource of the sidelink resource pool within an instance of a variable time range;

code for causing the first UE to perform, in the shared radio frequency band, one or more listen-before-talks (LBTs); and code for causing the first UE to transmit, to a second UE based on the one or more LBTs, a sidelink transmission using the frequency resource within the instance of the variable time range.

56. The non-transitory computer-readable medium of clause 55, wherein the instance of the variable time range spans one or more contiguous slots.

57. The non-transitory computer-readable medium of any of clauses 55 or 56, wherein the frequency resource is in a same subchannel of the sidelink resource pool over the instance of the variable time range.

58. The non-transitory computer-readable medium of clause 57, wherein the code for causing the first UE to reserve the frequency resource is further configured to cause the first UE to:

transmit a reservation including at least one of a subchannel index identifying the frequency resource or a slot index identifying a beginning slot of the instance of the variable time range.

59. The non-transitory computer-readable medium of any of clauses 55-58, further comprising:

code for causing the first UE to determine the variable time range based on a predetermined value.

60. The non-transitory computer-readable medium of any of clauses 55-58, further comprising:

code for causing the first UE to receive an indication of the variable time range in at least one of a radio resource control (RRC) configuration or a system information block (SIB).

61. The non-transitory computer-readable medium of any of clauses 55-58, further comprising:

code for causing the first UE to determine the variable time range based on at least one of a packet delay budget (PDB) or a traffic priority associated with the sidelink transmission.

62. The non-transitory computer-readable medium of any of clauses 55-58, further comprising:

code for causing the first UE to determine the variable time range based on a channel busy ratio (CBR) associated with the sidelink resource pool.

63. The non-transitory computer-readable medium of any of clauses 55-62, further comprising:

code for causing the first UE to receive, by a physical (PHY) layer, a sensing request comprising an indication of the instance of the variable time range, and wherein the code for causing the first UE to sense is further configured to cause the first UE to sense based on the sensing request.

64. The non-transitory computer-readable medium of any of clauses 55-63, further comprising:

code for causing the first UE to receive, at a media access control (MAC) layer, candidate resources identified based on the sensing;

code for causing the first UE to identify, by the MAC layer, a subset of the candidate resources having a number of contiguous slots greater than or equal to a number of contiguous slots within the instance of the variable time range; and code for causing the first UE to reduce, by the MAC layer based on a number of candidate resources in the subset failing to satisfy a threshold, the number of contiguous slots within the instance of the variable time range, wherein the code for causing the first UE to reserve the frequency resource is further configured to cause the first UE to reserve the frequency resource within the reduced number of contiguous slots within the instance of the variable time range.

65. The non-transitory computer-readable medium of clause 64, further comprising:

code for causing the first UE to transmit, at the MAC layer, a sensing request including an indication of a candidate set size threshold for a resource selection window.

66. The non-transitory computer-readable medium of any of clauses 55-65, wherein the instance of the variable time range comprises a set of slots, further comprising:

code for causing the first UE to determine a first subset of the set of slots is unavailable for transmission of the sidelink transmission, wherein the code for causing the first UE to transmit the sidelink transmission comprises:

code for causing the first UE to transmit the sidelink transmission using the frequency resource within a second subset of the set of slots of the instance of the variable time range, wherein the second subset excludes the first subset.

67. The non-transitory computer-readable medium of any of clauses 55-66, further comprising:

code for causing the first UE to perform, in the shared radio frequency band, a first LBT of the one or more LBTs based on a first slot boundary in the instance of the variable time range; and code for causing the first UE to perform, responsive to identifying a failure of the first LBT, a second LBT of the one or more LBTs based on a second slot boundary after the first slot boundary; and the code for causing the first UE to transmit the sidelink transmission is further configured to cause the first UE to, responsive to identifying a success of the second LBT, begin transmission of the sidelink transmission from the second slot boundary in the instance of the variable time range.

68. The non-transitory computer-readable medium of clause 67, wherein:

the code for causing the first UE to perform the first LBT is further configured to cause the first UE to perform a countdown until the first slot boundary; and the code for causing the first UE to perform the second LBT is further configured to cause the first UE to resume the countdown.

69. The non-transitory computer-readable medium of any of clauses 55-68, further comprising:

code for causing the first UE to detect, from a third UE, a reservation of a second frequency resource of the sidelink resource pool within a second instance of the variable time range; and code for causing the first UE to set, based on the detecting, an LBT gap within the second instance of the variable time range to zero.

70. The non-transitory computer-readable medium of any of clauses 55-68, further comprising:

code for causing the first UE to detect, from a third UE, a reservation of a second frequency resource of the sidelink resource pool within a second instance of the variable time range; and code for causing the first UE to reserve, based on at least one of a priority of the reservation or the reservation being for the second instance of the variable time range, a time-frequency resource within a slot of the second instance of the variable time range and a subchannel of the second frequency resource.

71. The non-transitory computer-readable medium of any of clauses 55-68, further comprising:

code for causing the first UE to detect a reservation, from a third UE, of a second frequency resource of the sidelink resource pool within a second instance of the variable time range, wherein the code for causing the first UE to reserve the frequency resource is further configured to cause the first UE to reserve, based on at least one of a priority of the reservation or the reservation being for the second instance of the variable time range, the frequency resource within a subchannel of the second frequency resource and the instance of the variable time range, wherein the instance of the variable time range is configured to at least partially overlap the second instance of the variable time range.

72. The non-transitory computer-readable medium of clause 71, wherein the code for causing the first UE to reserve the frequency resource is further configured to cause the first UE to reserve the frequency resource further based on determining there is no other frequency resource reservation with a respective instance of the variable time range overlapping with the second instance of the variable time range.

73. The non-transitory computer-readable medium of any of clauses 71 or 72, wherein the instance of the variable time range does not overlap one or more slots at a start of the second instance of the variable time range.

74. The non-transitory computer-readable medium of any of clauses 55-68, further comprising:

code for causing the first UE to reserve a second frequency resource of the sidelink resource pool within a second instance of the variable time range, wherein the second instance of the variable time range at least partially overlaps with the instance of the variable time range, and wherein the second frequency resource is within a different subchannel than the frequency resource.

75. The non-transitory computer-readable medium of any of clauses 55-68, further comprising:

code for causing the first UE to reserve a second frequency resource of the sidelink resource pool within a second instance of the variable time range, wherein the second instance of the variable time range is non-overlapping with the instance of the variable time range, and wherein the second frequency resource is within the same subchannel as the frequency resource.

76. The non-transitory computer-readable medium of any of clauses 55-68, further comprising:

code for causing the first UE to reserve a second frequency resource of the sidelink resource pool within a second instance of the variable time range, wherein the second instance of the variable time range at least partially overlaps with the instance of the variable time range, and wherein the second frequency resource is in the same subchannel as the frequency resource.

77. The non-transitory computer-readable medium of any of clauses 55-68, further comprising:

code for causing the first UE to reserve a second frequency resource of the sidelink resource pool within a second instance of the variable time range, wherein the second instance of the variable time range at least partially overlaps or adjacent to the instance of the variable time range, wherein:
the code for causing the first UE to transmit the sidelink transmission is further configured to cause the first UE to:
transmit during a first slot within the instance of the variable time range based on a deferral from a first LBT of the one or more LBTs, the sidelink transmission, the first slot being adjacent to a start of the second instance of the variable time range; and
the non-transitory computer-readable medium further comprises:
code for causing the first UE to transmit, to a third UE based on the first LBT, a second sidelink transmission using the second frequency resource during a second slot at the start of the second instance of the variable time range.

78. The non-transitory computer-readable medium of any of clauses 55-68, further comprising:

code for causing the first UE to transmit a soft reservation for a second frequency resource of the sidelink resource pool within a second instance of the variable time range.

79. The non-transitory computer-readable medium of clause 78, wherein the code for causing the first UE to transmit the soft reservation is further configured to cause the first UE to:

transmit the sidelink transmission including a first transport block, wherein the soft reservation is associated with a second transport block different from the first transport block.

80. The non-transitory computer-readable medium of clause 79, further comprising at least one of:

code for causing the first UE to transmit, to a third UE in response to determining the soft reservation is not preempted, a second sidelink transmission including the second transport block using the second frequency resource within the second instance of the variable time range; or code for causing the first UE to refrain from transmitting, in response to determining the soft reservation is preempted, the second sidelink transmission including the second transport block using the second frequency resource within the second instance of the variable time range.

81. The non-transitory computer-readable medium of any of clauses 55-68, further comprising:

code for causing the first UE to identify, based on the sensing, candidate resources in the sidelink resource pool within a resource selection window;

code for causing the first UE to receive, from a third UE, a soft reservation for a second frequency resource of the sidelink resource pool within a second instance of the variable time range, the soft reservation associated with one or more of the candidate resources;

code for causing the first UE to determine, based on the soft reservation, the one or more of the candidate resources as unavailable; and code for causing the first UE to select, based on a number of remaining candidate resources, the frequency resource from the candidate resources, wherein the code for causing the first UE to select is further configured to cause the first UE to:

select, based on determining the number of remaining candidate resources in the resource selection window satisfies a threshold, the frequency resource within the instance of the variable time range from the remaining candidate resources; or select, based on determining the number of remaining candidate resources in the resource selection window fails to satisfy the threshold, the frequency resource from a subset of the candidate resources including at least a first candidate resource of the one or more of the candidate resources.

82. A first user equipment (UE) comprising:

means for sensing in a sidelink resource pool within a shared radio frequency band;

means for reserving, based on the sensing, a frequency resource of the sidelink resource pool within an instance of a variable time range;

means for performing, in the shared radio frequency band, one or more listen-before-talks (LBTs); and means for transmitting, to a second UE based on the one or more LBTs, a sidelink transmission using the frequency resource within the instance of the variable time range.

83. The first UE of clause 82, wherein the instance of the variable time range spans one or more contiguous slots.

84. The first UE of any of clauses 82 or 83, wherein the frequency resource is in a same subchannel of the sidelink resource pool over the instance of the variable time range.

85. The first UE of clause 84, wherein the means for reserving the frequency resource is further configured to:

transmit a reservation including at least one of a subchannel index identifying the frequency resource or a slot index identifying a beginning slot of the instance of the variable time range.

86. The first UE of any of clauses 82-85, further comprising:

means for determining the variable time range based on a predetermined value.

87. The first UE of any of clauses 82-85, further comprising:

means for receiving an indication of the variable time range in at least one of a radio resource control (RRC) configuration or a system information block (SIB).

88. The first UE of any of clauses 82-85, further comprising:

means for determining the variable time range based on at least one of a packet delay budget (PDB) or a traffic priority associated with the sidelink transmission.

89. The first UE of any of clauses 82-85, further comprising:

means for determining the variable time range based on a channel busy ratio (CBR) associated with the sidelink resource pool.

90. The first UE of any of clauses 82-89, further comprising:

means for receiving, by a physical (PHY) layer, a sensing request comprising an indication of the instance of the variable time range, and wherein the means for sensing in the sidelink resource pool is further configured to sense based on the sensing request.

91. The first UE of any of clauses 82-90, further comprising:

means for receiving, at a media access control (MAC) layer, candidate resources identified based on the sensing;

means for identifying, by the MAC layer, a subset of the candidate resources having a number of contiguous slots greater than or equal to a number of contiguous slots within the instance of the variable time range; and means for reducing, by the MAC layer based on a number of candidate resources in the subset failing to satisfy a threshold, the number of contiguous slots within the instance of the variable time range, wherein the means for reserving the frequency resource is further configured to reserve the frequency resource within the reduced number of contiguous slots within the instance of the variable time range.

92. The first UE of clause 91, further comprising:

means for transmitting, at the MAC layer, a sensing request including an indication of a candidate set size threshold for a resource selection window.

93. The first UE of any of clauses 82-92, wherein the instance of the variable time range comprises a set of slots, further comprising:

means for determining a first subset of the set of slots is unavailable for transmission of the sidelink transmission, wherein the means for transmitting the sidelink transmission is further configured to:

transmit the sidelink transmission using the frequency resource within a second subset of the set of slots of the instance of the variable time range, wherein the second subset excludes the first subset.

94. The first UE of any of clauses 82-93, wherein:

the means for the performing the one or more LBTs further comprises:

means for performing, in the shared radio frequency band, a first LBT based on a first slot boundary in the instance of the variable time range; and means for performing, responsive to identifying a failure of the first LBT, a second LBT based on a second slot boundary after the first slot boundary; and the means for the transmitting is further configured to, responsive to identifying a success of the second LBT, beginning transmission of the sidelink transmission from the second slot boundary in the instance of the variable time range.

95. The first UE of clause 94, wherein:

the means for performing the first LBT is further configured to perform a countdown until the first slot boundary; and the means for performing the second LBT is further configured to resume the countdown.

96. The first UE of any of clauses 82-95, further comprising:
  means for detecting, from a third UE, a reservation of a second frequency resource of the sidelink resource pool within a second instance of the variable time range; and
  means for setting, based on the detecting, an LBT gap within the second instance of the variable time range to zero.
97. The first UE of any of clauses 82-95, further comprising:
  means for detecting, from a third UE, a reservation of a second frequency resource of the sidelink resource pool within a second instance of the variable time range; and
  means for reserving, based on at least one of a priority of the reservation or the reservation being for the second instance of the variable time range, a time-frequency resource within a slot of the second instance of the variable time range and a subchannel of the second frequency resource.
98. The first UE of any of clauses 82-95, further comprising:
  means for detecting a reservation, from a third UE, of a second frequency resource of the sidelink resource pool within a second instance of the variable time range,
  wherein the means for reserving the frequency resource is further configured to reserve, based on at least one of a priority of the reservation or the reservation being for the second instance of the variable time range, the frequency resource within a subchannel of the second frequency resource and the instance of the variable time range, wherein the instance of the variable time range is configured to at least partially overlap the second instance of the variable time range.
99. The first UE of clause 98, wherein the means for reserving the frequency resource is further configured to reserve the frequency resource further based on determining there is no other frequency resource reservation with a respective instance of the variable time range overlapping with the second instance of the variable time range.
100. The first UE of any of clauses 98 or 99, wherein the instance of the variable time range does not overlap one or more slots at a start of the second instance of the variable time range.
101. The first UE of any of clauses 82-95, further comprising:
  means for reserving a second frequency resource of the sidelink resource pool within a second instance of the variable time range, wherein the second instance of the variable time range at least partially overlaps with the instance of the variable time range, and wherein the second frequency resource is within a different subchannel than the frequency resource.
102. The first UE of any of clauses 82-95, further comprising:
  means for reserving a second frequency resource of the sidelink resource pool within a second instance of the variable time range, wherein the second instance of the variable time range is non-overlapping with the instance of the variable time range, and wherein the second frequency resource is within the same subchannel as the frequency resource.
103. The first UE of any of clauses 82-95, further comprising:
  means for reserving a second frequency resource of the sidelink resource pool within a second instance of the variable time range, wherein the second instance of the variable time range at least partially overlaps with the instance of the variable time range, and wherein the second frequency resource is in the same subchannel as the frequency resource.
104. The first UE of any of clauses 82-95, further comprising:
  means for reserving a second frequency resource of the sidelink resource pool within a second instance of the variable time range, wherein the second instance of the variable time range at least partially overlaps or adjacent to the instance of the variable time range,
  wherein:
    the means for the transmitting the sidelink transmission is further configured to:
      transmit during a first slot within the instance of the variable time range based on a deferral from a first LBT of the one or more LBTs, the sidelink transmission, the first slot being adjacent to a start of the second instance of the variable time range; and
    the first UE further comprises:
      means for transmitting, to a third UE based on the first LBT, a second sidelink transmission using the second frequency resource during a second slot at the start of the second instance of the variable time range.
105. The first UE of any of clauses 82-95, further comprising:
  means for transmitting a soft reservation for a second frequency resource of the sidelink resource pool within a second instance of the variable time range.
106. The first UE of clause 105, wherein the means for transmitting the soft reservation is further configured to:
  transmit the sidelink transmission including a first transport block,
  wherein the soft reservation is associated with a second transport block different from the first transport block.
107. The first UE of clause 106, further comprising at least one of:
  means for transmitting, to a third UE in response to determining the soft reservation is not preempted, a second sidelink transmission including the second transport block using the second frequency resource within the second instance of the variable time range; or
  means for refraining from transmitting, in response to determining the soft reservation is preempted, the second sidelink transmission including the second transport block using the second frequency resource within the second instance of the variable time range.
108. The first UE of any of clauses 82-95, further comprising:
  means for identifying, based on the sensing, candidate resources in the sidelink resource pool within a resource selection window;
  means for receiving, from a third UE, a soft reservation for a second frequency resource of the sidelink resource pool within a second instance of the variable time range, the soft reservation associated with one or more of the candidate resources;
  means for determining, based on the soft reservation, the one or more of the candidate resources as unavailable; and
  means for selecting, based on a number of remaining candidate resources, the frequency resource from the candidate resources, wherein the means for the selecting the frequency resource is further configured to:
    select, based on determining the number of remaining candidate resources in the resource selection window satisfies a threshold, the frequency resource within the instance of the variable time range from the remaining candidate resources; or
    select, based on determining the number of remaining candidate resources in the resource selection window fails to satisfy the threshold, the frequency resource from a subset of the candidate resources including at least a first candidate resource of the one or more of the candidate resources.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
    sensing in a sidelink resource pool within a shared radio frequency band;
    reserving, based on the sensing, a frequency resource of the sidelink resource pool within an instance of a variable time range;
    transmitting a soft reservation for a second frequency resource of the sidelink resource pool within a second instance of the variable time range;
    performing, in the shared radio frequency band, one or more listen-before-talk (LBT) procedures; and
    transmitting, to a second UE based on the one or more LBT procedures, a sidelink transmission using the frequency resource within the instance of the variable time range.

2. The method of claim 1, wherein the instance of the variable time range spans one or more contiguous slots.

3. The method of claim 1, wherein the frequency resource is in a same subchannel of the sidelink resource pool over the instance of the variable time range.

4. The method of claim 3, wherein the reserving comprises:
    transmitting a reservation including at least one of a subchannel index identifying the frequency resource or a slot index identifying a beginning slot of the instance of the variable time range.

5. The method of claim 1, further comprising:
    determining the variable time range based on a predetermined value.

6. The method of claim 1, further comprising:
    receiving an indication of the variable time range in at least one of a radio resource control (RRC) configuration or a system information block (SIB).

7. The method of claim 1, further comprising:
    determining the variable time range based on at least one of a packet delay budget (PDB) or a traffic priority associated with the sidelink transmission.

8. The method of claim 1, further comprising determining the variable time range based on a channel busy ratio (CBR) associated with the sidelink resource pool.

9. The method of claim 1, further comprising:
    receiving, by a physical (PHY) layer, a sensing request comprising an indication of the instance of the variable time range, and
    wherein the sensing is further based on the sensing request.

10. The method of claim 1, further comprising:
    receiving, at a media access control (MAC) layer, candidate resources identified based on the sensing;
    identifying, by the MAC layer, a subset of the candidate resources having a number of contiguous slots greater than or equal to a number of contiguous slots within the instance of the variable time range; and
    reducing, by the MAC layer based on a number of candidate resources in the subset failing to satisfy a threshold, the number of contiguous slots within the instance of the variable time range,
    wherein the reserving comprises reserving the frequency resource within the reduced number of contiguous slots within the instance of the variable time range.

11. The method of claim 10, further comprising:
    transmitting, at the MAC layer, a sensing request including an indication of a candidate set size threshold for a resource selection window.

12. The method of claim 1, wherein the instance of the variable time range comprises a set of slots, the method further comprising:
    determining a first subset of the set of slots is unavailable for transmission of the sidelink transmission, wherein the transmitting the sidelink transmission comprises:
        transmitting the sidelink transmission using the frequency resource within a second subset of the set of slots of the instance of the variable time range, wherein the second subset excludes the first subset.

13. The method of claim 1, wherein:
the performing the one or more LBT procedures comprises:
performing, in the shared radio frequency band, a first LBT procedure based on a first slot boundary in the instance of the variable time range; and
performing, responsive to identifying a failure of the first LBT procedure, a second LBT procedure based on a second slot boundary after the first slot boundary; and
the transmitting comprises, responsive to identifying a success of the second LBT procedure, transmitting the sidelink transmission from a beginning of the second slot boundary in the instance of the variable time range.

14. The method of claim 13, wherein:
the performing the first LBT procedure comprises:
performing a countdown until the first slot boundary; and
the performing the second LBT procedure comprises:
resuming the countdown.

15. The method of claim 1, further comprising:
detecting, from a third UE, a reservation of the second frequency resource of the sidelink resource pool within the second instance of the variable time range; and
setting, based on the detecting, an LBT gap within the second instance of the variable time range to zero.

16. The method of claim 1, further comprising:
detecting, from a third UE, a reservation of the second frequency resource of the sidelink resource pool within the second instance of the variable time range; and
reserving, based on at least one of a priority of the reservation or the reservation being for the second instance of the variable time range, a time-frequency resource within a slot of the second instance of the variable time range and a subchannel of the second frequency resource.

17. The method of claim 1, further comprising:
detecting a reservation, from a third UE, of the second frequency resource of the sidelink resource pool within the second instance of the variable time range,
wherein the reserving comprises reserving, based on at least one of a priority of the reservation or the reservation being for the second instance of the variable time range, the frequency resource within a subchannel of the second frequency resource and the instance of the variable time range, wherein the instance of the variable time range is configured to at least partially overlap the second instance of the variable time range.

18. The method of claim 17, wherein the reserving the frequency resource is further based on no other frequency resource reservation with a respective instance of the variable time range overlapping with the second instance of the variable time range.

19. The method of claim 17, wherein the instance of the variable time range does not overlap one or more slots at a start of the second instance of the variable time range.

20. The method of claim 1, further comprising:
reserving the second frequency resource of the sidelink resource pool within the second instance of the variable time range, wherein the second instance of the variable time range at least partially overlaps with the instance of the variable time range, and wherein the second frequency resource is within a different subchannel than the frequency resource.

21. The method of claim 1, further comprising:
reserving the second frequency resource of the sidelink resource pool within the second instance of the variable time range, wherein the second instance of the variable time range is non-overlapping with the instance of the variable time range, and wherein the second frequency resource is within a same subchannel as the frequency resource.

22. The method of claim 1, further comprising:
reserving the second frequency resource of the sidelink resource pool within the second instance of the variable time range, wherein the second instance of the variable time range at least partially overlaps with the instance of the variable time range, and wherein the second frequency resource is in a same subchannel as the frequency resource.

23. The method of claim 1, further comprising:
reserving the second frequency resource of the sidelink resource pool within the second instance of the variable time range, wherein the second instance of the variable time range at least partially overlaps the instance of the variable time range or is adjacent to the instance of the variable time range,
wherein:
the transmitting the sidelink transmission comprises:
transmitting during a first slot within the instance of the variable time range based on a deferral from a first LBT procedure of the one or more LBT procedures, the sidelink transmission, the first slot being adjacent to a start of the second instance of the variable time range; and
the method further comprises:
transmitting, to a third UE based on the first LBT procedure, a second sidelink transmission using the second frequency resource during a second slot at the start of the second instance of the variable time range.

24. The method of claim 1, wherein the transmitting the soft reservation comprises:
transmitting the sidelink transmission including a first transport block,
wherein the soft reservation is associated with a second transport block different from the first transport block.

25. The method of claim 24, further comprising at least one of:
transmitting, to a third UE in response to determining the soft reservation is not preempted, a second sidelink transmission including the second transport block using the second frequency resource within the second instance of the variable time range; or
refraining from transmitting, in response to determining the soft reservation is preempted, the second sidelink transmission including the second transport block using the second frequency resource within the second instance of the variable time range.

26. The method of claim 1, further comprising:
identifying, based on the sensing, candidate resources in the sidelink resource pool within a resource selection window;
receiving, from a third UE, a soft reservation for the second frequency resource of the sidelink resource pool within the second instance of the variable time range, the soft reservation associated with one or more of the candidate resources;
determining, based on the soft reservation, the one or more of the candidate resources as unavailable; and selecting, based on a number of remaining candidate resources, the frequency resource from the candidate resources, wherein the selecting comprises at least one of:
selecting, based on determining the number of remaining candidate resources in the resource selection window satisfies a threshold, the frequency resource within the instance of the variable time range from the remaining candidate resources; or
selecting, based on determining the number of remaining candidate resources in the resource selection window fails to satisfy the threshold, the frequency resource from a subset of the candidate resources including at least a first candidate resource of the one or more of the candidate resources.

27. A first user equipment (UE) comprising:
a memory;
a transceiver; and
at least one processor coupled to the memory and the transceiver, wherein the first UE is configured to:
sense in a sidelink resource pool within a shared radio frequency band;
reserve, based on the sensing, a frequency resource of the sidelink resource pool within an instance of a variable time range;
transmit a soft reservation for a second frequency resource of the sidelink resource pool within a second instance of the variable time range;
perform, in the shared radio frequency band, one or more listen-before-talk (LBT) procedures; and
transmit, to a second UE based on the one or more LBT procedures, a sidelink transmission using the frequency resource within the instance of the variable time range.

28. A non-transitory computer-readable medium having program code recorded thereon, the program code comprising:
code for causing a first user equipment (UE) to sense in a sidelink resource pool within a shared radio frequency band;
code for causing the first UE to reserve, based on the sensing, a frequency resource of the sidelink resource pool within an instance of a variable time range;
code for causing the first UE to transmit a soft reservation for a second frequency resource of the sidelink resource pool within a second instance of the variable time range;
code for causing the first UE to perform, in the shared radio frequency band, one or more listen-before-talk (LBT) procedures; and
code for causing the first UE to transmit, to a second UE based on the one or more LBT procedures, a sidelink transmission using the frequency resource within the instance of the variable time range.

29. A first user equipment (UE) comprising:
means for sensing in a sidelink resource pool within a shared radio frequency band;
means for reserving, based on the sensing, a frequency resource of the sidelink resource pool within an instance of a variable time range;
means for transmitting a soft reservation for a second frequency resource of the sidelink resource pool within a second instance of the variable time range;
means for performing, in the shared radio frequency band, one or more listen-before-talk (LBT) procedures; and
means for transmitting, to a second UE based on the one or more LBT procedures, a sidelink transmission using the frequency resource within the instance of the variable time range.

\* \* \* \* \*